United States Patent [19]

Belaigues et al.

[11] 4,355,310
[45] Oct. 19, 1982

[54] WELL LOGGING COMMUNICATION SYSTEM

[75] Inventors: Antoine Belaigues, Beynes; Alain Paumard, Chatillon Sous Bagneux; Yves Durand, Verrieres Le Buisson, all of France; Thomas J. Calvert, Houston, Tex.

[73] Assignee: Schlumberger Technology Corporation, New York, N.Y.

[21] Appl. No.: 63,666

[22] Filed: Aug. 6, 1979

Related U.S. Application Data

[63] Continuation of Ser. No. 872,504, Jan. 26, 1978.

[30] Foreign Application Priority Data

Feb. 3, 1977 [FR] France .............................. 77 02976

[51] Int. Cl.$^3$ .............................................. G01V 1/40
[52] U.S. Cl. ................................... 340/858; 340/861; 340/825.54; 364/422
[58] Field of Search ............................... 340/856–858, 340/861, 825.54; 367/78, 79; 364/422; 73/152, 151.5

[56] References Cited

U.S. PATENT DOCUMENTS

| | | |
|---|---|---|
| 3,559,163 | 1/1971 | Schwartz . |
| 3,652,979 | 3/1972 | Angelle . |
| 3,707,700 | 12/1972 | Lafont . |
| 3,821,696 | 6/1974 | Harrell et al. . |
| 3,851,302 | 11/1974 | Schmitt . |
| 3,959,767 | 5/1976 | Smither . |
| 3,991,611 | 11/1976 | Marshall et al. . |
| 4,012,712 | 3/1977 | Nelligan . |
| 4,015,194 | 3/1977 | Epling . |
| 4,033,186 | 7/1977 | Bresie .................................. 73/154 |
| 4,072,923 | 2/1978 | Siems et al. ..................... 179/15 BL |
| 4,157,659 | 6/1979 | Murdock .............................. 73/152 |

FOREIGN PATENT DOCUMENTS 2188044 1/1974 France .
2289950 5/1976 France .

OTHER PUBLICATIONS

"Standard Instrument Interface Simplifies System Design", Ricci et al, *Electronics*, Nov. 14, 1974.
"Quand l'Électronique s'Associe á l'Hydraulique: La Télésupervision due Pipe-line Le Havre, Paris", *Measures*, Gallerand, vol. 35, No. 5, pp. 192–199 (May 1970).
Gallerand, "La Surveillance du Bassin de la Garrone", *Électronique et Microélectronique Industrielles*, No. 142, Apr. 1971.
Data Sheet of Schlumberger Instruments & Systems; "Teleseis Data Transmission System TY7500" (Nov. 1973).
"Industrial Data and Transmission System, " a Lecture Digest by Schlumberger Instruments and Systems (Sep. 1973).
Technical Data by Schlumberger Instruments & Systems re: "Teleseis 7500 Data Transmission System" (Apr. 1974).
"Bidirectional Telemetry for Downhole Well Logging", Matthews, *Petroleum Engineer International*, Sep. 1977.

*Primary Examiner*—Howard A. Birmiel
*Attorney, Agent, or Firm*—Brumbaugh, Graves, Donohue & Raymond

[57] ABSTRACT

A communication system capable of continuously exchanging digital information in a well logging installation between apparatus arranged on the earth's surface and apparatus arranged in an earth borehole, interconnected by a cable. Both the surface apparatus and the downhole apparatus include a controller and a modem for sending digital command messages downhole and digital data messages uphole. The downhole apparatus also includes one or more tools which are coupled in parallel to the downhole controller via a bi-directional bus. Each tool has a universal (identical) interface adapted to recognize a specific address unique to itself and a universal address common to all interfaces. A command message with a universal address may activate all of the tools in a "free-running" mode to transmit a predetermined quantity of data in a predetermined sequence. A command message having a specific address and an indication of the length of the data desired may activate a specific one of the tools in a "command-response" mode to transmit the prescribed quantity of data.

25 Claims, 30 Drawing Figures

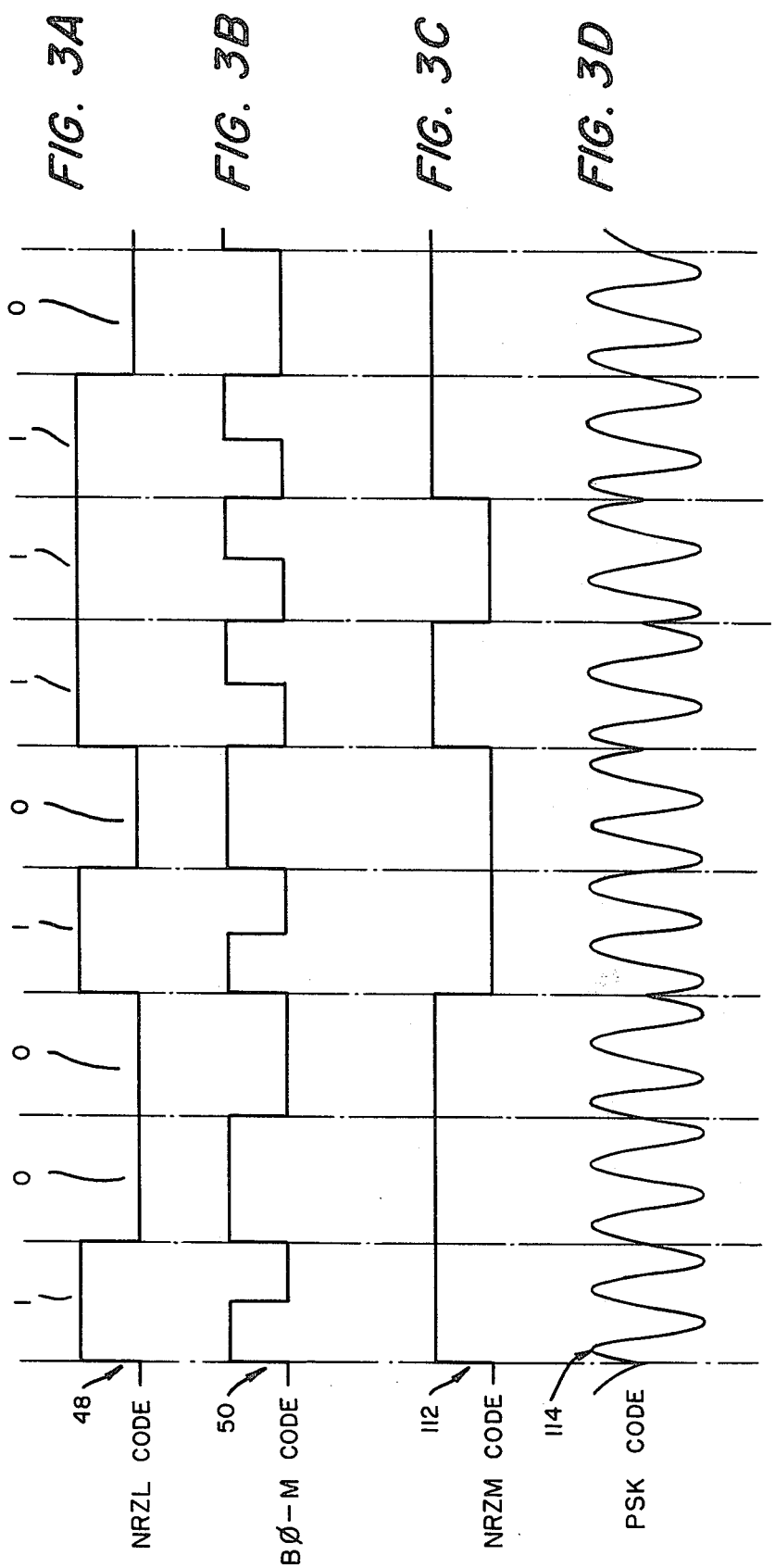

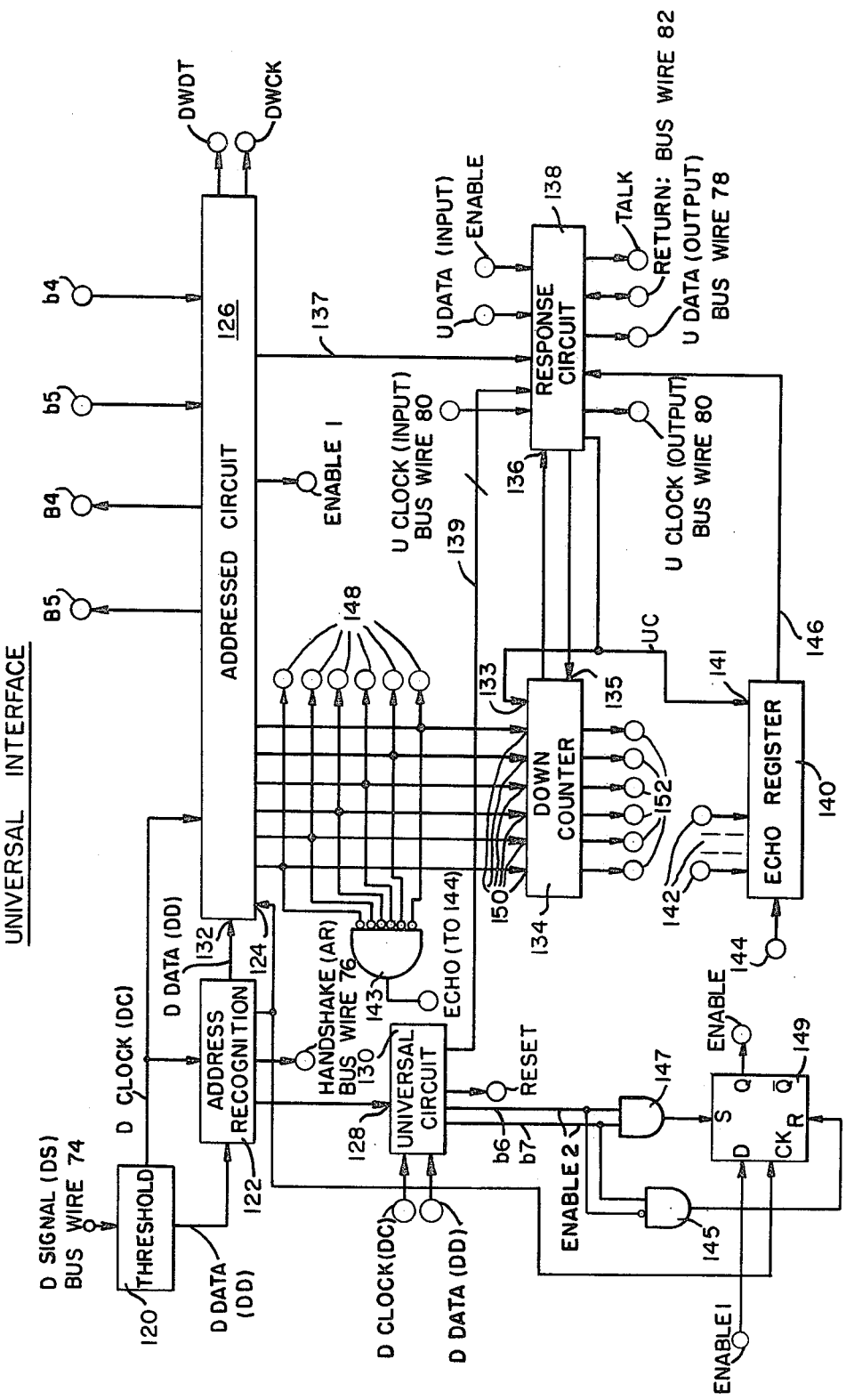

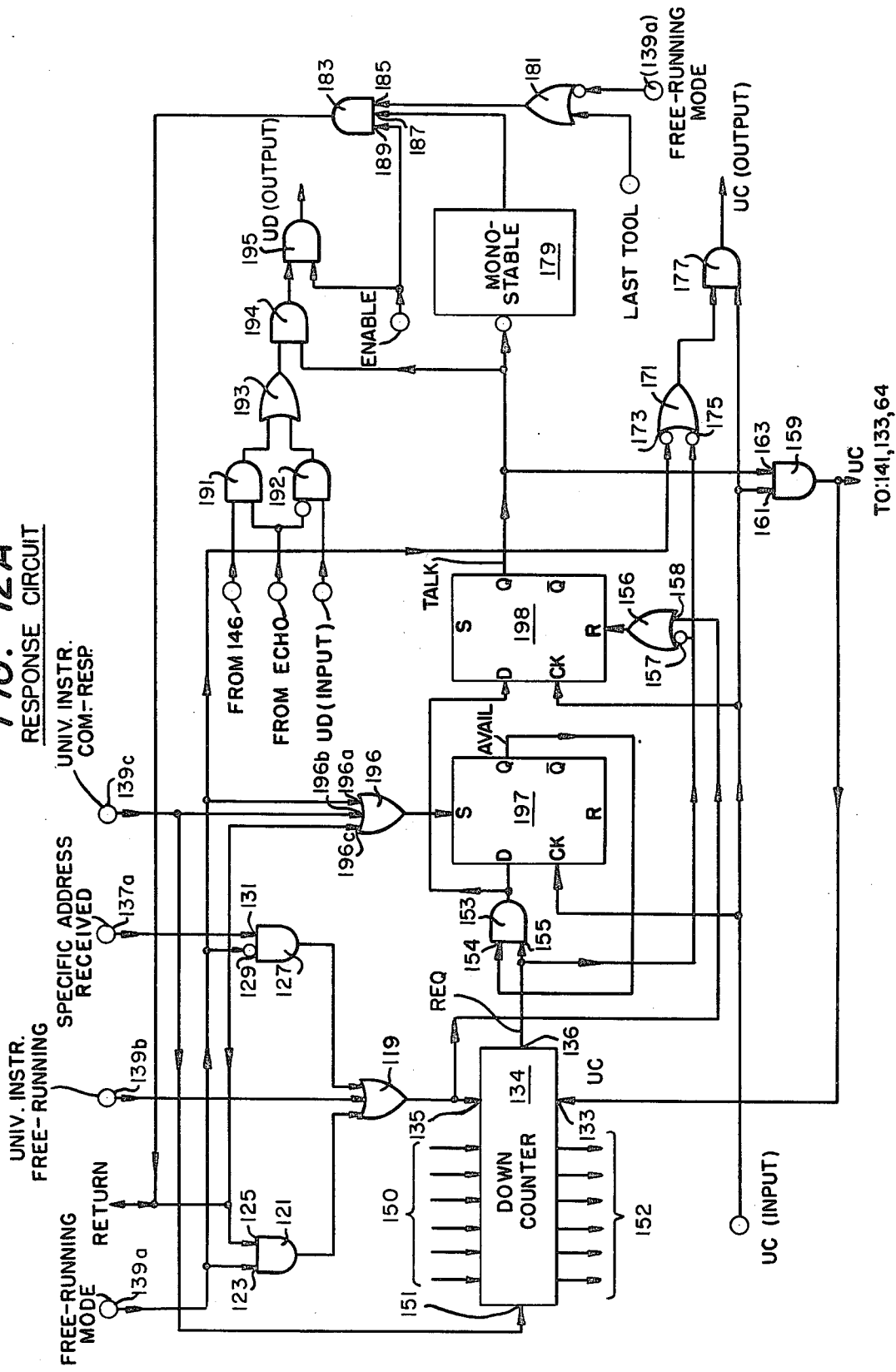

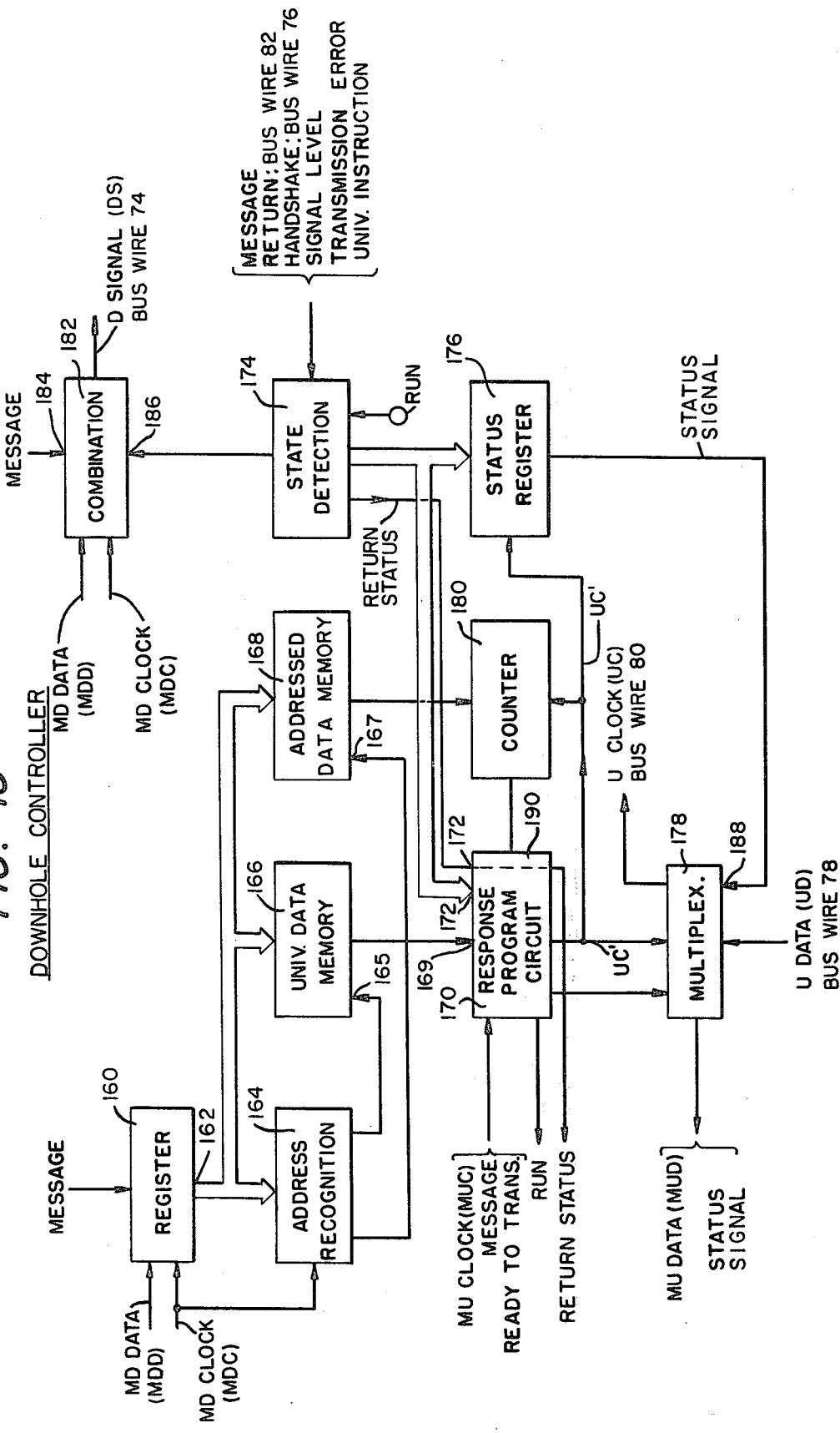

STATE DETECTION CIRCUIT

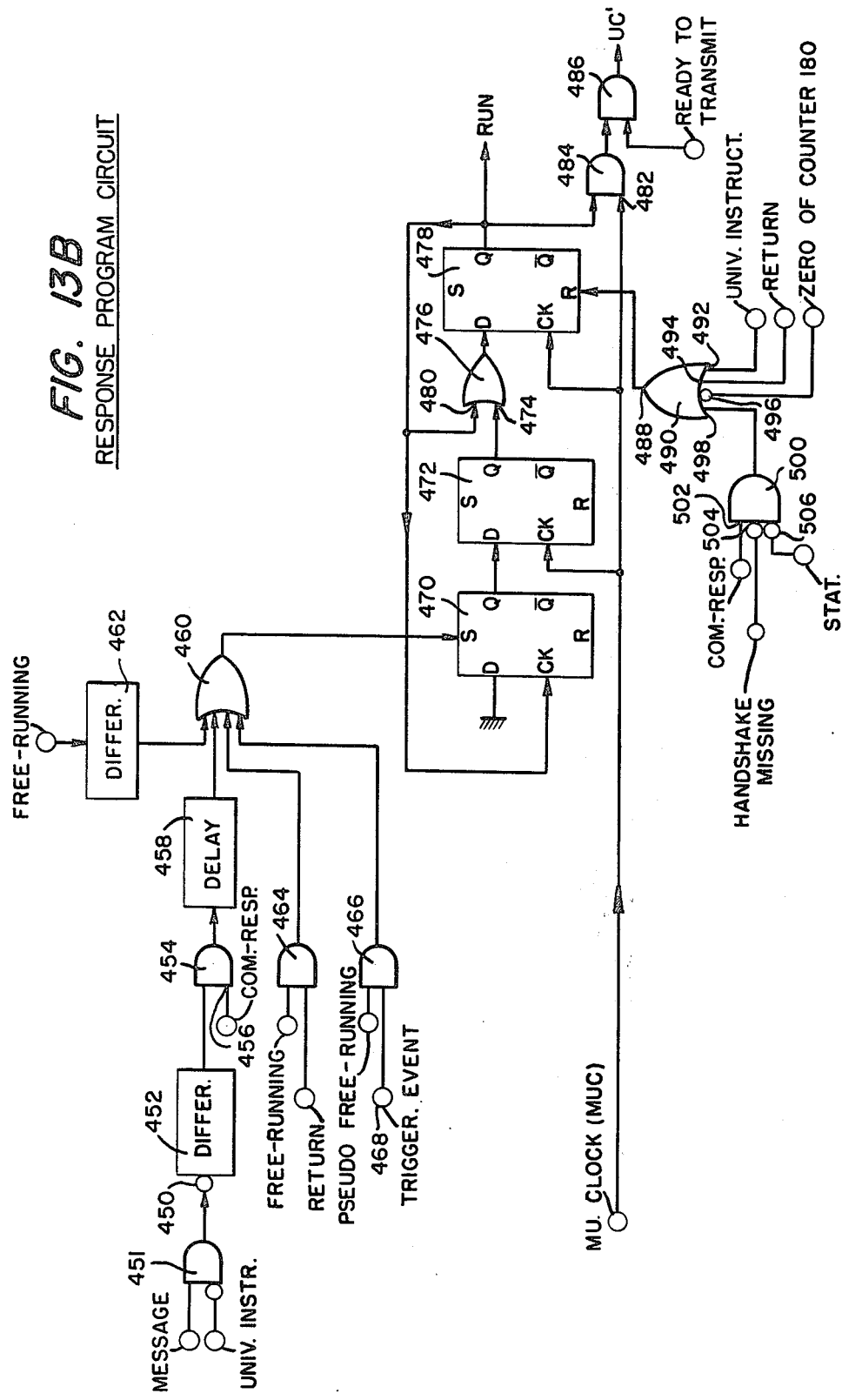

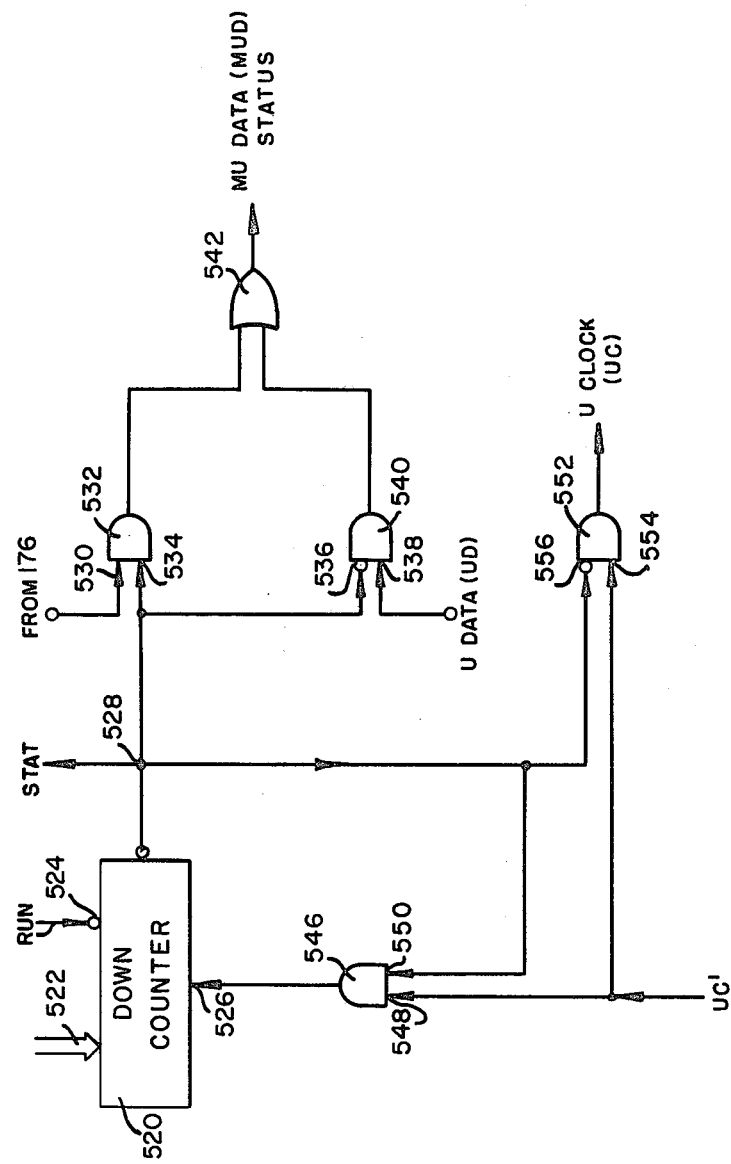

COMMAND-RESPONSE MODE

FREE-RUNNING MODE

FIG. 18 REMOTE TELEMETRY ELEMENT

FIG. 19 LOGGING TOOL

WELL LOGGING COMMUNICATION SYSTEM

This is a continuation of application Ser. No. 872,504, filed Jan. 26, 1978.

BACKGROUND OF THE INVENTION

This invention relates to a communication system allowing the exchange of information between a central station and several data acquisition and transmission stations via a signal transmission line or cable. More specifically, the system of the invention allows a surface logging apparatus to exchange data with a downhole apparatus which has one or more logging tools that can be lowered into an earth borehole. This exchange may be viewed as a kind of dialog between the surface and the hole. It consists essentially, for the surface apparatus, in controlling the different tools and, for the logging tools, in sending the various logging data to the surface under the control of the surface apparatus.

The invention also relates to a remote telemetry element of the downhole apparatus of an installation for the exploration of earth formations traversed by a borehole. The invention also concerns a logging tool for the exploration of these underground formations. The remote telemetry element and one or more of these logging tools can form a downhole apparatus by connecting them end to end.

Measurements of the characteristics of the different earth formations traversed by a borehole are generally carried out by lowering into the borehole a sonde having a "tool" attached to a cable, with a single or several electric wires, used both for holding the equipment and as an electrical medium for the transfer of data signals from the tool to a reception station on the surface. The maximum rate at which data can be transmitted is limited by the passband of the cable. In practice, this limit is about 80 KHz. In order to reduce downtimes, it is necessary to perform all the measurements as rapidly as possible. To achieve this, a solution has been to simultaneously lower into the borehole several tools in the same combination. In practice, a current procedure is to combine three tools during a single operation. The information from the different tools is sampled and transmitted sequentially with respect to time by means of a multiplexing system. When it is desired to increase the number of tools within a given combination and yet to have the same quantity of data transmitted per tool per unit of time, the sampling rate must be increased. However, as mentioned above, the maximum passband of the cable is limited. It is therefore necessary to strike a compromise between the quantity of data transmitted and the sampling speed. The transfer of the data on the cable must also be achieved with great reliability.

There are known communication systems specially designed to carry to the surface the logging data sent by tools lowered into boreholes. Such a system is described, for example, in the U.S. Pat. No. 3,707,700. It involves essentially the transmission of data coming from nuclear-type tools. These analog data are stored in a central memory located in the tool. The data thus stored are multiplexed, sent to the surface via the transmission cable, and finally demultiplexed on the surface before being recorded.

Another known system is described in U.S. Pat. No. 3,959,767. This system allows the control of motors located in a borehole in accordance with measurements made by apparatus also located in the borehole. The measurements are multiplexed in analog form and then converted into digital values before being processed by a logic circuit. This circuit adds an address to the measurement data to form a complex message which is then sent to the surface through a modulation circuit. The logic circuit also furnishes the address of the motors to be controlled. The controls signals transmitted by the surface apparatus to the downhole apparatus are in analog form.

The U.S. Pat. No. 3,991,611 describes a remote telemetry system designed to send to the surface logging measurements in digital form via a cable at the end of which are attached the logging tools. This system is similar to the digital remote telemetry systems customarily used, for example, in the field of industrial control. The downhole apparatus in this system is comprised of a coding circuit, to which the logging tools are connected in parallel, and a modulator for transmission of encoded data on the cable. The surface apparatus comprises the logging cable and a decoding circuit. The connection of a tool to the coding circuit is specific to the type of tool. Thus, it is not possible to connect a tool of any type whatever without prior adaptation. Moreover, the data from the tools are transmitted to the surface in an order predetermined by a sequence preestablished by a logic circuit. The data from a particular tool cannot be transmitted to the surface in response to a specific command sent from the surface.

Prior art apparatus such as the communication systems just mentioned are directed to the transmission of data in particular cases only; i.e. for well-determined logging tools or for a well-determined combination of tools. These systems do not enable operation in association with other tools, for example, because they deal only with a particular transmission problem. Such apparatus generally allow only one operation mode. Furthermore, these prior art transmission systems generally only transmit data in one direction: from the borehole to the surface. They do not permit a continuous exchange of data between downhole tools and surface equipment. Such an exchange calls for the conveyance of data from the hole toward the surface, and also from the surface downward to the downhole tools.

Whenever several tools are lowered at a time into a borehole, these tools are connected end to end if this is possible. Otherwise, it is necessary to provide adapters for the connections. The electric wires connecting one of the tools to the cable are different from the electric wires of another tool. Thus, the electric wires of a lower tool must go through the tools located over it. This produces a "star" structure. In this case one is quickly limited by the number of tools which may be connected end to end due to the significant space requirements for electric wires. The result is a complete lack of uniformity and operating flexibility.

It is therefore an object of the present invention to provide a well logging communication system which is "universal" with respect to the tools; i.e., which is independent of the type and number of tools used (which can be very high) as well as the order in which the tools are connected.

It is a further object of the present invention to provide a well logging communication system which is reliable, has a high degree of flexibility in operation, and allows the transmission of a much larger quantity of data than has been heretofore possible in prior art systems.

SUMMARY OF THE INVENTION

The above-mentioned objects, as well as other objects which will become apparent from the discussion that follows, are achieved, in accordance with the present invention, by means of a communication system having the following structure:

The surface apparatus, which is connected to the downhole apparatus in a borehole by means of a cable, includes a surface controller for generating a digital command messages to one or more tools of the downhole apparatus and for processing digital data messages received from the tools. Each tool is adapted to recognize a specific address unique to itself or a universal address common to all tools. The command messages may thus contain either the specific address of a particular tool or the universal address of all the tools. The surface apparatus also includes a surface modem, coupled to the surface controller and to the uphole end of the cable, for transmitting and receiving the digital command and data messages, respectively, onto and from the cable.

The downhole apparatus includes a downhole modem, coupled to the other, downhole end of the cable, for receiving and transmitting the digital command and data messages, respectively, from and onto the cable. It also includes a downhole controller, coupled to the downhole modem, for controlling the downhole modem and transmitting and receiving the command and data messages, respectively, to and from the tools. The tools are coupled to the downhole controller over a bi-directional bus which extends from one end of the downhole apparatus to the other. Preferably, each tool is provided with a "universal" (i.e., identical) interface which is connected to the bi-directional bus in parallel.

As mentioned above, the command message may contain either a specific address of a particular tool or a universal address, recognizable by all the tools of the downhole apparatus. In the case of a specific address command message, a portion of this message may identify the length of the data message to be sent by the addressed tool. In this way, one tool may be activated to transmit a prescribed quantity of data. In the case of the universal address command message, a portion of this message may identify one of a number of operating modes of the communication system. In this way, all the tools may be instructed to respond in accordance with the desired mode.

In the preferred embodiment of the present invention there are four operating modes which are chosen by a selection of two instruction bits in a universal address command message. These are:

(1) A "command-response" mode in which the tools are responsive to a specific address command message to send a prescribed quantity of data identified by that message;

(2) A "free-running" mode in which all of the tools are activated successively in a predetermined sequence whereby each tool, in turn, transmits a predetermined quantity of data;

(3) A "pseudo free-running" mode which is similar to the free-running mode except that each tool sends its message every 16.6 milliseconds; and (4) A "command" mode in which commands are sent from the surface without response from the tools.

The operation and implementation of these various modes is explained in detail hereinbelow. At this point, it is important to understand that a dialog can be established between the surface apparatus and the downhole apparatus of the communication system according to the present invention. The language of this dialog—i.e., the structure of the transmitted command and data messages—is the same no matter what the type and number of tools may be.

One advantage of the system according to the present invention is that the surface controller may constitute programmable means such as a general-purpose, digital computer. The choice of the surface modem and the entire downhole apparatus is completely independent of the type of computer used because they respond to command messages (words) and reply with data messages (words) which can be generated and received by any computer.

As noted above, the downhole apparatus comprises a bi-directional bus which connects each tool, or more specifically, the universal interface of each tool, to the downhole controller. According to the invention, this bi-directional bus provides the sole transmission path for the information-bearing and control signals transmitted between the tools and the downhole controller. The term "information-bearing signals" is used in this sense to mean signals which carry instructions, data, addresses and the like. The term "control signals" is used in this sense to mean signals which carry clock, timing and acknowledgment information and the like. In other words, all the connections to the tools, with the exception of power connections, are made through the bus.

The bi-directional bus structure has the advantage, over an arrangement in which each tool is connected separately and directly with the downhole controller, that only a small number of wires (e.g., 5 wires) need to be passed through the various tools of the downhole apparatus, thus reducing the space requirements of the equipment. Another advantage is that it facilitates the construction of the downhole apparatus in "modular" form. That is, electrical and mechanical connections of all the tools may be made identical, with the connections on opposite ends of each tool being "complementary" (capable of mating if they were not on the same tool). With the bus in each tool arranged to extend from one end of the tool to the other, all the tools may be connected end to end, in any arrangement, to form a single bus line extending throughout the downhole apparatus. The tools are thus "modular" in the sense that their electrical and mechanical connections are all identical. They may therefore be connected into or left off the downhole "string" of tools as desired, and may be connected into the string in any order.

BRIEF DESCRIPTION OF THE DRAWINGS

FIGS. 3A, 3B, 3C and 3D represent different modulation modes used in the data transmission system.

FIG. 12 is a block diagram of a universal interface associated with a tool, and FIG. 12A represents in detail an embodiment of the response circuit of the universal interface.

FIG. 13 is a block diagram of the downhole controller, and FIGS. 13A, 13B and 13C represent in detail embodiments of the state detection circuit, the response program circuit and the multiplexing circuit of FIG. 13.

FIG. 18 represents schematically a remote telemetry element in accordance with the present invention which forms the head of the downhole apparatus.

FIG. 19 represents schematically a logging tool in accordance with the present invention which may be connected to the telemetry element of FIG. 18.

DESCRIPTION OF THE PREFERRED EMBODIMENTS

The present invention allows the transfer of information via cable with high reliability; this data transfer affords the best possible compromise between a high sampling speed and a large quantity of transmitted data. These advantages are achieved by using pulse code modulation (PCM). According to this technique of modulation, the analog signals generated downhole are converted into digital signals, coded and then sampled in accordance with a given sequence.

Figure 1:
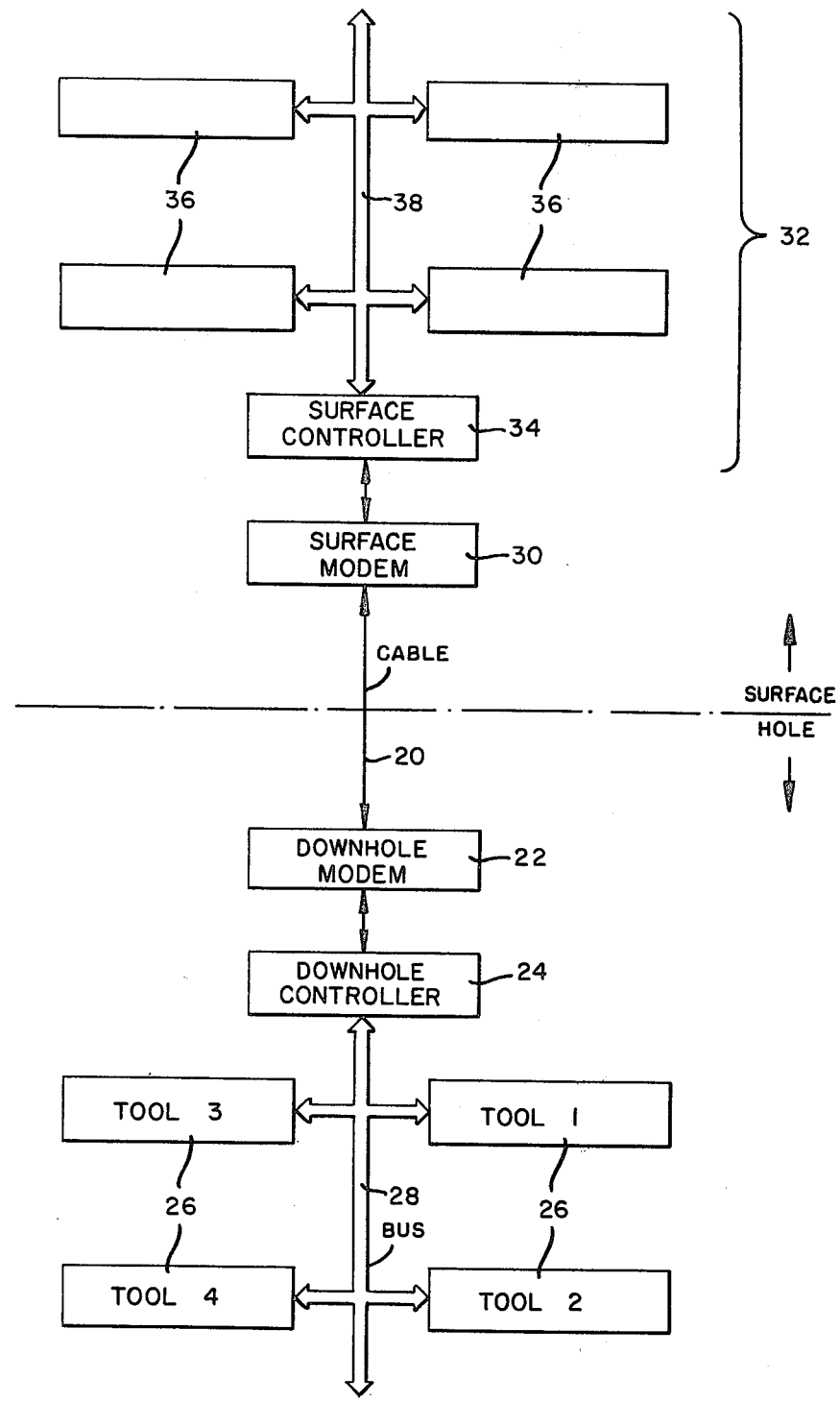
FIG. 1 represents schematically an embodiment of the data transmission system according to the invention.

The communication system of the invention is controlled by a computer and uses pulse code modulation. FIG. 1 represents schematically a communication system according to the present invention. It includes a surface apparatus and a downhole apparatus connected to each other via a signal (e.g., electric) transmission cable 20. The downhole apparatus comprises a modem (modulator-demodulator) 22 and a controller 24 connected to different logging tools 26 through an electric wire network 28 called a bus or bus line. The surface apparatus comprises essentially a modem 30 connected to a data control, acquisition and processing system 32. This system 32 comprises a controller 34 connected via a bus 38 to data processing and/or acquisition systems 36 which will be described in detail below. The controller 34 is the "brain" of the transmission system. It has priority over and, in fact, controls the downhole controller 24. It may, for example, be a general purpose digital computer of the type manufactured by Digital Equipment Corporation of Maynard, Mass., under the designation PDP-11. The controller 34 may be connected to other peripherals (not shown) such as core memories, magnetic recorders, or even printer keyboards.

The surface controller 34 sends command messages to the different tools, for example to enable or inhibit a given tool. As already indicated, the communication system uses only digital signals. Command messages sent by the controller are made up of two words, one word being composed of n bits, n being equal to sixteen in the described embodiment. One of these two words includes either a "specific" address which is peculiar to a given tool or a "universal" address recognized by all tools. The latter allows the sending of data to all the tools at the same time. Upon receiving a command message, the tools generally respond by transmitting a data message to the surface, after signal shaping and encoding by the downhole modem 22.

Figure 2:
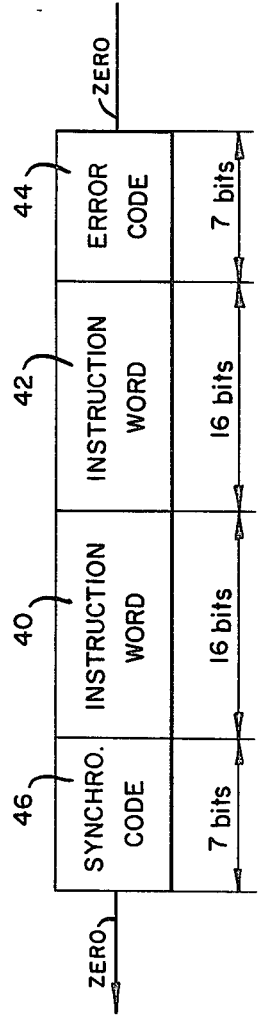
FIG. 2 shows the structure of a command message sent to the downhole apparatus.

FIG. 2 represents schematically the structure of a complete command message sent via the cable by the surface apparatus to the tools. From the instruction words 40 and 42 delivered by the controller 34, the surface modem 30 composes a complete command message by adding to the two words 40 and 42 an error code 44 and a synchronization code 46. A complete command message thus includes successively and in series:

a synchronization code 46 generated by the surface modem 30 and composed of seven bits;

two instruction words 40 and 42 generated by the surface controller 34 and comprising sixteen bits each; and an error code 44 generated by the surface modem and composed of seven bits. In the described embodiment, only the instruction word 42 is used, the second instruction word being available to the system operator. When no command message is sent over the cable 20, the surface modem sends message bits of 0 value on the cable.

FIGS. 3A, 3B, 3C and 3D show the form of the coded signals used by the system. The instruction words generated by the surface controller 34 are coded in the form shown at 48 in FIG. 3A. The bits of 1 value correspond to signals having a given amplitude level and the bits of 0 value to another given amplitude level. This code is normally designated "non-return to zero level" or NRZL. The use of this code for transmission of bits at the frequency f requires a cable with a passband between 0 and f/2 and, second, synchronization is difficult, in particular when the signal comprises a succession of bits of the same value (1 or 0). To overcome these difficulties, the surface modem 30 transforms the NRZL coded signals into so-called "bi-phase mark" (B$\phi$-M) signals as represented at 50 in FIG. 3B. This code, which facilitates the synchronization of command messages, is characterized by a change in level at the start and end of each bit and by a change in level at the middle of each bit of 1 value. As regards the cable passband, which should be between 0 and f/2 for distortion-free transmission of the NRZL signals of frequency f, it can be shown that the passband should be between f/2 and 3f/2 for the transmission of B$\phi$-M signals of frequency f. Each bit of a command message lasts 50 microseconds in the described example. The passband of the NRZL signals is thus 10 KHz but, owing to the change in level in the middle of the bit of value 1, the fundamental frequency is twice as high, namely 20 KHz. The transmission of the command messages from the surface to the tools thus takes place without a carrier and at 20 Kbits (passband between 10 and 30 KHz). It may be noted that in order to avoid transmission of steep leading edges (rectangular signals) on the cable, the signals can be filtered at the output of the surface modem 30 so as to impart a smooth shape to the signals.

The command signals transmitted via the cable thus reach the downhole modem 22. This modem fulfills several functions. It must first of all reset the frequency of a downhole oscillator on the basis of command signals constituted by the Bφ-M message transmitted by the surface apparatus. Due to the very severe ambient conditions inside boreholes, in particular the high temperature and pressure, a drift in the nominal frequency of the downhole oscillator may occur in relation to that of the surface oscillator. Frequency slaving is then necessary at the downhole modem. For this purpose, the downhole modem includes a slaving device which may be, for example, of the type known as a voltage controlled oscillator (VCO).

The downhole modem 22 must also indicate whether the bits it receives are of 1 value or 0 value. The signals reaching the downhole modem are deformed, both in amplitude and width. The downhole modem shapes the signals to obtain rectangular pulses and recalibrates the width of the signal pulses; i.e., their duration. The downhole modem also detects the synchronization code (46 in FIG. 2) of the transmitted command message and checks the validity of this message by means of the error code (44 in FIG. 2). The synchronization code 46 and the error code 44 are not transmitted to the downhole controller 24; only the instruction words are transmitted. Before these words are transferred, the downhole modem demodulates the Bφ-M coded signals (FIG. 3B) back into equivalent NRZL coded signals (FIG. 3A).

The instruction words are passed along by the downhole controller 24 onto the bus 28 to the tools 26. As already indicated, the address contained in the instruction words can either be specific to one of the tools or "universal". In the first case, a particular instruction is intended for a particular tool. Such a specific address instruction word is used whenever the results of the measurements made by a given tool are to be conveyed to the surface. In other words, an order is given to the tool so that it reports the data it has stored in a memory (shift register) with which it is equipped.

Figure 4:
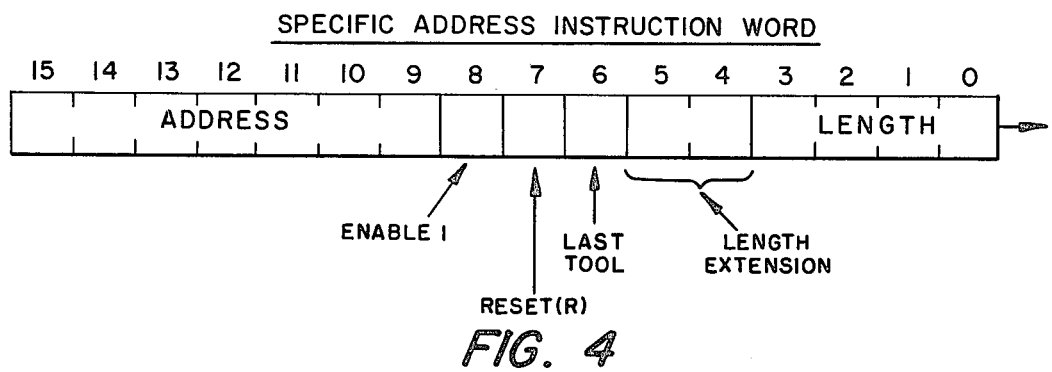
FIGS. 4 and 5 show in detail the structure of an instruction word of the "specific" and the "universal" address types, respectively.

FIG. 4 shows the format of an instruction word 42 (FIG. 2) containing a specific address. The seven bits in positions 9 to 15 are used for the coded address of a tool. There is thus the possibility of coding $2^7$ different addresses. Consequently, it is possible to use $2^7$, or 128 different tools. This number of tools is obviously very large and shows clearly the wide ranging possibilities for general use of the transmission system. The bit in position 8 is an enabling bit, called "Enable", which takes on the value 1 when the tool corresponding to the address is authorized to send data. When this enabling bit has the value 0, everything takes place as if the tool did not exist. This possibility is advantageous, in particular for switching out a given tool without preventing data transmission by the other tools. The bit in position 7 is a reset bit, the purpose of which will be explained below. The bit in position 6, called the "last tool" bit, is used to indicate to the addressed tool that it must send a return signal to the downhole controller 24 when it has finished sending its message. The bits in position 0 through 3 are used to indicate to the tool the number of words it must send. This number of words can vary from zero to fifteen since four bits are used. The bits in position 4 and 5 are either available to the operator or used for increasing the number of words the tool must send in its answer. If the bit in position 4 is used, the maximum number of words the tool may send is thirty-one and, if the bit in position 5 is also used, the maximum number of words is sixty-three.

When a command message containing a "universal" address is sent on the cable, this universal address is recognized by all the tools. A command message with a universal address places, as it were, all the tools in a position receptive to a following order. This order is sent by a specific code which follows the universal address in the instruction word. This code is used for selecting an operating mode for the communication system. Only the instruction word 42 is used; in this case the second instruction word 40 is not used and is not available to the operator, unlike a specific address command message.

Figure 5:
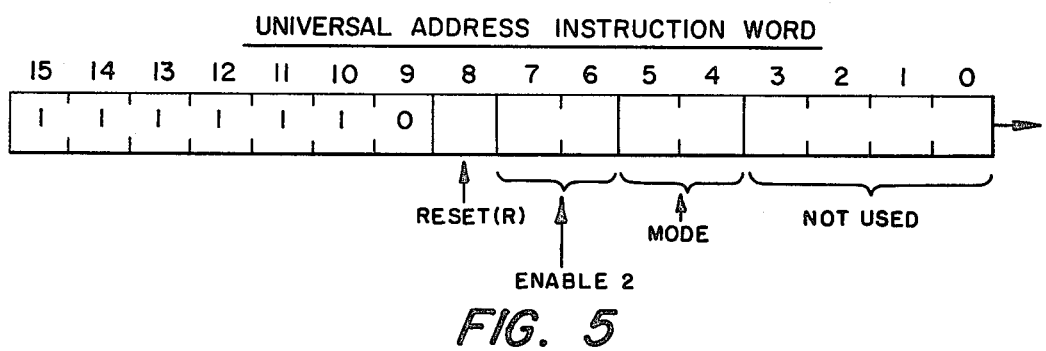

FIG. 5 represents the structure of a universal address instruction word. The bits in positions 9 to 15 are used to designate the universal address; i.e., the address recognized by all the tools. In the example of FIG. 5, this universal address has the value of one hundred and seventy-six in the octal code. The bit in position 8 is a reset bit, the purpose of which will be described below. The bits in positions 6 and 7 are enabling bits, called "Enable 2". When these enabling bits both have the value 1, all the tools are enabled simultaneously and when the bit in position 6 has the value 0 and the bit in position 7 the value 1, all the tools are inhibited simultaneously. This operation is used in case of failure to detect the defective tool. First all the tools are inhibited at the same time and then enabled one by one to check them separately. The bits in positions 0 to 3 are not used. The bits in positions 4 and 5 are used for determining the operating mode of the communication system or the chosen data exchange mode between the surface and the downhole equipment.

The data transmission system in accordance with the invention in fact allows several operating modes, which are established by an instruction word with a universal address, and two data transmission modes, called the "half duplex" and "full duplex" modes. According to the "command-response" operating mode, the surface controller sends a command message to a given tool and waits for the response of this tool before sending the following command message. This mode is chosen when the bits in positions 4 and 5 of the universal address instruction word have the value 0 and when the reset bit in position 8 has the value 1. On the other hand, according to the "free-running" mode, the data coming from the tools are sent continuously to the surface. The free-running mode is selected by giving the bits in positions 4 and 5 the value 1. A third operating mode, the "pseudo free-running" mode can be used. This operating mode is characterized by the fact that all the tools in the same network send a message every 16.6 milliseconds (triggering taking place from the 60 Hz power supply voltage) and then stop. This mode is chosen by giving the bit in position 4 the value 0 and the bit in position 5 the value 1. When the bit in position 4 has the value 1 and the bit in position 5 the value 0, commands can be sent from the surface but no response is furnished by the tools.

The data can be transmitted in either half duplex or full duplex modes. The tool control wire for downward transmission and the data return wire for upward transmission in the cable 20 are separate. In half duplex transmission, the data do not appear simultaneously on the wires. On the other hand, in full duplex, the data can be transmitted simultaneously in both directions, downward and upward. The change in transmission mode from half duplex to full duplex and vice versa takes place simply by changing the programming (software) of the surface controller 34; the material part (hardware) of the surface apparatus and the downhole apparatus does not require any modification.

In general, the "command-response" operating mode is used with the half duplex transmission mode. It is possible, however, to use the "command-response" mode with a full duplex mode. In this case, the surface controller can send a second command message while the tool replies to the first message. It can be shown that this operating mode allows the full use of the capacity of the upward channel of the tools toward the surface when the number of data bits to be transmitted to the surface is higher than the number of command message bits transmitted to the tools (which is generally the case).

When the specific address instruction word has been transmitted by the downhole controller 24 to the tools 26 and one of these tools has recognized its address, this tool returns to the downhole controller a "Handshake" signal (AR). If the controller does not receive this Handshake signal, it concludes that the tool has operated defectively or that it has not received the instruction word. In the case of a universal address instruction word there is no Handshake signal. It is assumed that the universal address instruction word has been recognized and acted on by all the tools. Instead of using a Handshake signal, it is also possible to associate an error code detection circuit with each tool.

Assuming that an instruction word has reached a tool or all the tools, a data message is then sent to the surface. To achieve this, the downhole controller 24 requests the downhole modem 22 to generate a synchronization code. Then a word, called the "status word" is generated by the downhole controller and finally the tools receive the order to transmit their data. This sequence is represented schematically in FIG. 6 which shows the format of a data message transmitted by the downhole apparatus to the surface. The synchronization code 52 has sixteen bits instead of seven for the downward command message. This is due to the fact that there may be more information in a single message to be transmitted to the surface than down the hole and that, the greater the number of bits used for synchronizing the uphole with the downhole modem, the smaller will be the risk of false synchronization. The status word 54 will be described in detail below in connection with FIG. 7. The data from the tools which follow the status word are represented in the form of words 56, from 1 to n, n being equal to the maximum of sixty-one in the described example. Each word is composed of sixteen bits. In the command-response mode, all the data in a data message come from a single tool. On the other hand, in the free-running mode, the passage has a succession of data words coming from the successive interrogation of the tools. Each tool sends a given number of words and all the words sent by the tools form the words 1 to n. Thus, as an example, the tool No. 1 can send three words, the tool No. 2 can send one word; the tool No. 3 can send five words and so on. A tool designed to send a given number of words repeatedly transmits that same number of words.

Finally, an error code 58 is sent. This error code consists of sixteen bits, fifteen of which are used for error detection of the digital data message and one for indicating the proper or defective operation of the designated tool. If this bit has the value 1, this means that the tool has sent a return signal at the end of its message (data word or words); otherwise, this bit has the value 0.

Figure 6:
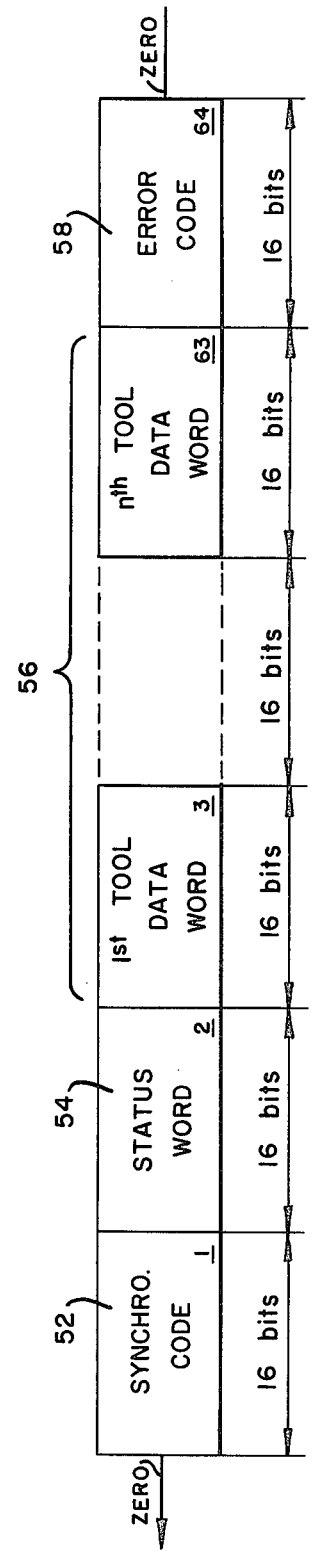
FIG. 6 shows the structure of a data message transmitted by the downhole apparatus to the surface apparatus.
Figure 7:
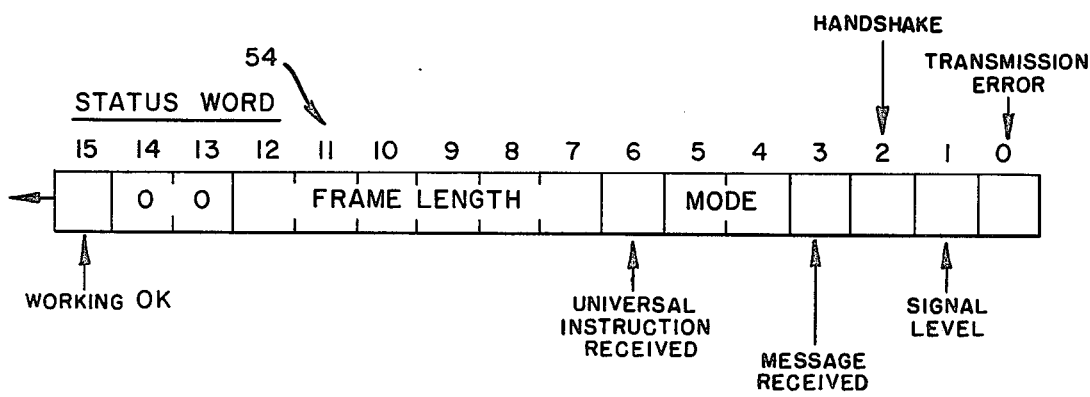
FIG. 7 shows in detail the organization of a status word of the data message.

FIG. 7 shows schematically the status word 54 of FIG. 6. This word is generated by the downhole controller 24 whenever a response is sent by the downhole apparatus. The bit in position 0 takes on the value 1 if one or several command messages have been received erroneously. The bit in position 1 indicates whether a command message level was higher or lower than a given amplitude threshold. The bit in position 2 indicates whether one or more tools have not recognized their address and, hence, whether the Handshake signal has not been sent. The bit in position 3 takes on the value 1 if the command message has been properly received. The bits in positions 4 and 5 are used for re-copying the operating mode used, for example command-response or free-running. The bit in position 6 is used to indicate that a universal address command has been received. The length of the message sent by the downhole apparatus is indicated by the bits in positions 7 through 12. The following bits in positions 13 and 14 are not used. The bit in position 15 is indicative of the proper or defective operation of the system. A bit of value 1 in this position indicates that an error has been pointed out by at least one of the bits in positions 0, 1 and 2. Thus, the operator is immediately informed of the proper or defective operation of the system by looking at the status of the bit in position 15.

Connection of Tools to Downhole Equipment

Figure 8:
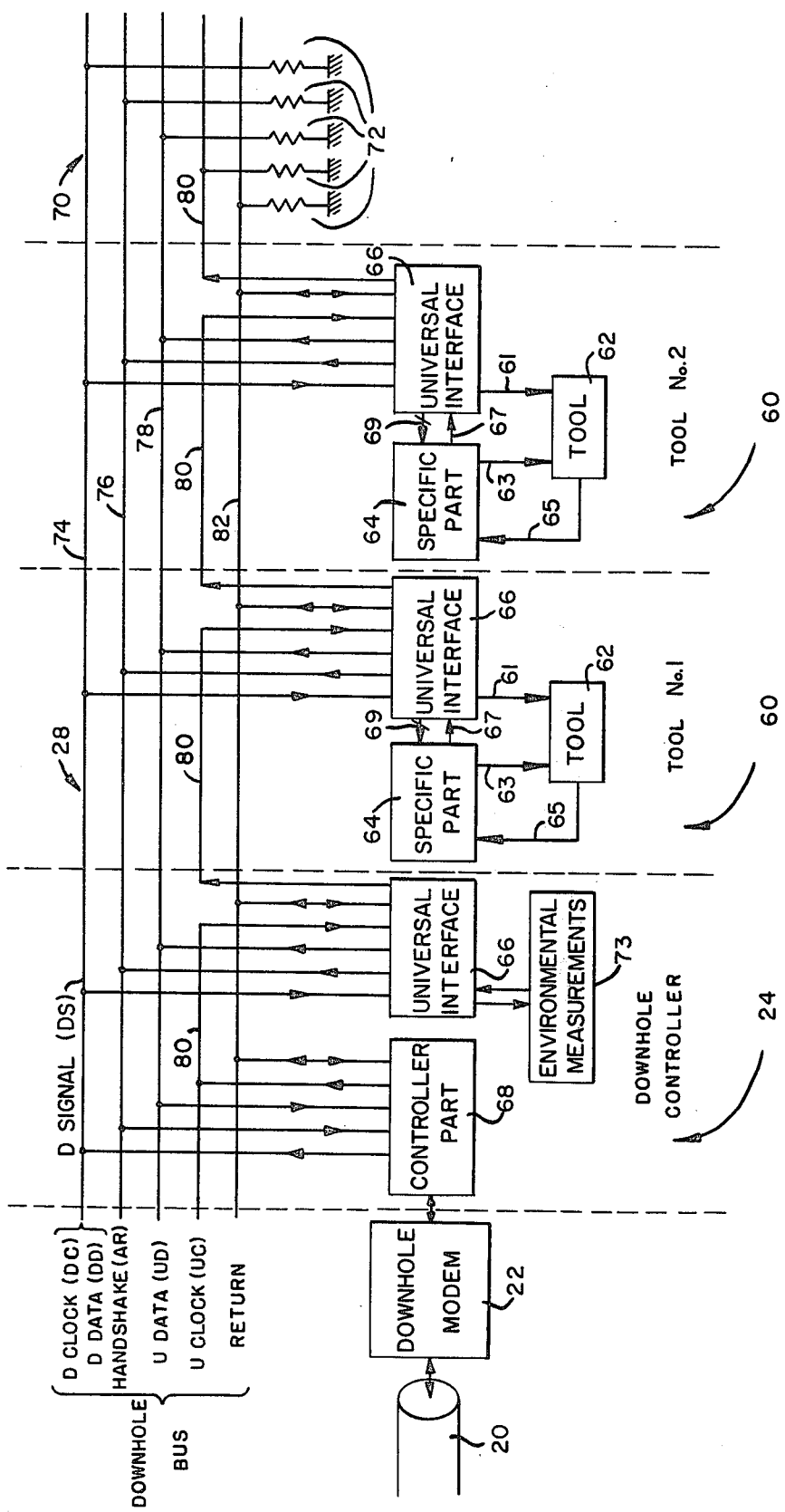
FIG. 8 represents schematically the downhole apparatus and shows, more particularly, the bus line and its connections to the downhole controller and to the tools.

FIG. 8 represents schematically the manner in which the tools are connected to the bus 28. In this figure only two tools have been shown but, in fact, a much larger number of tools are connected. In FIG. 8 it is noted that each tool 60 has been represented schematically by three different blocks or parts: a part 62 which is the sensor or tool, properly so-called, and which can be, for example, a pressure detector or a radioactivity detector, or even an acoustical transducer; a part 64 specific to each tool, for example the electronic circuit associated with the sensor; and a universal interface 66 connected to the bus 28. This interface, identical whatever the type of tool used, makes it possible to connect any tool to the bus to the extent that the data delivered by the tool are in digital form. One thus obtains standardization of the connection of the tools in the downhole equipment.

The signals delivered by the tool are generally in analog form, whereas the interface handles only digital signals. It is thus necessary for an analog-to-digital converter to be present in each specific part 64 of the tool or at the input of each interface.

The tool 62 is connected to the specific part 64 by a connection 63. The universal interface 66 is connected directly to the tool 62 by a connection 61, thus allowing direct transfer of data when the passage by the specific part 64 is not necessary. These connections 61 and 63 are used for monitoring or controlling the tool. For example, they are used to control the opening of the pad or pads of the tool when the latter is equipped with pads or for applying an electric current. The information transmitted by the tool in the form of data is taken from the tool 62 to the specific part 64 by the connection 65. These data concern, in general, the measurements of the physical parameters carried out by the tool. However, they can also concern the tool itself, for example its configuration. For instance, they may involve an indication of the open or closed configuration of the pads of the tools.

The data transmitted by the tool 62 are carried from the specific part 64 to the universal interface 66 by the connection 67. In the specific part 64, the data signals undergo suitable electronic processing, such as amplification, shaping, etc. This processing is of a conventional nature in logging sondes known at present and hence does not require any detailed explanation. Moreover, the information signals in analog form are converted to digital form by a conventional analog-to-digital converter. The resetting of the tool 62 is achieved by a resetting signal R (transmitted by the universal circuit 130 of FIG. 12 as will be described below) carried from the universal interface 66 to the specific part 64 by the connection 69. The latter connection, which is in fact made up of several wires, can be used for the transmission of other signals as well, such as Echo, B5 and B4, DWDT, DWCK, Talk, Enable, message-length (148) and status (152) of counter (134). All of these signals are described further below in the explanation given in reference to FIG. 12 showing the interfaces.

The downhole controller 24 is connected on the bus 28 in the same manner as the tools. In particular, the controller also has a universal interface 66 and a controller part proper 68. The controller part 68, hereinafter called simply the "controller", is connected directly to the bus 28 as is its interface 66. The controller may thus communicate with the tools via the bus 28 and the controller section 24 may be addressed, like a tool, via its interface. The interface is connected to a device 73 capable of making and storing the results of simple environmental measurements, such as the ambient temperature and pressure in the borehole, and the tension applied to the cable (indicating the amount of cable stretch for depth correction).

The bus 28 is composed of five electric wires. The end 70 of the bus is adapted to the characteristic impedance of the network by means of resistors 72 connected to ground. The downhole apparatus must be of small dimensions and, for this reason, only five wires are used for the bus. The signals preceded by the letter D move from the surface apparatus toward the downhole apparatus whereas the signals preceded by the letter U move from the downhole apparatus to the surface apparatus. Specifically the first wire 74 carries both the command signals, designated D Data (DD), and the downward clock pulses, designated D Clock (DC), at 20 KHz. The second wire 76 is reserved for Handshake signals (AR) sent by the universal interfaces 66 when they have recognized their addresses. The third wire 78 is used for data sent upward, designated U Data (UP), originating from the tools. The fourth wire 80 carries the clock pulses, designated U Clock (UC), used for sampling the data from the tools. As may be seen, these clock pulses UC are passed through each interface in series so that the interfaces may respond in succession, "daisy-chain" fashion, with the data signal UD appearing (being clocked) from one interface at a time. After an interface has completed sending its data it passes any succeeding clock pulses UC on down the line to the following interfaces.

There is generally a greater quantity of information (data) to be transmitted from the downhole apparatus to the surface apparatus than that contained in the command messages transmitted from the surface downhole. In other words, the data to be transmitted upward are much more numerous than those to be transmitted downward. The data transmission frequency must therefore be higher for the transfer of data upward than for the transfer of command messages downward. This frequency is 40 or 80 KHz, the latter frequency corresponding substantially to the upper limit of signal transmission on the cable without distortion. The 80 or 40 KHz clock pulses are delivered by an oscillator incorporated in the downhole modem. This oscillator can be either independent or coupled to the 20 KHz oscillator located on the surface.

When a tool sampling cycle is over, a "Return" pulse is sent on the fifth wire 82 of the bus to inform the downhole controller. In the free-running mode, the tool which sends this "Return" signal is the tool which is located last in the network of the tools to transmit data. The last tool in the network is the one which has received an instruction word whose bit of position 6 (see FIG. 4) has the value 1.

In the free-running mode, the pulses UC are sent sequentially from one tool to another. These clock pulses are, in a way, sampling signals. In its specific part 64 each tool has a memory in which data are stored. The pulses UC make it possible to transfer the contents from these memories onto the bus 28 toward the surface apparatus, with a clock pulse triggering the transfer of an information bit. The capacities of these memories, which are in fact shift registers, are small and allow the storage of only a small number of words per tool. A complete sampling cycle, performed by transferring the data from the tools on the cable, corresponds to a succession of n words of sixteen bits each (FIG. 6). When the data from the last tool have been transferred, and hence at the end of a sampling cycle, the last tool sends the controller the "Return" signal. This signal makes it possible to fill the memories of the tools with new data and to apply the pulses UC to the input of the first tool, the system thus being ready for the next sampling cycle.

According to the command-response operating mode, a specific address instruction word is sent to a given tool. The contents of the memory of this tool are then transferred onto the bus 28 to the downhole controller 68. When the contents of the memory have been completely transferred, the tool sends out a "Return" signal to inform the controller. The memory can then acquire new data. To send up more information from the same tool, or from a different tool, the surface controller must again send a specific address instruction word. It is seen that this operating mode is less advantageous during the data acquisition period than the free-running mode because it is less rapid and, consequently, it is used only in particular cases.

Shape and Synchronization of Signals

Figure 9:
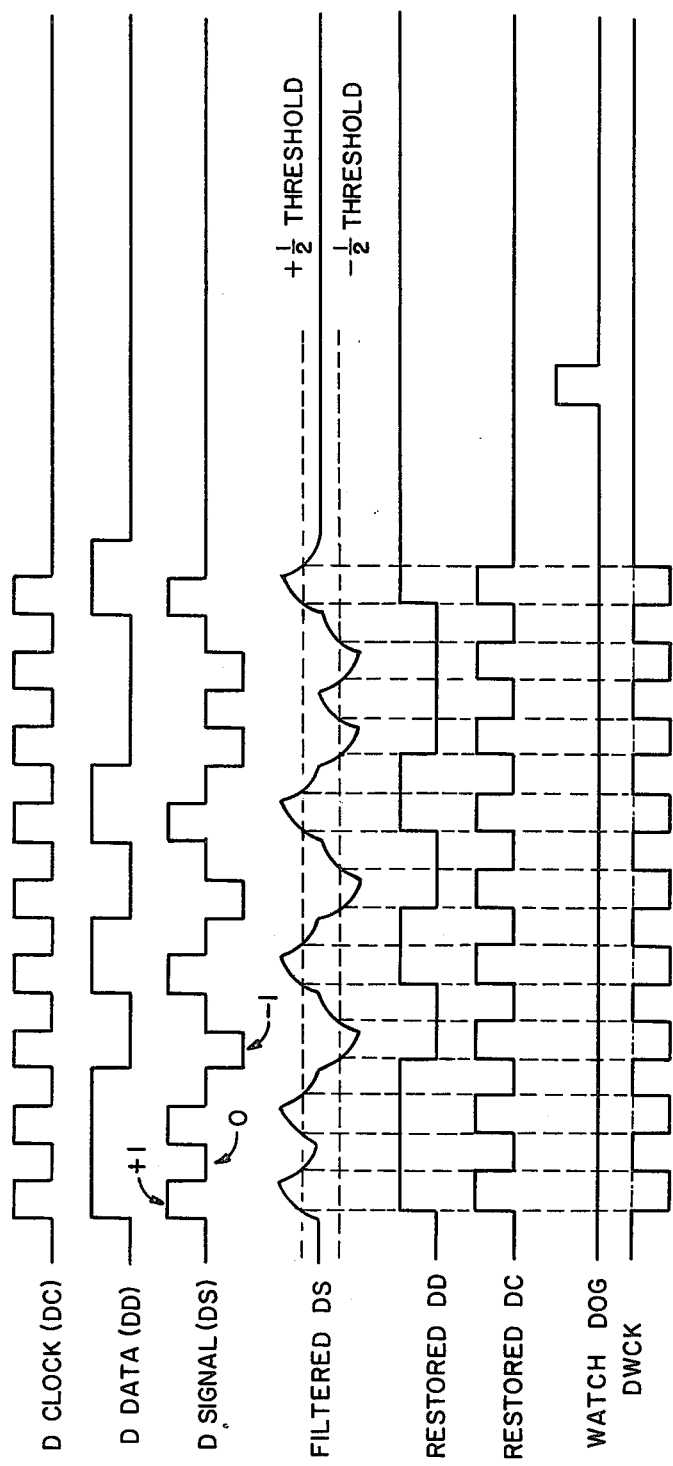
FIGS. 9, 10 and 11 represent the form of different signals used in the transmission system.

FIG. 9 illustrates the technique of coding and decoding command signals and clock signals sent from the surface apparatus to the downhole apparatus. It has already been stated, with reference to FIG. 3, that the signals delivered by the surface modem 30 to the downhole modem 22 are the B$\phi$-M coded signals 50. These signals include both information (data) signals and clock signals. The downhole modem restores in a separate form the data signals and the clock signals as indicated in FIG. 9 by D Clock (DC) and D Data (DD), respectively. These two types of signals are sent to the downhole controller which transforms them again into a single signal, designated D Signal (DS), that is sent on the wire 74 of the bus 28 connecting the tools with the downhole controller 68. The purpose of this combination of two signals is to economize a wire for the bus. The combination obeys the following rules: If DD=1 and if DC=1, DS=+1. If DC=0, DS=0. If DD=0 and if DC=1, DS=−1. The signal DS can thus take on three levels, +1, 0 and −1, as indicated in FIG. 9. The interfaces restore, from the signal DS, the clock signals and the data signals. The signal DS may have undergone significant distortion and, upon reaching the interfaces, it may have a form similar to that shown in FIG. 9 as the "Filtered DS". The interfaces than include two thresholds, +½ and −½, to restore the signal DS. In this manner, the data and clock signals are restored as shown in FIG. 9 by "Restored DD" and "Restored DC", respectively. It will be noted that the absence of clock signals coincides with the absence of data words. As an example, the interfaces may include two threshold gates (+½ and −½) which are connected to the set and reset inputs of a flip-flop to produce the Restored DD pulses, and are connected to an OR gate to produce the Restored DC pulses.

A command message has a maximum of two instruction works of sixteen bits each. The maximum length of a Restored DD signal is thus thirty-two bits; hence there are thirty-two Restored DC pulses. When the interfaces receive a message, they count thirty-two clock pulses and, at the end, they transmit a "Watch Dog" signal as shown in FIG. 9. This is a kind of end-of-message self-detection. The received word will be declared valid if it contains thirty-two bits; otherwise, it is not counted by the interface.

Figure 10:
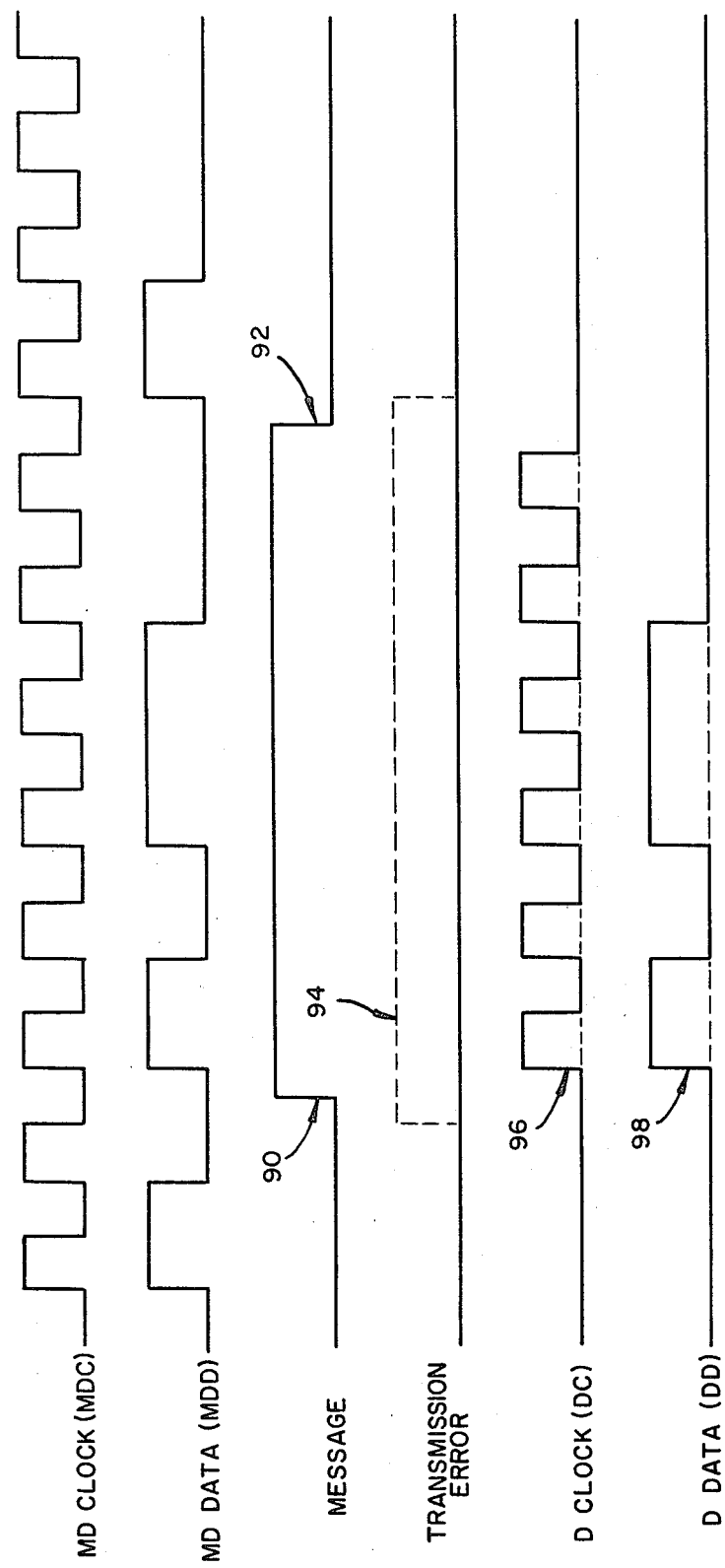

The synchronization of signals received by the downhole apparatus is indicated in FIG. 10. It has already been mentioned that the command messages, Bϕ-M coded for transfer on the cable between the surface and downhole apparatus, are decoded by the downhole modem to restore the clock and data signals represented in FIG. 10 by MD Clock (MDC) and MD Data (MDD), MD meaning "modem-downhole". When the downhole modem has recognized the synchronization code of a command message (reference 46 in FIG. 2), it delivers a "Message" signal corresponding to a logic state 1 for a period of thirty-two clock pulses (length of two instruction words of sixteen bits each). The leading edge of the "Message" signal, designated 90 in FIG. 10, corresponds to the end of the synchronization code detection, advanced however by a quarter of a clock period. The end 92 of the "Message" signal is also delayed by a quarter of a clock period.

The downhole modem examines the validity of the command message received by analyzing the error code 44 (FIG. 2). If the modem detects an error, it then furnishes a "Transmission Error" signal 94. These "Message" and "Transmission Error" signals are sent to the downhole controller which allows passage of the MDC signals only if the "Message" signal is in a logic state 1 and if the "Transmission Error" signal is in a logic state 0. The signal DC 96 is thus obtained within the downhole controller itself. Similarly, the signals DD 98 are generated inside the downhole controller if the "Message" signal is in a logic state 1 and if the "Transmission Error" signal is in a logic state 0.

Figure 11:
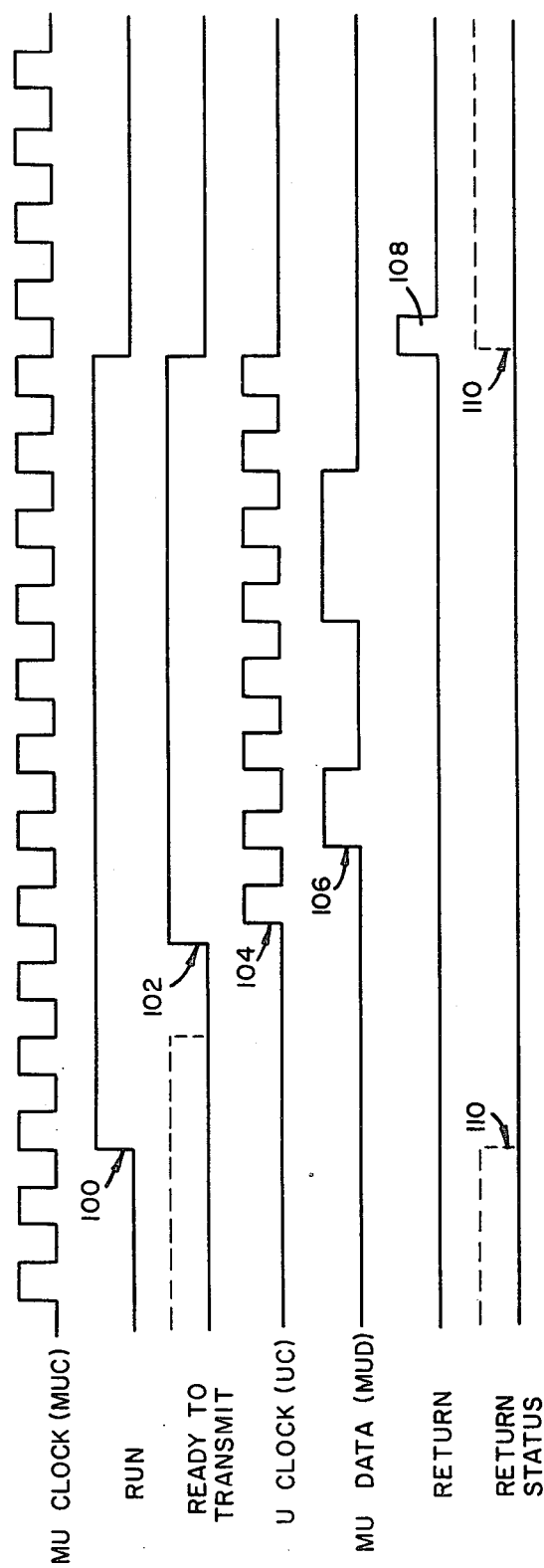

FIG. 11 illustrates the synchronization of the different signals for data transmission from the downhole apparatus to the surface apparatus. The 40 or 80 KHz clock pulses for the sampling of the tools are generated by the downhole modem and are represented in FIG. 11 MU clock (MUC), MU meaning "modem-up". The dialog between the downhole modem and the downhole controller takes place by means of the "Run" and "Ready to Transmit" signals represented, respectively, by 100 and 102 in FIG. 11. The "Ready to Transmit" signal is sent to the downhole controller from the modem when the latter is ready to transmit the data to the surface. The "Run" signal is sent by the downhole controller to the downhole modem when the downhole controller has data to transmit to the surface. In the commandresponse operating mode, the "Run" signal is set to the logic state upon receipt of a specific address command message and is reset to 0 by the "Return" signal at the end of the responsive data message sent to the surface. In the free-running mode, the "Run" signal is reset to zero by the "Return" signal and then returns to a 1 state after a certain delay. The downhole modem is informed that data must be transmitted to the surface by the reception of the "Run" signal=1. In this case, the downhole modem generates the synchronization code (52 in FIG. 6) and then sends to the downhole controller the "Ready to Transmit" signal 102. The clock pulses UC 104 are then sent by the controller to the tools for data sampling. This signal UC delivered by the downhole controller is none other than the signal MUC delivered by the downhole modem when the "Run" signal is in a logic state 1 and the "Ready to Transmit" signal is in a logic state 1.

The tools sampled by the clock pulses then transmit their data onto the bus 28. These data reach the modem 22 through the downhole controller 24. They are represented by the signal MUD 106 in FIG. 11. It is noted that the data from the tools are sampled by the trailing edges of the clock pulses 104. When the mesage is completed, the "Return" signal 108 is delivered as explained above. The downhole controller then generates a "Return Status" signal 110 when it receives the "Return" signal 108 to indicate the status of the "Return", Transfer of Signals Onto the Cable The surface apparatus is connected to the downhole apparatus by a conventional multiwire cable (seven electric wires make up the cable proper in this described embodiment). The electric power supply current of the downhle apparatus is transmitted by conductors of the cable, different from those used for the transmission of information. However, it is easily conceivable that the electric power supply current may be carried in the same wires used for information. In this case, a filter may be used at the input of the downhole modem. This particular form of cable is normally used in most logging operations. It should be pointed out, however, that the communication system described could also operate with a single wire cable by making some obvious modifications as would occur to those skilled in the art.

Referring to FIG. 3, it has been mentioned that the command signals 48 delivered by the surface controller 34 are NRZL coded. The surface modem 30 transforms these signals 48 into Bϕ-M coded signals 50 (FIGS. 3A and 3B). The signals 50 are then transmitted via the cable 20 from the surface modem 30 to the downhole modem.

The modulation used for transmitting the data signals from the tools to the surface is a phase modulation of the type known as "phase shift keying" or PSK. It may be noted that the Bϕ-M modulation used for the command signals does not employ a carrier, unlike the PSK modulation used for the data signals from the tools. FIG. 3A represents an NRZL coded signal 48. FIG. 3C shows the same signal NRZM coded (112) and FIG. 3D the same signal PSK modulated (114). According to the NRZM ("non-return to zero mark")code, the level of the signal is disregarded because the 1 bits are represented by a change in level in one or the other direction (increase or decrease in level) and the 0 bits are represented by the absence of a change in level. The PSK coded signals (FIG. 3D) are in fact signals obtained by means of a carrier wave (80 KHz) modulated by the NRZM coded signals in accordance with two phases for a 40 KHz modulation or four phases for an 80 KHz modulation. For a given passband, PSK modulation makes it possible to transmit the maximum amount of data.

The data signals transmitted by the tools are NRZL coded (FIG. 3A). These signals are then PSK modulated by the downhole modem before being sent on the cable to the surface modem. The latter then reconverts the PSK coded signals into NRZL coded signals.

Universal Interface

FIG. 12 represents schematically the universal interface designated by 66 in FIG. 8. This interface has a threshold circuit—e.g., a Schmitt trigger circuit—with thresholds $+\frac{1}{2}$ and $-\frac{1}{2}$. This circuit transforms the signal DS into a signal DC and into a signal DD (see FIG. 9). These two signals are applied to the input of an address recognition circuit 122 which may be a conventional shift register and decoding circuit. This address recognition circuit delivers an enabling signal to the input 124 of an "addressed circuit" 126 when the specific address of the interface has been recognized, and delivers an enabling signal to the input 128 of a "universal circuit" 130 when the universal address of all interfaces has been recognized. The circuit 122 also generates the Handshake signal (AR) which is supplied to the bus wire 76 (FIG. 8). The address circuit 126 stores the signal DD applied to its input 132 when a specific address is contained in the signal DS; the universal circuit 130 stores the signal DD when a universal address is contained in the signal DS. The signal DD is clocked in to the circuits 126 and 130 by the signal DC. The universal address and the specific address of the interface and, hence, the address of the tool, are chosen by appropriate wiring of the address recognition circuit 122. The addressed circuit 126 and the universal circuit 130 can, for example, be series-parallel buffer registers which are enabled to receive and store signals presented by the circuit 122 upon receipt of recognition signals at their respective inputs 124 and 128.

The contents of a down counter 134 are set at a value corresponding to the length of the message to be sent to the surface (bits of positions 0 through 5 in the instruction word 42 shown in FIG. 4). The counter receives clock pulses UC at its input 133, causing it to count down, and when its contents reach zero, the counter sends a signal to the input 136 of a "response circuit" 138, causing this circuit to deliver the "Return" signal to the bus wire 82 (FIG. 8). The values of the bits at positions 0 through 5 in the instruction word 42 (FIG. 4), indicating the number of words the tool must send, are copied in parallel from the addressed circuit 126 into the counter 134 via inputs 150 when the counter 134 receives an enabling pulse at its input 135 from the response circuit 138. The contents of the counter 134 appear in parallel at its outputs 152. When these outputs are all in a logic state 0, a signal appears at the input 136 of the response circuit to indicate the end of the message (Return signal).

As indicated by the arrows in FIGS. 8 and 12, the interfaces can both receive and transmit a Return signal. In fact, the Return signal is transmitted by an interface at the end of its message; i.e. when the contents of the counter 134 are zero. This Return signal is received by the downhole controller which, in turn, informs the downhole modem so that the latter terminates its message by sending an error code (58 in FIG. 6). The transmitted Return signal is also received by the other interfaces so that they do not transmit data on the bus as long as the interface which is transmitting has not finished its transmission. This operation is achieved by not authorizing, in the response circuit 138, the transfer of data from the terminal UD (input) to the terminal UD (output) unless the Return signal has been received on the Return terminal of the circuit 138. However, to prevent interruption of the operation of the remote telemetry system when an interface, which has transmitted data, does not send the Return signal (in the event of interface failure, for example), the downhole controller sends a Return signal at the end of the time corresponding to the maximum length of the message to be transmitted. This length is determined by the bits 7 through 12 (FIG. 7) of the status word generated by the downhole controller.

An "Echo" register 140 is a shift register making it possible to send to the surface apparatus the received instruction word 42 (FIGS. 2,4) of sixteen bits. This occurs when a signal appears on the "Echo" output of an AND gate 143, which corresponds to the zero logic state of instruction word bits 0 to 3, or 0 to 4, or 0 to 5, (FIG. 4) that otherwise indicate the length of the message. The "Echo" register receives the clock pulses UC on its input 141. The return to the surface is achieved by applying the sixteen-bit word in parallel to the sixteen inputs 142 of the register 140 when an "Echo" signal, coming from the AND gate 143, is applied to its input 144. The sixteen-bit word contained in the register 140 is then restored in serial form at the output 146 of the register 140 and applied to the response circuit 138 which sends it to the surface via its terminal UD (output). The "Echo" register 140 is used for checking the proper operation of the communication system by matching the instruction word sent by the surface apparatus with the instruction word received (the echo) by the surface apparatus.

The response circuit 138, which performs the multiplexing of the data transmitted by the tools, can be a conventional multiplexing circuit associated with a logic circuit that checks the sending of these data on the bus. A typical response circuit will be described below with reference to FIG. 12A.

The output signal DWDT of the addressed circuit 126 makes it possible to enter the data contained in the address circuit 126 in a series-parallel shift register (not shown) in order to temporarily store the second instruction word 40 (FIG. 2) left available to the operator. The output DWCK of the addressed circuit 126 delivers the clock pulses DWCK making it possible to control the storing of the instruction word 40 in the shift register mentioned above. The form and synchronization of the pulses DWCK are represented in FIG. 9. When the operator does not use the instruction word 40, this shift register is not necessary; otherwise, it must be added.

A reset signal (R) is delivered by the universal circuit 130 to the specific part 64 of the tool by the connection 69 (FIG. 8) when the communication system is started up and the bit position 8 of the universal instruction word (FIG. 5) has the value 1. This reset signal can be used, for example, for resetting the additional register mentioned above, or used by the operator, if desired, for storing the second instruction word 40.

An Enable signal appears on the Enable output of a flip-flop 149 when the interface is authorized to transmit data. This Enable signal is applied to the Enable input of the response circuit 138. The flip-flop 149 is a "D" type flip-flop, a conventional logic device which will be described in detail in connection with FIG. 12A. This flip-flop has four inputs; namely, "set" (S), "reset" (R) "D" and "Clock" (CK). The Enable signal is taken from the "Q" state output. The signals Enable 1 and Enable 2 are used as inputs to control the flip-flop 149. The Enable 1 signal is transmitted by the addressed circuit 126 when, in a specific address instruction word, the bit 8 is in the logic state 1 (FIG. 4). The two Enable 2 signals are delivered by the universal circuit 130 when, in a universal address instruction word, the bits 6 and 7 are in the logic state 1 (FIG. 5). That is, each of the Enable 2 signals represents one of the bits 6 and 7, respectively, as indicated by b6 and b7 in FIG. 12. The Enable 1 signal is applied to the D input of the flip-flop 149 and is clocked in by an enabling signal from the address recognition circuit 122. This is the same signal which is applied at the input 124 to the addressed circuit 126. The Enable 2 signals are applied to the S and R inputs of the flip-flop 149 through AND gates 147 and 145, respectively. The flip-flop 149 is set, via the AND gate 147, when both bits b6 and b7 are in the logic state 1. The flip-flop 149 is reset, via the AND gate 145, when the bit b6 is in the logic state 0 and the bit b7 is in the logic state 1. This is because the complementary state of the bit b6 is applied to an input of the AND gate 145.

A "Talk" signal is delivered by the response circuit 138 when the interface is transmitting data.

The data bits delivered by the specific part 64 of the tool (FIG. 8) are applied via the wire 67 to the terminal UD (Input) of the response circuit 138, and are delivered without modification by the response circuit but under the control of its logic circuit to its terminal UD (Output) which is connected to the bus wire 78 (FIG. 8).

The operating mode of the system, indicated by the bits of positions 4 and 5 of a universal instruction word (FIG. 5) (e.g., free-running or command-response mode) is communicated by the universal circuit 130 to the response circuit 138 via the wires 139.

When a specific-address instruction word reaches the interface, and hence when data are present in the addressed circuit 126, the response circuit receives a signal from the addressed circuit 126 via the wire 137.

On the outputs B4 and B5 of the addressed circuit 126 appear the bits in positions 4 and 5 of the instruction word of FIG. 4. The outputs B4 and B5 are electrically connected, respectively to the inputs b4 and b5 of two additional bit positions of the circuit (register) 126, if the bits in positions 4 and 5 are to be used for increasing the length of the message transmitted by the downhole apparatus (see FIG. 4). As noted above, the bits in positions 0 through 5 of the instruction word represented in FIG. 4 appear on the outputs 148 of the addressed circuit 126 and are applied to the inputs 150 of the down counter 134 in order to preset it to the length of the message to be transmitted by the interface. Unless the electrical connection is made between the terminals B4 and b4, and the terminals B5 and b5, the bit positions corresponding to the inputs b4 and b5 will remain in the logic state 0. It is these bit positions which are reflected by the signals at the outputs 148. The electrical connection may be implemented by manually actuated switches or by AND gates controlled from the surface by suitable commands.

At the output of the interface 66 (FIGS. 8 and 12) many signals are available on the connection wires 69. These signals are at the disposal of the operator because they can sometimes be used for purposes other than their specific purposes. For example, the logic states of the outputs B4 and B5 of the addressed circuit can be used for purposes other than indicating an extension in the length of the message when an extension is not necessary. The logic states appearing on the terminals 148 and 152 and indicating, respectively, the length of the message to be transmitted and the contents of the counter 134 can be used, for example, for selecting the memory, according to its capacity, of the specific part 64 when this specific part actually has one or more memories. The Enable signals (bits of positions 6 and 7 of an instruction word with a universal address—FIG. 5—and the bit of position 8 of an instruction word with a specific address—FIG. 4) which are used in particular for the detection of a defective tool, can be used for example to actuate a switch making it possible to switch in a component or a redundant circuit in place of the defective one. The preceding examples illustrate the utilization flexibility and the many possibilities of the downhole apparatus.

All the blocks of FIG. 12 represent conventional circuits known to those skilled in the art and do not require further explanation. The response circuit 138 can be readily devised by those skilled in the art with the aid of the preceding description of its operation. However, one of its possible embodiments is shown in detail in FIG. 12A.

In this figure is shown the down counter 134 of FIG. 12 with its inputs 133 and 135 receiving, respectively, the clock pulses UC and the logic signal transmitted by the response circuit 138. The output 136 of the counter transmits a signal, hereinafter called REQ (request), which is delivered to the response circuit 138. Also shown are the inputs 150 making it possible to preset the counter 134 at a given bit configuration representative of the length of the message to be sent by the interface.

The logic state of the signal REQ is 1 when the contents of the down counter 134 are different from zero. This means that the interface transmits or should transmit data. The signal REQ is in the state 0 if the contents of the counter 134 are zero. In this case, the interface does not transmit data. Moreover, the Talk signal (output of a flip-flop 198) is in the logic state 1 only when the interface transmits data. Thus, the Talk signal is conditioned by the signal REQ.

A flip-flop 197 which transmits a logic signal "Avail" (for Available) is used only in the command-response operating mode and is not used in the free-running mode.

The input terminal 139a is placed in the logic state 1 by the connection 139 from the universal circuit 130 when the system operates in the free-running mode (this is truly a state, as opposed to the transitory pulses applied at terminals 139b, 139c and 137a). The terminal marked "Return" transmits or receives the Return signal. The terminal 139b receives a signal whose logic value is 1 when a universal instruction to place the system in the free-running mode has been received by the universal circuit 130. The terminal 139c receives a signal whose logic value is 1 when the universal circuit 130 has received a universal instruction to place the system in the command-response operating mode. The terminal 137a receives from the addressed circuit 126 via the connection 137 a logic signal 1 when a specific-address instruction has been received by the interface.

An AND gate 121 has its input 123 connected to the terminal 139a and its input 125 connected to the Return terminal. Its output is connected to one input of an OR gate 119. Another input of this OR gate is connected to the terminal 139b and its third input is connected to the output of an AND gate 127 having one input 131 connected to the terminal 137a and the other input 129 connected to the terminal 139a through a complementary circuit (indicated, as is conventional, by a small circle at the input position). This small circle means that the gate in fact receives the complement of the logic state of the applied signal. Thus, if the logic signal applied to the terminal 139a is in the state 1, the input 129 of the gate 127 will be in the logic state corresponding to the complement of the logic state 1; i.e., the logic state 0. The output of the OR gate 119 is connected to the input terminal 135 of the counter 134.

The three inputs 196c, 196b and 196a of an OR gate 196 are connected respectively to the "Return", 139c and 139a terminals. The output of the OR gate 196 is connected to the terminal S of a flip-flop 197 of the type commonly designated as a "D" flip-flop. A flip-flop of the "D" type has four inputs: S, R and D which receive the data to be transmitted and CK which receives the clock pulses. The outputs are Q and $\overline{Q}$ (the line over Q indicating that the complementary logic state is involved). When a logic state 1 is applied to the input S, the output Q is set into the logic state 1, no matter what the logic state of the input D may be. When a logic state 1 is applied to the input R, the logic state of the output Q is set to 0 no matter what the logic state of the input D may be. If the inputs S and R are in a logic state 0, the logic state 1 or 0 applied to the input D appears on the output Q with each clock pulse applied to the input CK. The signal REQ transmitted at the output 136 of the counter 134 is applied to the input 155 of an AND gate 153. The second input 154 of this AND gate is connected to the output Q of the flip-flop 197, this output Q transmitting the Avail signal. The output of the AND gate 153 is connected to the input D of the flip-flop 197. The clock pulses UC are applied to the terminal indicated UC (Input) and are sent to the inputs CK of the "D" type flip-flops 197 and 198. The input D of the flip-flop 198 is also connected to the output of the AND gate 153. The output of the OR gate 119 is connected to the input 158 of an OR gate 156 whose second input 157 receives the complementary state of the logic signal REQ. The output of the OR gate 156 is connected to the input R of the flip-flop 198. The output Q of the flip-flop 198 delivers the Talk signal. This signal is sent to the input terminal 163 of an AND gate 159, and other input 161 of which receives the clock pulses UC. The input 175 of an OR gate 171 receives the complementary state of the signal REQ while its input 173 receives the complementary state of the logic signal applied to the terminal 139a. The output of the OR gate 171 is connected to one of the two inputs of an AND gate 177, the other input receiving the clock pulses UC. The output of the AND gate 177 forms the output of clock pulses, indicated in the figure by "UC (Output)". The output of the AND gate 159 delivers clock pulses UC which are carried to the input 141 of the Echo register 140 (FIG. 12), to the specific part 64 of the tools and to the input 133 of the counter 134. The complementary state of the logic signal Talk is applied to the input of a monostable circuit 179 which delivers a pulse at its output when the logic state of the Talk signal changes from 1 to 0. This output pulse is sent to the input 187 of an AND gate 183 which produces at its output the Return signal. The input 189 of the AND gate receives the Enable signal. The third input 185 is connected to the output of an OR gate 181, of which one input receives the logic signal "Last tool" (bit 6 of FIG. 4), while the other input receives a logic state complementary to that applied to the terminal 139a.

To one of the two inputs of an AND gate 191 is applied the "Echo" signal, and to the other is applied the signal transmitted by the output 146 of the Echo register 140 (FIG. 12); i.e., the signal composed of the bits of the message that the Echo register must send toward the surface. The complementary state of the Echo signal is applied to one of the two inputs of an AND gate 192, the other receiving the signal UD (Input); i.e., the data bits from the tools to be transmitted toward the surface. An OR gate 193 has one input connected to the output of the AND gate 191 and the other input to the output of the AND gate 192. The output of the OR gate 193 is connected to one of the two inputs of an AND gate 194, the other input of this AND gate receiving the signal Talk. The output of the AND gate 194 is connected to one of two inputs of an AND gate 195, the other input receiving the Enable signal. The output of the AND gate 195 forms the output terminal of the response circuit, indicated by "UD (Output)", which is connected to the bus wire 78 (FIG. 8).

The operation of the embodiment of the response circuit represented in FIG. 12A will first be described in connection with the free-running mode, and then the command-response operating mode.

In the free-running mode, the flip-flop 197 is not used. To accomplish this, the logic state 1 is applied at all times to the input S of this flip-flop and this results in the logic state 1 at its output Q. The Avail signal is thus always in the logic state 1 in the free-running mode. This is made possible by the fact that, when the downhole equipment receives a universal instruction to place it in the free-running mode, the logic state 1 is applied to the terminal 139a and hence to the input 196a of the gate 196. The result is that the input S of the gate 197 is in the logic state 1. Then, a universal instruction is sent by the surface controller so that a pulse appears on the terminal 139b which, for all the interfaces of the downhole equipment, places the output of the OR gate 119 in the logic state 1 (through the center input). The result is that the length of the message indicated by the values of the data bits applied to the inputs 150 of the counter 134 are taken into account by the counter. In other words, the contents of the counter are preset at the length of the message to be sent.

Furthermore, the output 136 of the counter 134, and hence the signal REQ, is in the logic state 1. This state, which is also that of the output of the OR gate 119, is thus applied to the input 158 of the AND gate 156, thus placing the input R of the flip-flop 198 in the logic state 1. The output Q of this flip-flop (Talk signal) is thus in the logic state 0. It should be noted that this is a transient, rather than continuous state because the signal applied to the terminal 139b is a pulse. Thus, the output Q of the flip-flop 198, and hence the Talk signal, goes over to the logic state 1 when the logic state of the signal REQ is 1 and when the logic state of the signal "Avail" is 1, in synchronism with the clock pulses UC applied to the input CK.

With the system operating in the free-running mode (logic state 1 being applied at all times to the input 139a), the input 173 of the AND gate 171 is in the logic state 0. The same is true of its input 175 since this input receives the complementary state of the signal REQ. Hence, the output of the OR gate 171 is in the logic state 0, thus making the AND gate 177 nonconducting. The clock pulses UC applied to the input of the interface designated "UC (Input)" thus do not appear at the output "UC (Output)"; the following interface hence does not receive clock pulses. On the other hand, because the logic level of the signal REQ change from the state 1 to the state 0 when the contents of the counter 134 reach the zero value, the logic state 1 appears at the output of the OR gate 171, thereby making the AND gate 177 conduct. The result is that, as soon as the contents of the counter 134 reach the zero value, the clock pulses UC are transmitted to the following interface.

When the logic state of the signal REQ and of the Avail signal is 1, the Talk signal goes over to the logic state 1 with each clock pulse applied to the input CK of the flip-flop 198. The result is that the AND gate 159 begins to conduct and the clock pulses UC are transmitted to the input 133 of the counter 134, allowing the latter to operate. The clock pulses are also supplied to the input 141 of the Echo register 140 and to the specific part 64 of the tool.

As long as the counter 134 operates (counts down) while receiving clock pulses, the Talk signal remains in the logic state 1. The result is that the AND gate 194 conducts, either for the message contained in the Echo register (from line 146) when the Echo signal is in the logic state 1, or for the signal UD (data bits) coming from the specific part 64 of the tool when the Echo signal is in the logic level 0. The Enable signal applied to one of the two inputs of the AND gate 195 makes this gate conduct, either for the Echo message or for the signal UD. At the output of the AND gate 195, one thus obtains both the signal UD coming from the tools and the message stored in the Echo register, but not simultaneously.

When the contents of the counter 134 reach the value 0, the signal REQ goes over to the logic state 0. The result is that, through the OR gate 156, the Talk signal changes to the logic state 0.

When the Talk signal passes from the logic state 1 to the logic state 0, the monostable circuit 179 delivers a pulse which is applied to the input 187 of the AND gate 183. If the interface under consideration is that of the last tool of the chain formed by the tools which transmit data successively, the logic state 1 appears at the "Last tool" terminal forming one of the two inputs of the OR gate 181. In this case, the logic state 1 appears at the input 185. Hence, when the last tool of the chain has finished transmitting its data (logic state of Talk signal going from 1 to 0), the logic state 1 appears on the output of the AND gate 183. This state 1, constituting the Return signal, is applied to an input of the controller of the downhole apparatus which then stops sending further clock pulses. Moreover, the Return signal is received by all the other interfaces of the system with the result that all the AND gates 121 of the interface begin to conduct, and hence the logic state 1 appears at the output of all the OR gates 119 and on the inputs 158 of the OR gates 156. The Talk signal is thus placed back in the logic state 0 in each interface. Similarly, the values of the bits applied to the inputs 150 of the counter 134 in each interface are taken into account when the logic state 1 appears on the input 135. Thus, when a cycle of data transmission in the free-running mode is completed, the system is immediately reset to the initial condition. It will be noted that, when a tool has been inhibited, which corresponds to the logic state 0 of the Enable signal, the AND gate 183 is never conducting and a Return signal is not sent by the interface.

The operation of the embodiment of the response circuit 138 represented in FIG. 12A will now be described for the situation when the system operates in the command-response mode. In this case, the AND gate 121 is not used. On the other hand, the flip-flop 197 is used. A universal instruction is sent by the surface controller so as to place the system in the command-response operating mode. The logic state 1 then appears on the input terminal 139c. This universal instruction has the effect of placing all the interfaces in an initial condition. In particular, the logic state of the signal REQ is set to 0 by the application of the logic state 1 on the input 151 of the counter 134. The Avail signal is set to the logic state 1 by means of the OR gate 196 (state 1 being applied on input S of flip-flop 197) and, hence, the Talk signal is placed in a logic state 0 (since REQ is 0 and the Avail signal is 1). In addition, the logic state of the terminal 139a is maintained at 0 since the system operates in the command-response and not in the free-running mode. The result is that the logic state 1 is applied to the input 173 of the OR gate 171, making the AND gate 177 conduct so that the clock pulses UC pass continuously, in the command-response mode, from the terminal "UC (input)" to the terminal "UC (output)". All the interfaces thus receive clock pulses.

To address a particular tool, a specific instruction is then sent which contains the address of the interface of the tool. In this case, a message is introduced into the addressed circuit 126 (FIG. 12) and a signal is delivered to the response circuit 138 by the connection 137. In FIG. 12a, this signal is equivalent to placing the terminal 137a in the logic state 1. The AND circuit 127 hence begins to conduct for the duration of this logic state 1. This state is applied to the input 135 of the counter 134. The length of the message to be sent to the surface by the interface, determined by the value of the bits applied to the inputs 150 of the counter 134, is then taken into account in the counter. Furthermore, the signal REQ is placed in the logic state 1. The result is that the Talk signal is set into the logic state 1 when each clock pulse UC reaches the input CK of the flip-flop 198. The interface can then transmit data. As in the free-running mode, the state 1 of the Talk signal permits the clock pulses UC to be transmitted to the Echo register and the specific part 64 of the tool. The pulses UC are also applied to the input 133 of the counter 134, thus allowing the latter to count. The bits making up the message that the interface must send to the surface (in this case, the data bits coming from the specific part of the tool) which are applied to the gate 191 when the Echo signal is in the logic state 1 or to the gate 192 when the Echo signal is in the logic state 0 are carried through the gates 193, 194 and 195 to the output terminal "UD (Output)".

When the contents of the counter 134 reach the zero value, the Talk signal goes from a logic state 1 to a logic state 0. The monostable circuit 179 then sends a pulse which goes through the AND gate 183. The input 185 of this AND gate is in a logic state 1 (as this is not the free-running mode, the OR gate 181 is in the logic state 1) and the Enable signal is in the logic state 1. A Return signal is then transmitted by the interface, this signal being received by all the interfaces and by the downhole controller.

If a second interface receives a specific instruction when a first interface is transmitting data, this instruction has the effect of placing the signal REQ of the second interface in the logic state 1. However, the Avail signal at the output Q of the flip-flop 197 is in the logic state 0 as is also the case for the Talk signal. When the first interface has finished sending data, the Return signal is received by the second interface thereby placing the input 196c and the output of the OR gate 196 in the logic state 1 and making the Avail signal go to the logic state 1. The result is that this second interface can then transmit data at its output terminal "UD (Output)".

Downhole Controller

FIG. 13 represents schematically an embodiment of the downhole controller 24. As explained above in connection with FIG. 10 the downhole modem 22 receives the command messages coming from the surface and sends them to the downhole controller in the form of signals MDD and MDC. These two signals, MDD and MDC, are applied to the two inputs of a thirty-two bit series-parallel buffer register 160. The binary information contained in the signal MDD is shifted into the register 160 with the aid of the clock signal MDC when this register is enabled by the presence of the "Message" signal (see FIG. 10) received from the downhole modem. When the register 160 is full of data (defining two instruction words each 16 bits in length), the clock and data signals at its output 162 are applied in parallel to an address recognition circuit 164. When the address contained in the instruction word 42 (at bit positions 9–15) is a universal address, an enabling signal is applied to the input 165 of a universal data memory 166 and the signal MDD is stored in this memory 166. Similarly, when the address recognized by the circuit 164 is a specific address of one of the tools, an enabling signal is applied to the input 167 of a memory 168 called the "Controller addressed data memory" so that the signal MDD is stored in this memory 168. The address recognition circuit 164 can be a conventional decoding circuit having outputs for enabling the two memories 166 and 168, respectively. The signal stored in the universal data memory 166 is used for selecting the type of dialog utilized by the communication system (from bits 4 and 5 of the instrution word, FIG. 5); for example, command-response, free-running or pseudo free-running. The contents of the memory 166 are applied to the input 169 of a response program circuit 170 which controls the dialog between the downhole modem and the downhole controller. To accomplish this, the circuit 170 receives the signals MUC, "Meassage" and "Ready to Transmit" from the downhole modem. The signal MUC is transformed into a signal UC, as already explained in connection with FIG. 11. The circuit 170 delivers to the downhole modem the "Run" and "Return Status" signals and delivers clock pulses UC' to a multiplexing circuit 178, to a counter 180 and to a status register 176. The clock pulses UC', obtained from the clock pulses MUC as indicated with refrence to FIG. 13B, operate the circuits 176, 178 and 180. The response program circuit 170 also receives, at its input 172, an enabling signal transmitted by a state detection circuit 174, which checks the proper operation of the system and indicates any faults, as well as the presence of the "Return", "Return Status" and "Handshake" signals. The state detection circuit 174 receives at its inputs the "Return" and "Handshanke" signals from bus wires 82 and 76, respectively, as well as "Message", "Signal Level", "Transmission Error" and "Universal Instruction" signals. It also receives the "Run" signal. The purpose of these signals has already been explained. It was stated, in particular, that the message transmitted by the downhole apparatus (FIG. 6) has a status word (FIG. 7). The status (validity or not) of the different signals received by the state detection circuit 174 is recorded in the status register 176, which can be a parallel-series register loaded by the state detection circuit 174. This register delivers a status signal to the multiplexing circuit 178 which also receives the signal via the bus wire 78 from the interfaces of the tools. The multiplexing circuit delivers the MU data (MUD) signals and the status signal to the downhole modem.

The addressed data memory 168 supplies to the counter 180 the length of the message to be sent to the surface. A combination circuit 182 delivers the three-level signal DS (FIG. 9) to the bus wire 74. The signal DS is generated by combining the signals MDD and MDC delivered by the downhole modem. The signal DS is delivered only if the "Message" signal is in a logic state 1 at the input 184 of the combination circuit 182 and if the state detection circuit 174 delivers an enabling signal to the input 186 of the combination circuit 182.

The operation of the downhole controller represented in FIG. 13 may be understood by referring to FIGS. 7, 9, 10 and 11. The state detection circuit 174 generates the bits of positions 0, 1, 2, 3, 6 and 15 of the status word (FIG. 7) which are applied to the input of the status register 176. The status register transmits them to the input 188 of the multiplexing circuit 178 in synchronism with the clock pulses UC'. The response program circuit 170 generates the pulses UC' from the pulses MUC if the "Run" and "Ready to Transmit" signals are present simultanesouly (see FIG. 11) and supplies these pulses to both the status register and the multiplexing circuit 178. When the downhole apparatus wishes to send a message to the surface, the response program circuit 170 sends the "Run" signal to the downhole modem to indicate that the controller has a message to deliver. In this case, the downhole modem first sends the synchronization word 52 (see FIG. 6) to the surface and then sends the "Ready to Transmit" signal to the response program circuit 170. The controller therefore knows that the modem is ready to transmit the data. The multiplexing circuit 178 first sends the status word (54 in FIGS. 6 and 7) to the downhole modem. Thereafter the multiplexing circuit 178 sends the pulses UC on the bus wire 80 to the different interfaces of the tools so as to sample the data. The signal UD then appears from the bus wire 78 at the input of the multiplexing circuit 178 which transmits the signal MUD to the downhole modem (FIG. 11). When the counter 180, which counts down at the rate of the pulses UC' from a value corresponding to the maximum length of the message to be transmitted (delivered by the addressed data memory 168), reaches the zero value, it sends a signal to the input 190 of the response program circuit 170. This signal, or the "Return" signal sent by the interfaces to the state detection circuit 174 and applied to the input 172 of the response program circuit, then stops the multiplexing circuit 178 which discountinues sending data. The response program circuit 170 then makes the "Run" signal change from a logic state 1 to a logic state 0 and the downhole modem makes the "Ready to Transmit" signal change from a logic state 1 to a logic state 0. When the state detection circuit 174 does not detec the Handshake signal, while a message coming from the surface has been recognized, it sends a signal to the input 172 of the response program circuit 170 which actuates the multiplexing circuit 178 so that the downhole modem transmits only a shortened message; i.e., a message composed only of the synchronization code, the status word and the error code (the data words not being sent) in the command-response mode only.

The downhole controller can advantageously comprise a microprocessor associated with a memory, but such a microprocessor is not necessary for the practice of the present invention. The microprocessor can, for example, be placed at the input of the downhole controller; i.e., between the downhole modem and the controller. The microprocessor can be used for different tasks. The command messages coming from the surface can be stored in the memory associated with the microprocessor. The latter can then transfer the command messages to the controller in accordance with the availability of the controller. This operation is particularly interesting notably when the system operates in the command-response mode and when the command signals are longer than the data signals. As the frequency of the tool sampling clock pulses (80 KHz) are higher than that used for the command messages (20 KHz), there are time intervals during which the downhole apparatus does not transmit data. A microprocessor and its associated memory permit the command messages to be addressed to the downhole controller as soon as possible. In the free-running mode, the instant of response of a tool is determined by its position in the tool chain. By means of a microprocessor, the order of response of the tools can be independent of their respective position in the chain and can be determined easily by software. In addition, the microprocessor can preprocess the tool data so as to reduce the quantity of data to be sent to the surface.

Figure 13A:
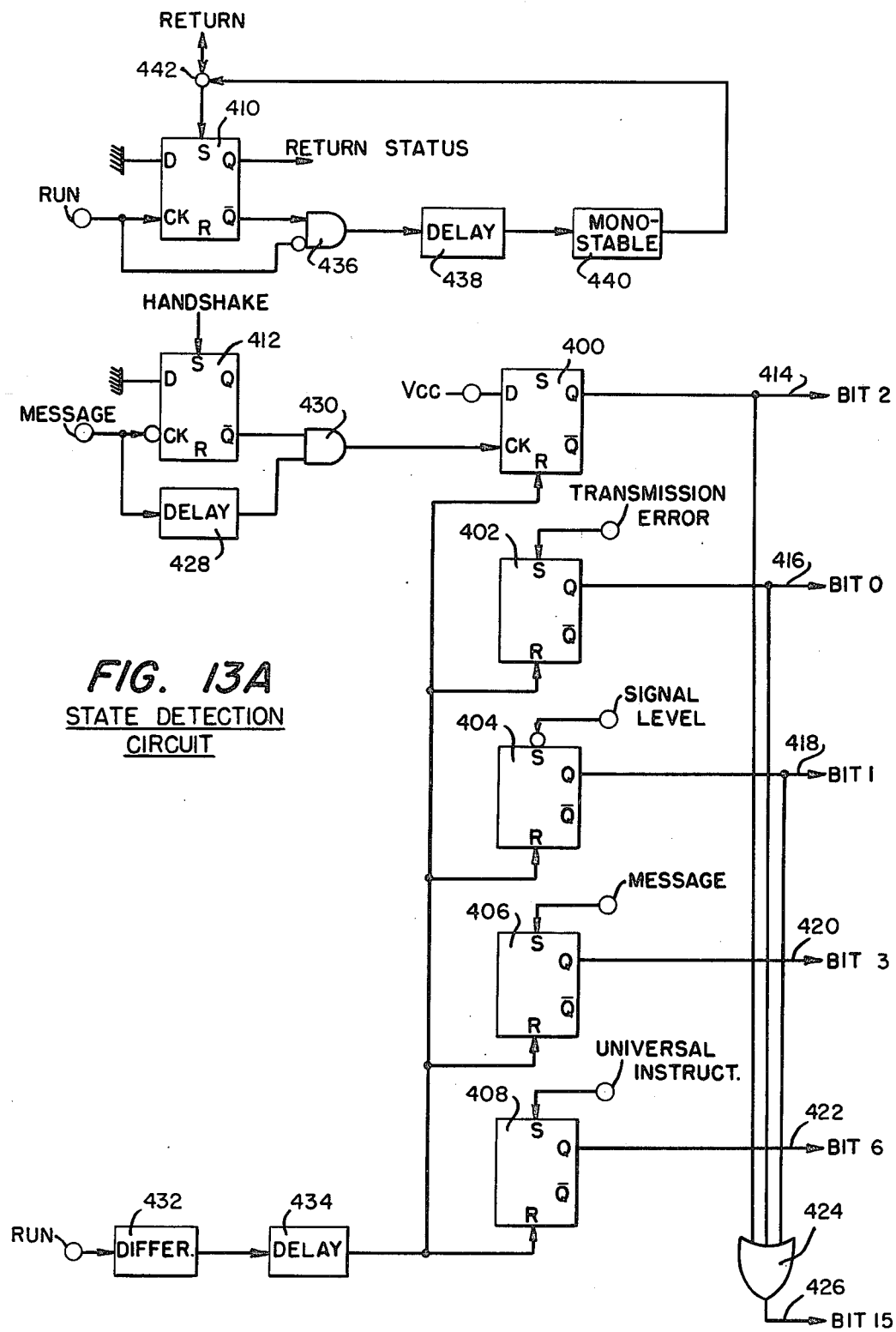

The diagram of the downhole controller given in FIG. 13 and the preceding explanations are believed to be sufficient to enable anyone skilled in the art to devise suitable apparatus in conformity with the present invention. However, particular embodiments of the state detection circuit 174, the response program circuit 170 and the multiplexing circuit 178 are described below with reference to FIGS. 13A, 13B and 13C.

FIG. 13A repesents a particular embodiment of the state detection circuit 174 of the downhole controller. In this figure, the references 400 to 412 represent flip-flips of the "D" type. The flip-flops 400 to 408 are used as memories.

When a message is sent from the surface to the downhole modem the status of the parity bits of the message are detected by this modem to determine whether there is a transmission error. The modem transmits the "Transmission Error" signal which is in logic state 1 in case of error and in logic state 0 in the opposite case. This signal is applied to the input S of the flip-flop 402 thereby making the output Q of this flip-flop go to the logic state 1 when "Transmission Error" is in logic state 1. The logic state of the output Q constitutes the bit of position 0 of the status word 54 represented in FIGS. 6 and 7.

Similarly, the amplitude of the signal coming from the surface apparatus is scanned at all times by the downhole modem which transmits a logic signal called "Signal Level" to the downhole controller. Its logic state is 1 when the amplitude of the received message is sufficient and 0 in the opposite case. The complementary state of the logic signal "Signal Level" is applied to the input S of the flip-flop 404. The output Q of this flip-flop is in the logic state 1 when the amplitude of the received message is not sufficient. The logic state of the output Q constitutes the bit of position 1 in the status word.

Likewise, the "Message" and "Universal Instruction" logic signals are applied to the inputs S of the flip-flops 406 and 408, respectively. If a "Message" signal has been received, the output Q of the flip-flop 406 is in the logic state 1. The logic state of this output constitutes the bit of position 3 in the status word. Similarly, for the flip-flop 408, the arrival of a "Universal Instruction" signal places its output Q in logic state 1. The logic state of this output Q constitutes the bit of position 6 in the status word.

The three outputs Q of the flip-flop 400, 402 and 404 are connected to the three inputs of an OR gate 424. The logic state of the output 426 of this gate constitutes the bit of position 15 in the status word.

The outputs 414–422 and 426 are connected in parallel to the status register 176 of FIG. 13. This register, which is in a parallel-series register, forms the status word of FIG. 7 in serial form apart from the bits indicating the message length sent by the downhole apparatus and the bits indicating the operating mode of the system. The latter two bits reach the multiplexing circuit 178 directly through the universal memory 166 and the response program circuit 170.

Referring again to FIG. 13A, the flip-flop 412 detects the Handshake signal and the flip-flop 400 stores the result of this detection. The complementary state of the "Message" logic signal is applied to the CK clock input of the flip-flop 412, the input D of this flip-flop being connected to the ground which is equivalent to placing it in logic state 0. The Handshake signal is applied to the input S of this flip-flop 412. The output $\overline{Q}$ of the flip-flop is connected to one of the two inputs of an AND gate 430, the other input receiving the "Message" signal through a delay circuit 428. The output of the AND gate 430 is connected to the clock pulse input CK of the flip-flop 400. The input D of this flip-flop is connected to a predetermined voltage level $V_{cc}$ so that this input is in the logic state 1. When the "Message" signal does from the state 1 to the state 0 (transition 92 in FIG. 10), the output $\overline{Q}$ of the flip-flop 412 goes to logic level 1, when no Handshake signal of logic state 1 has been applied to the input S of the flip-flop 412. On the other hand, the Handshake signal of logic state 1 places the output $\overline{Q}$ in logic level 0. The transition from state 0 to state 1 of the Handshake signal occurs about one hundred and fifty microseconds after the logic state of the "Message" signal has gone from 1 to 0. The delay circuit 428 is then used to delay the "Message" signal by about three hundred microseconds. In this case, if the Handshake signal of logic state 1 has reached the input S of the flip-flop, the AND gate 430 does not conduct. On the other hand, if a Handshake signal has not been received, the AND gate 430 conducts and the result is that the output Q of the flip-flop 400 goes to the logic state 1, thereby recording the fact that there has been an unrecognized message; i.e., that no Handshake signal has been transmitted.

Before sending each message through the downhole apparatus, when the logic level of the "Run" signal changes from the value 0 to the value 1, the values of the logic states of the outputs 414 to 422 are stored in the status register 176. Shortly thereafter, the resetting of the flip-flops 400 to 408 is carried out differentiating the rising edge of the "Run" signal by means of a differentiation circuit 432. The differentiated signal is then applied via the delay circuit 434 to the inputs R of the different flip-flops.

The circuit including the flip-flop 410 makes it possible to generate the "Return" signal by the downhole controller itself when the last tool to send data has not sent a "Return" signal. For this purpose, the "Run" signal is sent to the clock input CK of flip-flop 410, the input D of this flip-flop being held at the logic level 0 and the input S receiving the "Return" signal. The logic state of the output Q of the flip-flop 410 constitutes the "Return Status" signal applied to the input 172 of the response program circuit 170 (FIG. 13). This signal is made up of the bit in position 1 of the error code 58 of FIG. 6. The output $\overline{Q}$ of the flip-flop 410 is connected to the input of an AND gate 436, the other input of this gate receiving the complementary state of the "Run" signal. The output of the AND gate 436 is connected, via a delay circuit 438, to a monostable circuit 440 whose output is connected to the terminal 442 for the reception or transmission of the "Return" signal.

The logic state of the output Q of the flip-flop 410 is 0 when the "Run" signal is in logic state 1, provided however that a "Return" signal of logic level 1 has not been applied to the input S of the flip-flop 410. On the other hand, if such a "Return" signal has been received, the output Q is in logic state 1 and the output $\overline{Q}$ is in the logic state 0. The result is that the AND gate 436 does not conduct.

On the other hand, if $\overline{Q}$ is in the logic state 1, and hence is there has been no "Return" signal of level 1, the gate 436 begins to conduct when the logic level of the "Run" signal goes from 1 to 0. This triggers, with a delay set by 438, the monostable circuit 440 which sends a pulse of logic level 1 constituting the "Return" signal. It is necessary to introduce a delay via 438 before generating the missing "Return" signal because, when the "Return" signal is normally transmitted by the tools, it is this "Return" signal which makes the logic state of the "Run" signal go from 1 to 0 (see the timing of these signals indicated by 100 and 108 in FIG. 11).

FIG. 13B represents a particular embodiment of the response program circuit 170 of FIG. 13. The logic state of the "message" signal is applied to one of the two inputs of an AND gate 451, the other input receiving the complementary state of the "Universal Instruction" signal. The complementary logic state of the output of the gate 451 is applied to the input 450 of a differentiation circuit 452 whose output is connected to one of the two inputs of an AND gate 454. The other input 456 of this AND gate receives the "Command-Response" signal. The output of the AND gate 454 is connected via a delay circuit 458 to an OR gate 460. The "Free-Running" signal is sent to another input of this OR gate 460 after having been differentiated by a differentiation circuit 462. The OR gate 460 also receives on one of its inputs the output signal from an AND gate 464. One of the two inputs of this AND gate is connected to receive the "Free-Running" signal while the other receives the "Return" signal. Finally, the last input of the OR gate 460 receives the output signal from an AND gate 466. One of the two inputs of this AND gate receives the "Pseudo Free-Running" signal and the other input receives a signal applied to the terminal 468. This signal is characteristic of an event making it possible to trigger the response program circuit 170. The output of the OR gate 460 is connected to the input S of a flip-flop 470 whose output Q is connected to the input D of a flip-flop 472. The output Q of the flip-flop 472 is connected to the input 474 of an OR gate 476 whose output is connected to the input D of a flip-flop 478. The flip-flops 470, 472 and 478 are of the "D" type. The output Q of the flip-flop 478 delivers the "Run" logic signal. This output is also connected to the input 480 of the OR gate 476 as well as to the clock pulse input CK of the flip-flop 470. The latter has its input D connected to ground, which is equivalent to placing it in logic state 0. The clock pulses MUC coming from the downhole modem are applied to the clock inputs CK of the flip-flop 472 and 478 as well as the input 482 of an AND gate 484. The second input of this gate receives the "Run" signal from the flip-flop 478. The output of the AND gate 484 is connected to one of the two inputs of an AND gate 486, the other of which receives the "Ready to Transmit" signal. The output of the AND gate 486 delivers the clock pulses UC'. The input R of the flip-flop 478 is connected to the output 488 of an OR gate 490 which receives the "Universal Instruction" signal on its input 492; the "Return" signal on its input 494; the complimentary state of the contents—zero or not zero—of the counter 180 on its input 496; and the logic state of the output of the AND gate 500 on its input 498. The counter 180 produces an output signal in the logic state 1 whenever the counter contents do not equal zero. This output signal, which goes to zero when the counter contents equal zero, is complemented at the input 496 of the OR gate 490. The AND gate 500 receives on its input 502 the "Command-Response" logic signal; on its input 504 a complementary logic state characterstic of the absence of the Handshake signal and, finally, on its input 506 the complementary state of the "Stat" signal. The "Stat" signal is in logic level 1 when the status word is being sent by the downhole controller to the surface and in the logic level 0 when the status word has been sent to the surface.

The operation of the embodiment represented in FIG. 13B is as follows: In the command-response operating mode, the response program circuit 170 makes the "Run" signal go from logic state 0 to logic state 1 each time the surface apparatus sends a specific instruction; i.e., an instruction which is not universal. Each time the downhole modem sends a "Message" signal, when it has recognized the synchronization word of a command message, one obtains at the output of the AND gate 454 the logic state 1 which is then found also at the output of the OR gate 460. This logic state, which is applied to the input S of the flip-flop 470, makes the output Q of this flip-flop go to logic level 1. This logic level then also appears on the output Q of the flip-flop 472, the latter serving only to create a given delay. At the input 474 of the OR gate 476 is thus applied to logic state 1 which makes the output 0 of the flip-flop 478 go to logic level 1 in synchronism with the clock pulses MUC applied to the input CK of the flip-flop 478. One thus obtains the "Run" signal. The latter is applied to the input CK of the flip-flop 470 which produces a logic state 0 at its output Q. It will be noted that, in the absence of the OR gate 476—i.e., if the output Q of the flip-flop 472 were connected directly to the input D of the flip-flop 478—the output Q of the flip-flop 478 ("Run" signal) would be reset immediately to the logic level 0 as soon as it changed over to logic level 1. However, the "Run" signal which is applied to the input 480 of the OR gate 476 remains in logic level 1 in spite of the fact that the output Q of the flip-flop 470 goes over to logic level 0. The logic state of the "Run" signal comes back to 0 when the logic level 1 is applied to the input R of the flip-flop 478. The output Q of the flip-flop 478 thus remains in logic state 1 for the time interval during which the downhole controller transmits data to the downhole modem.

The logic level of the "Run" signal comes back to 0 for several reasons. First of all, the status word having been sent and the systems operating in the command-response mode, the inputs 506 and 502 of the flip-flop 500 are in logic state 1. If the Handshake signal has not been delivered (output 414, FIG. 13A), the AND gate 500 conducts. The logic state 1 then appears at the input 498 of the OR gate 490 and the result is that the output Q of the flip-flop 478 goes to logic level 0. This corresponds to the fact that, as already explained, the downhole apparatus sends a shortened message, in the command-response mode only, when the Handshake signal has not been transmitted. The other reasons for the logic level of the "Run" signal to become 0 are the arrival of a "Universal Instruction" signal sent by the surface apparatus, applied to the terminal 492 and coming from the universal data memory 166; the transmission of the "Return" signal applied to the input 494; and the zero condition of the contents of the counter 180 (FIG. 13); i.e., when the maximum length of the message to be sent to the surface has been reached.

It will be noted that this embodiment allows the surface apparatus to transmit to the downhole apparatus a new transmission request while a transmission is in progress, in the command-response mode. In fact, this new transmission request results in the appearance of the "Message" signal on one of the two inputs of the AND gate 451 and the output Q of the flip-flop 470 changes to logic state 1. The result is that the output Q of the flip-flop 472 changes to logic level 1. As soon as the "Run" signal goes to logic level 0, the logic state 1 of the output Q of the flip-flop 472, applied to the input D of the flip-flop 478, immediately makes the "Run" signal go to the logic level 1. The new transmission request is then eliminated because the output Q of the flip-flop 470 goes to the logic level 0 whereas the "Run" signal remains in logic level 1.

It will be noted that the response program circuit 170 delivers clock pulses UC' when the clock pulses MUC coincide with the logic state 1 of the "Run" signal and when the "Ready to Transmit" signal generated by the downhole modem is in the logic state 1. These clock pulses UC' are used for operating the counter 180, the status register 176 and the multiplexing circuit 178 of the downhole controller. To transmit the data coming from the interfaces of the tools, only the clock pulses UC are used, as already mentioned. The reason for this difference in clock pulses is that, when the status register transmits the status word, the interfaces must not send data simultaneously.

In the free-running mode, the AND gate 454 and the AND gate 466 do not conduct. The differentiation circuit 462 delivers a pulse when a data transmission request has been made in the free-running mode. This results in a logic state 1 of the input S of the flip-slop 470 and hence, as in the command-response mode, the logic state 1 on the output Q of the flip-flop 478. This logic state becomes 0, as in the previous case, upon the arrival of a universal instruction, upon the reception of the "Return" signal and when the contents of the counter 180 go to zero. It will be noted that the AND gate 500 is not used in the free-running mode. Upon the arrival of a "Return" signal applied to the input 494 of the AND gate 490, the output Q of the flip-flop 478 changes to the logic level 0. However, this "Return" signal is also applied to one of the two inputs of the AND gate 464. This causes the appearance of the logic level 1 on the input S of the flip-flop 470 and the output Q of the flip-flop 478 again changes to the logic level 1, however with a slight delay, created by the flip-flop 472. In the free-running mode, the downhole equipment thus transmits data continuously until the arrival of a universal instruction at terminal 492 of the AND gate 490.

In the pseudo free-running mode, the AND gates 454 and 464 do not conduct and the differentiation circuit 462 does not deliver pulses. On the other hand, the output of the AND gate 466 goes to the logic level 1 when an event called "triggering event" occurs. This event triggers the transmission since it makes the output Q of the flip-flop 478 go to the logic state 1. This event can be, for example, a universal instruction which places the system in the pseudo free-running mode. In this case, the AND gate 466 need not be used because the logic signal (pseudo free-running) could be applied directly to the input of the OR gate 460. However, the event which triggers the transmission can also be something other than a universal instruction; its choice is made by the user of the system. For example, this event can be the passage to zero of the amplitude of the AC current supplying the circuits, or the end of the transmission of data from a particular tool, such as a sonic type tool.

FIG. 13C represents a particular embodiment of the multiplexing circuit 178 of FIG. 13. This multiplexing circuit includes a down counter 520 whose contents can be initially predetermined by applying to its input 522 a logic signal characteristic of a given message length. The handling of this message length by the counter is accomplished by placing its input 524 at the logic level 1. The logic signal applied to this input 524 is the complement of the "Run" signal. The output 528 of this counter delivers the "Stat" logic signal which takes on the logic value 1 during the sending of the status word by the downhole controller to the downhole modem. This output 528 is also connected to the input 550 of an AND gate 546 whose output is connected to the clock pulse input 526 of the counter 520. The other input 548 of the AND gate 546 receives the clock pulses UC'. These pulses are also applied to the input 554 and of an AND gate 552 which also receives on its input 556 the complementary state of the Stat logic signal delivered at the output 528 of the counter 520. The output of the AND gate 552 delivers the clock pulses UC sent to interfaces for the transmission of data coming from the tools. The output 528 of the counter 520 is also connected to the input 534 of an AND gate 532, the other input 530 receiving the bits making up the status word and being connected to the status register 176. An AND gate 540 receives on its input 536 the complementary state of the Stat logic signal from the output 528 of counter 520. Its other input 538 receives the data bits UD coming from the interfaces of the tools. The output of the AND gate 540 is connected to one of the two inputs of an OR gate 542, the other input being connected to the output of the AND gate 532. The output of the OR gate 542 delivers the data bits MUD as well as the bits making up the status word and sends these to the downhole modem.

To describe the operation of the multiplexing circuit 178, it is useful to recall that this circuit sends to the downhole modem first the status word (54 in FIG. 6) and then the data words (56 in FIG. 6). The contents of the down counter 520 are preset at the value corresponding to the number of bits making up the status word (16 in the base 10). This value is stored in the counter upon the application of the "Run" signal of logic value 1 to the input 524. The output 528 of the counter then takes on the logic value 1 which is applied to the input 550 of the AND gate 546. With each clock pulse UC', the logic level 1 is applied to the input 526 of the counter which then decrements one unit from its contents. The input 534 of the AND gate 532 being in logic level 1, this gate will allow the passage of the bits making up the status word and applied to its input 530. The status word is then transmitted by the OR gate 542. During this time interval, the input 556 of the AND gate 552 is at the logic level 0. The clock pulses UC therefore do not reach the interfaces of the tools and consequently the latter can not transmit data. When the contents of the counter 520 reach the zero value—i.e., at the end of the transmission of the status word—the output 528 of the counter takes on the logic value 0. The AND gates 532 and 546 are then nonconducting. On the other hand, the AND gate 552 conducts for the clock pulses UC'. The result is that the clock pulses UC reach the interfaces of the tools which can then transmit data. The data bits UD are applied to the input 538 of the AND gate 540, the input 536 of this gate being at the logic level 1. The data UD then go through the AND gate 540, the OR gate 542 and are sent as data bits MUD to the downhole modem.

Surface Modem and Downhole Modem

Figure 14:
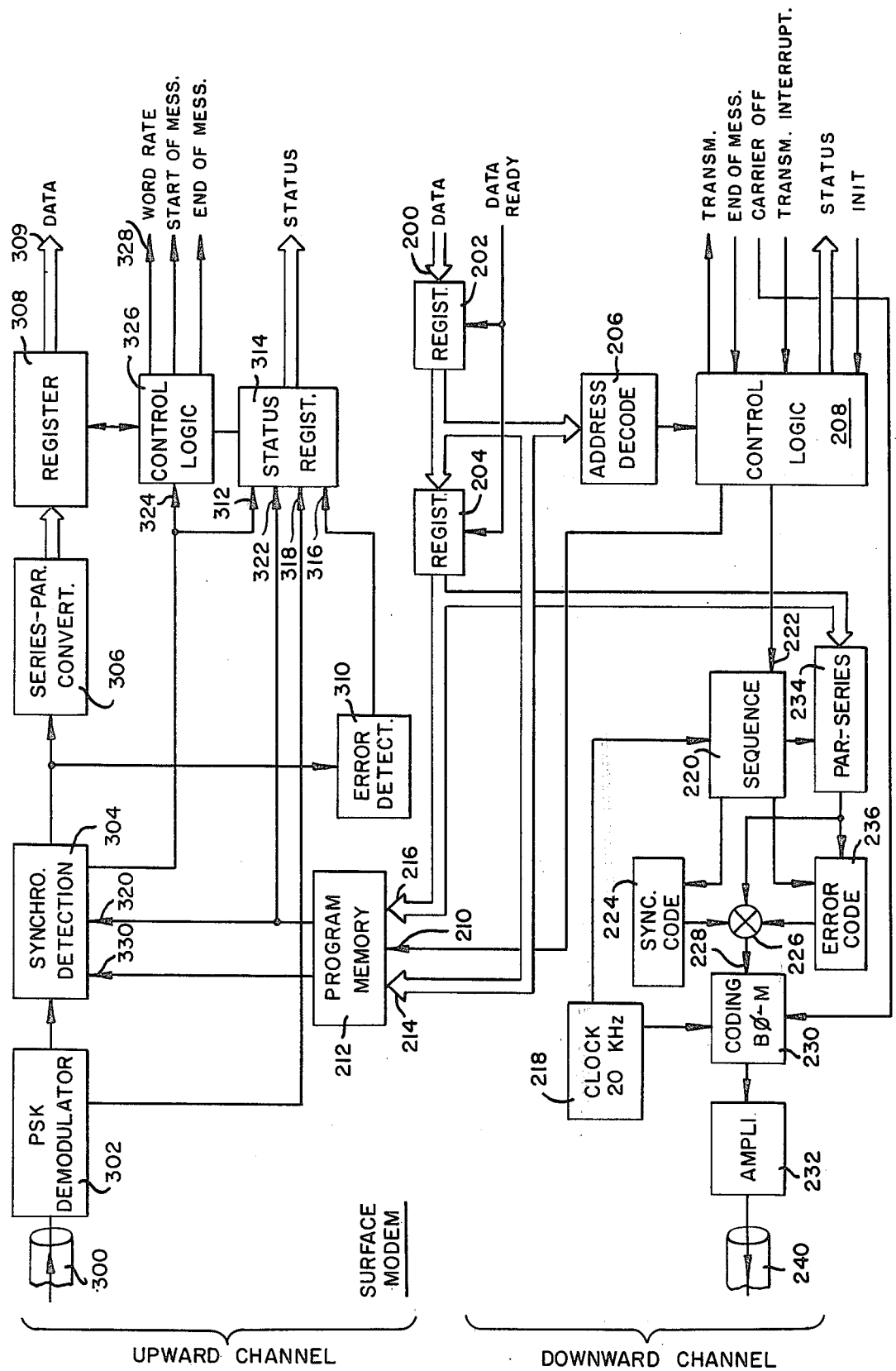
FIGS. 14 and 15 are block diagrams of the surface and downhole modems, respectively.
Figure 15:
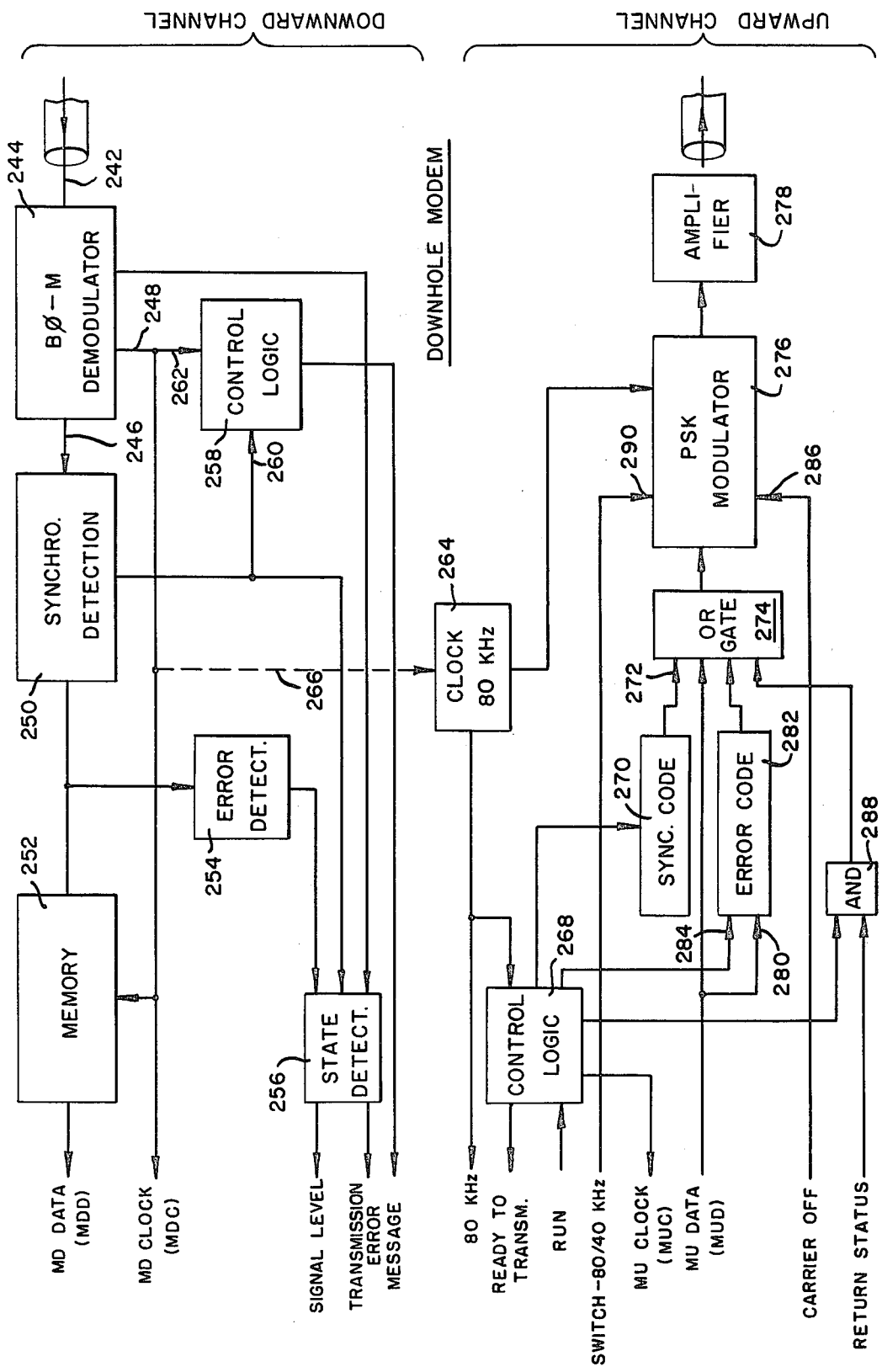

Embodiments of the surface modem 30 and the downhole modem 22 are represented, respectively, in FIGS. 14 and 15. Each modem may be broken down into an upward channel and a downward channel. The downward channel includes the circuits of the modem for carrying data from the surface apparatus to the downhole apparatus and the upward channel includes the circuits of the modem for carrying the data from the downhole apparatus to the surface apparatus.

Downward Channel of Surface Modem

The surface modem shown in FIG. 14 receives on its downward channel the command signals transmitted by the surface controller. The data of the command signal, i.e., the instruction words 40 and 42 of sixteen bits each as shown in FIG. 2, are delivered successively in parallel form to the sixteen inputs 200 of the surface modem. The first and second words are stored respectively in the sixteen bit registers 204 and 202, when a Data Ready signal is supplied from the controller. The first word 40 stored in the register 204 can be used freely by the operator, (i.e., a user defined word) whereas the second word 42 stored in the register 202 is a basic instruction word and contains an address which can be either specific or universal. This address may also be the address of the surface modem itself when the instruction words are intended for it. Once the controller has transferred the data it sends an "end of message" signal to control logic 208 which causes the modem to process the data for transmission.

The address contained in the instruction word 42 is decoded by means of an address decoding circuit 206. The circuit is connected to the logic control circuit 208 which interprets the signal decoded by the address decoding circuit 206. If the decoded address is the address of the surface modem, the logic control circuit 208 delivers an enabling signal to the input 210 of a program memory 212, this signal allows the storage in the memory 212 of the relevant bits of the two data words contained in the registers 202 and 204 and applied to the inputs 214 and 216 of the memory 212. When the address decoded by the address decoding circuit 206 is not for the surface modem, the data contained in the two registers 202 and 204 must be transferred to the downhole apparatus. The message transmitted on the cable 20 by the surface modem is B$\phi$-M coded (FIG. 3B) and this transmission takes place at a frequency of 20 KHz by means of pulses delivered by an oscillator (clock) 218. The structure of the message to be generated is represented in FIG. 2. A sequence circuit 220 and a data merging or OR circuit 226 allow the modem to transmit first the synchronization code (46 in FIG. 2) then the two instruction words (40 and 42 in FIG. 2) and finally an error code (44 in FIG. 2).

The logic control circuit 208 transmits a "transmission start" signal to the input 222 of the sequence circuit 220. The sequence circuit actuates the synchronization code generator 224 which transmits, via the OR circuit 226, a synchronization code to the input 228 of a B$\phi$-M coding circuit 230. This coding circuit transforms NRZL coded signals into B$\phi$-M coded signals. The synchronization code is then transmitted in B$\phi$-M code onto the downward channel 240 of the cable through an amplifier 232. Thereafter, the contents of the registers 202 and 204, i.e., the two instruction words, are applied successively in parallel to the inputs of a parallel-serial converter 234 which transforms the two instructions words into a series signal of thirty-two bits. This signal is applied to the input 228 of the B$\phi$-M coding circuit 230. The two B$\phi$-M coded words are then also transmitted onto the downward cable input 240 through the amplifier 232. Finally, the error code is transmitted by an error code generator 236. This error code is generated by the circuit 236 from the series signal produced by the parallel-serial converter 234. This error code is transmitted onto the downward channel 240, in B$\phi$-M code, through the amplifier 232.

The B$\phi$-M modulator section 230 (not shown in detail) may be conventional in design and includes a 20 KHz clock generator, a NRZL to B$\phi$-M code converter and a power amplifier. The clock is a voltage controlled oscillator, tuned for a frequency of 40 KHz. This frequency is supplied to two flip-flops that deliver the four 20 KHz clocks, with four possible phases (0°, 90°, 180°, 270°).

The signal coming from the data merging circuit 226 is coded in NRZL and is stored in a first flip-flop of the B$\phi$-M coder 230. Then it is ANDed with the 0° clock to present a ONE systemically during half the bit time to one input of an exclusive-OR whose other input receives the 270° phase shifted clock. A ZERO is presented to the exclusive-OR during the second half cycle only if the bit to be transmitted is a ONE. Each time a ONE is presented to the exclusive-OR during the negative transition of the 270° clock, a second flip-flop is triggered. Thus, a systematic level change occurs on each bit time and a level change occurs during a mid-bit time only if the bit to be coded is a ONE. This represents a B$\phi$-M modulation.

The output of the second flip-flop is routed to a low pass filter to limit the bandwidth of the signal. This filter in turn feeds power amplifier 232. A peak detector is connected to the output of the power amplifier and it generates a "carrier level" signal when the output is below a certain threshold. This "carrier level" signal is sent to control logic 208 and then to the surface controller as part of the status signal.

Figure 14A:
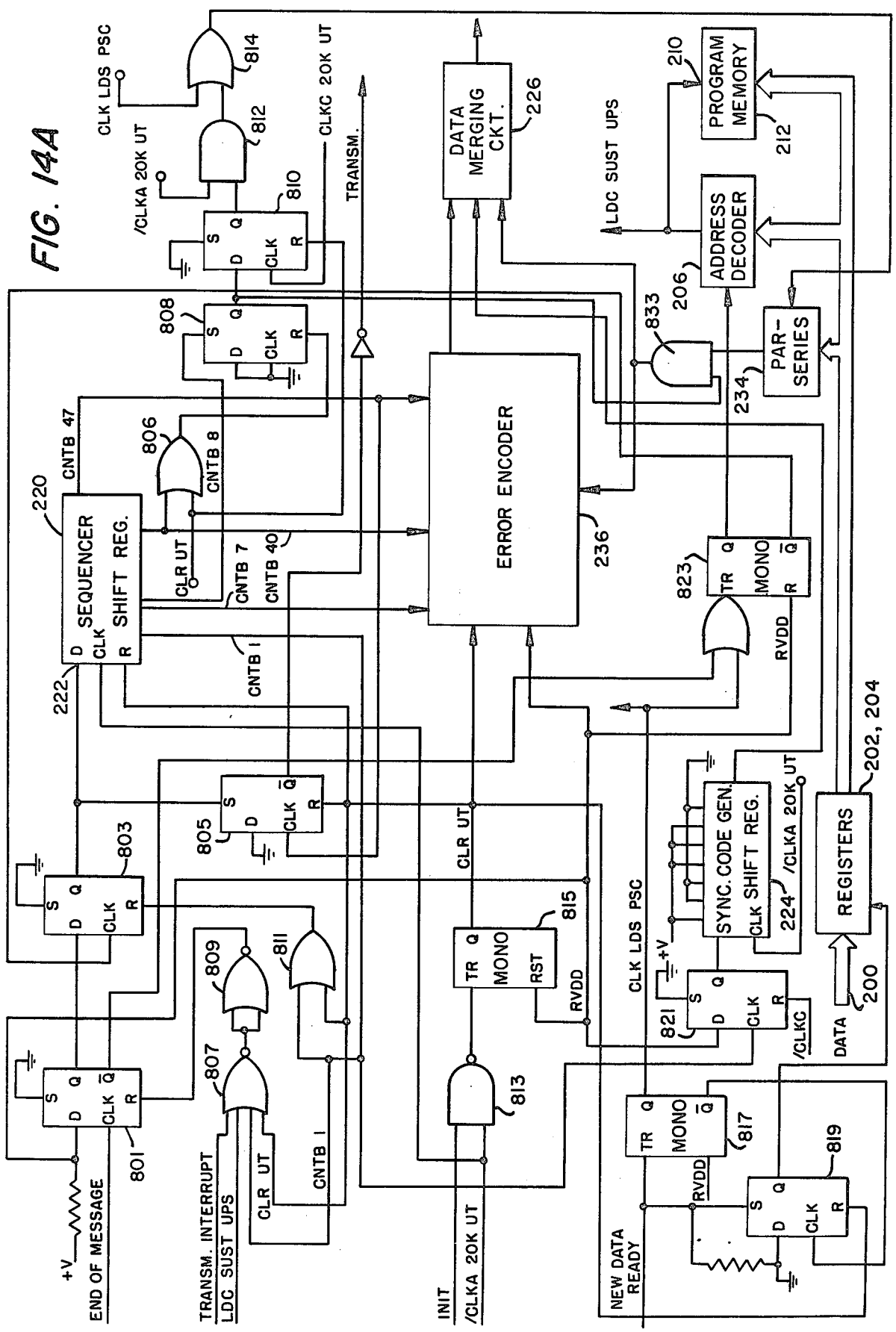
FIGS. 14A and 14B show detailed embodiments of the control and sequencing logic of the surface modem.

The logic control circuit 208, which is shown in more detail in FIG. 14A sends a "transmission" signal when the surface modem is in the process of transmitting data. In this case, the surface controller is informed that it should not send more data. A "carrier off" signal can be sent by the surface controller to the B$\phi$-M coder 230 so as to cut off the signal transmitted on the cable by the surface modem. A "transmission interruption" signal can also be applied by the surface controller to the logic circuit 208 to prevent the transmission of data on the cable, but not the clock. A "status" signal is delivered by the logic control circuit 208 to the surface controller, indicating whether the transmission has taken place correctly or providing other information such as whether the transmitted signal amplitude is higher or lower than a previously defined threshold, (i.e., the "carrier level" signal).

In FIG. 14A a typical arrangement for achieving some of the more important functions of the control logic 208 and the sequence circuit 220 are shown. The data signal 200 from the surface controller is loaded into registers 202, 204 by the output of a flip-flop 819. The flip-flop is set by a "new data ready" (NDR) signal and is reset 700 ns after the trailing edge of that signal by a monostable multivibrator 817. The NDR signal comes from the surface controller and indicates when data is available to read. Since the output of flip-flop 819 loads both register 202 and 204, the first word is stored in register 202 at the first NDR signal and is shifted to the second register 204 when the next NDR signal appears while the second word is being loaded in register 202.

If a message has to be transmitted downhole, the "end of message" signal sets flip-flop 801 which enables flip-flop 803 by a signal from monostable 823. Monostable 823 is triggered by the output of monostable 817 when flip-flop 801 has been set. Because of this arrangement monostable 823 will not be triggered if flip-flop 801 has been reset either by a "transmission interrupt" signal passing through OR-gate 807 and inverter 809 or an internal signal (LDC SUST UPS) from address decoder 206 which indicates that the message is for the modem and is not to be transmitted downhole. The LDC SUST UPS signal is also used to load the appropriate contents of registers 202 and 204 into the program memory 212 when the data message is for the modem. Activation of the address decoder 206 is by means of the monostable 823.

The output of flip-flop 803 sets flip-flop 805 to create the "transmission" signal to the controller and is clocked into a shift register as the "transmission start" signal. This shift register is sequence circuit 220 and the "transmission start" signal is clocked into input 222 by the 20 KHz clock signal. The first output of register 220 (i.e. CNTB 1 UT) resets flip-flop 803 through OR-gate 811 and flip-flop 801 through gates 807 and 809. Thus only one bit is shifted at clock times through the shift register. As this bit reaches various outputs of the register it activates the circuits of the modem in sequence. The first output of the sequence register also sets flip-flop 821 thus enabling the sync code generator 224. The sync code generator is a parallel in, serial out shift register with its inputs wired with the sync code. The output of the register 224 is connected to the data merging circuit 226. Flip-flop 821 is reset by the next 20 KHz clock pulse and register 224 starts shifting the sync code to the B$\phi$-M circuit.

When the bit in register 220 reaches the next selected output (e.g. CNTB 8) flip-flop 808 is set, which event sets flip-flop 810 and enables AND-gate 812 thereby. The output is a sufficient number of clock times from the first output to permit the sync code to be transmitted. AND-gate 812 then passes 20 KHz clock pulses which allow the contents of register 202 and 204 to be fed to parallel to serial registers 234 and then through AND-gate 833 to the data merging circuit. Gate 833 is enabled by the output of flip-flop 808. Consequently, the contents of register 202 and 204 are transmitted downhole.

The output of gate 833 is also fed to error encoder 236 so that the error code can be generated as the data is being transmitted. The error encoder can be of any convenient type, but a conventional cyclic redundancy code is preferred. When sequence register 220 reaches output 40 (CNTB 40) the data has been sent and a register in the error encoder which contains the generated parity code begins to shift the error code to the data merging circuits. This same signal resets flip-flop 808 through OR-gate 806 in order to block data from registers 234.

After the sequence circuit reaches 47, i.e., when the error code has been sent, the encoder 236 is reset, thus ending the message generation process. The 47th output also resets flip-flop 805 to turn off the "transmission" signal. To prepare the modem a system "initiation" signal, i.e. INIT, is clocked through NAND-gate 813 to trigger monostable 815 into producing a pulse, CLR, to reset the flip-flops 801, 803 and shift register 220. This is done during start-up or when there is a power interruption. The INIT signal is generated in the surface controller.

Upward Channel of Surface Modem

Quadrature modulated PSK coded data signals transmitted by the downhole apparatus to the surface apparatus reach the surface modem, which is shown in FIG. 14, on the input 300 of the upward channel of the surface modem at the PSK demodulator 302. The PSK demodulator filters the signal to reject noise and amplifies it with automatic gain control to raise the signal to an acceptable level for further processing. The 80 KHz signal is then doubled twice in multiplier circuits to get a four-times frequency signal (320 KHz) to synchronize a local voltage controlled oscillator. The output of the VCO is divided to produce four phased 80 KHz local clocks used to demodulate the data. The demodulation is performed by multiplying the input signal by two of the 80 KHz local clocks which have a 90° phase difference between them. The two outputs of these multipliers are two 40 KB signals that are routed to the inputs of two bit synchronizers. These bit synchronizers perform filtering and bit decision functions. Then their outputs are combined to produce an 80 KB data stream. These signals are presented at the output of the demodulator 302 as NRZL coded signals.

The NRZL signals are then applied to the input of a synchronization code detector circuit 304 which detects the synchronization code, i.e., the first sixteen bit word of the message (FIG. 6). The bits of the sync code are entered into a serial-parallel shift register which has gates on its output wired to produce a signal when the signal arrangement corresponds to the sync code. The data words which follow the synchronization code are converted to parallel sixteen bit words by a serial-parallel converter 306 and are then stored in a register 308. The sixteen outputs of this register 308 are connected in parallel to sixteen outputs 309 connected to the surface controller.

On the input 322 of a status register 314, as well as on the input 320 of the synchronization code detector circuit, the program memory 212 applies a signal indicating the chosen transmission mode, for example the free-running or the command-response mode. The synchronization code detector circuit 304 applies a signal to input 312 of the status register 314, as well as to the input 324 of a logic control circuit 326, indicating whether or not the synchronization is correct. The logic control circuit 326, which is shown in more detail in FIG. 14B, delivers at its input 328 a "word rate" signal which informs the surface controller that data is present. This logic circuit 326 also delivers the "start of message" and "end of message" signals corresponding to the first and last words of the message. The status register 314 delivers to the surface controller the different "status" signals representative of the good or poor transmission of the message, for example the amplitude of the received signal, the condition of the different synchronization levels, the transmission error, and so forth.

The program memory 212 delivers to the input 330 of the synchronization code detector circuit 304 a signal indicating the length of the messages the modem is to receive. When a frame sync pattern is detected a bit/-word counter and a word/frame counter in the sync detector 304 are reset. When the bit/frame counter reaches 16, a complete word has been entered into shift 306. This word is then, transferred into register 308. Each time a word is transferred, the word/frame counter is incremented by one. When this counter reaches the number of words programmed by the computer and stored in the modem memories, the logic circuits know that the next word to come is the error detection word.

It has already been mentioned that the program memory 212 delivers to the input 320 of the synchronization code detector circuit 304 a signal characteristic of the chosen transmission mode. What is involved is, in fact, the suitable control of a gate which allows or does not allow the passage of data coming from the cable. In the command-response mode, the detector 304 opens this gate as soon as it has detected a synchronization code and leaves this gate open throughout the length of the message which is to be received (indicated by the program memory 212 on the input 330). When the message has been received, the gate is closed and the detector 304 again continually checks the input signal to find the proper sync pattern. The gate is only opened when it has detected the next synchronization code. On the other hand, in the free-running mode, after receiving the first cycle (the acquisition of which takes place in the same manner as in the command-response mode), the synchronization code detector circuit 304 checks the presence of a synchronization code without error only at equal time intervals (message lengths) and does not check all of the data. It keeps the gate open to allow the passage of the data and only closes it if the synchronization code is not detected at the proper time, in which case the gate is closed until the next recognition.

The error code is analyzed by means of the error detector circuit 310 whose output is connected to the input 316 of status register 314 to which it indicates the presence or absence of an error in the message. In effect error detector 310 computes the error code for the data and then compares it to the transmitted error code. The input 318 of status register 314 also receives a signal from a peak detector-threshold circuit in the PSK demodulator 302, which signal is representative of the amplitude of the received signal. If this amplitude is too low, it indicates this to the status register 314.

Figure 14B:
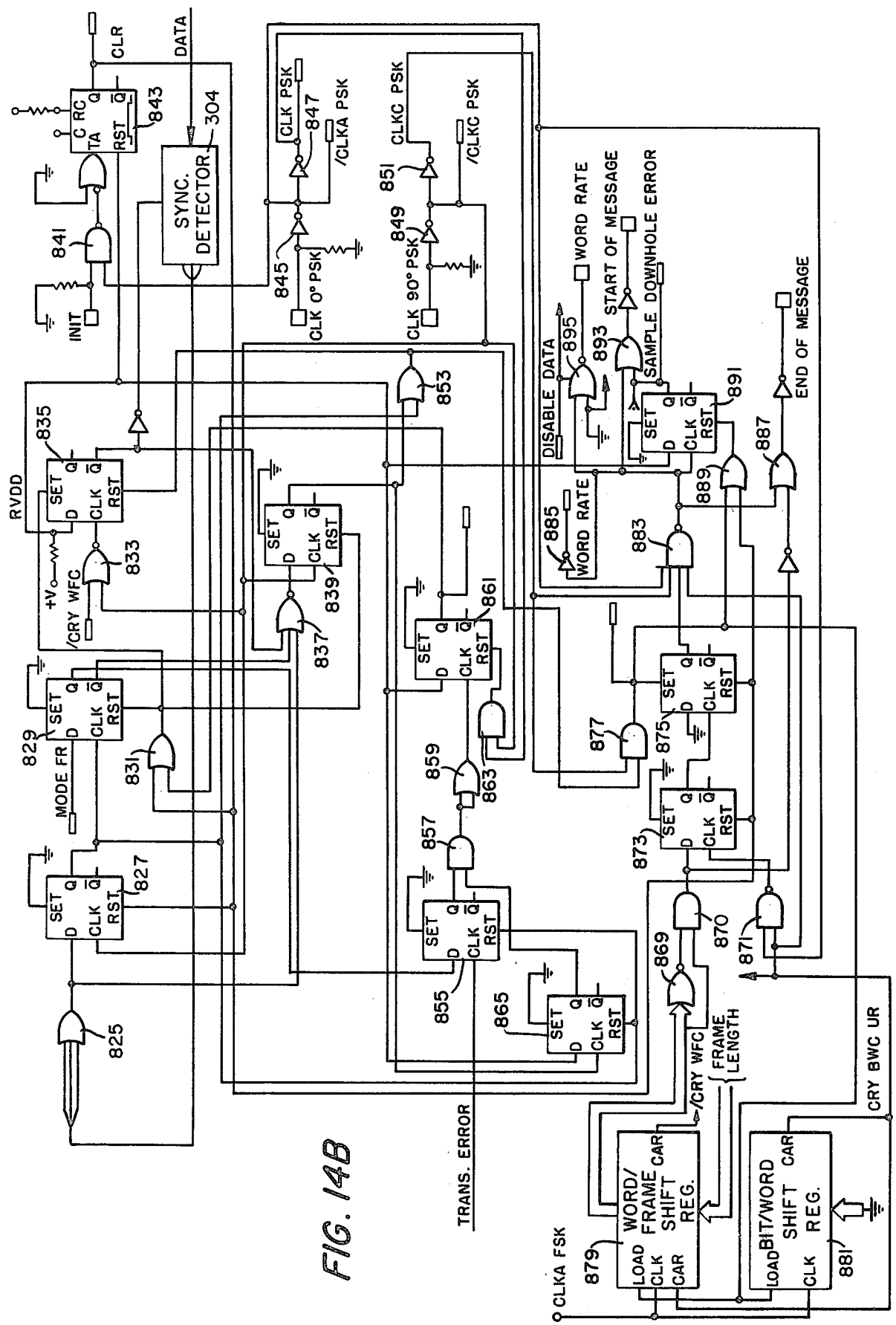

In FIG. 14B a typical arrangement for control logic 326 is shown in more detail. In this circuit signals representing the detection of a sync code by sync detector 304 are applied through gate 825 to set flip-flop 827. The sync circuit detects the sync pattern in three possible phases by three separate gates (not shown). This is necessary because there is some phase ambiguity in the signal from downhole. If any one of the sync outputs is correct it will properly phase the receiver. The output of gate 825 enables AND-gate 877 by means of OR-gate 853 and allows a clock signal to pass through gate 877 to load the bit/word counter 881 and the word/frame counter 879 of the sync detector. The bit/word counter counts up from 0 to 15 and its output is the clock for the word/frame counter. The word/frame counter counts down from the programmed frame length value stored there from memory 212 until it reaches zero.

When counter 879 reaches zero its output also sets flip-flop 835 through OR-gate 833. Flip-flop 835 then enables the sync detector circuit 304 so it can look for the sync code on the next word. When a valid sync code is found this flip-flop is reset through gate 853. However, in the free-running mode the output of flip-flop 827 also sets flip-flop 829 because of a mode signal applied to its "D" input to indicate sync lock. The complimentary output of flip-flop 829 is combined in NOR-gate 837 with the complimentary output of flip-flop 835 and the absence of a sync signal to set flip-flop 839 to indicate an invalid sync pattern in the free-running mode. In the free-running mode, flip-flop 835 is also reset by an invalid sync code.

In the free-running mode for the communication system it is possible to keep the lock mode to the computer even if an invalid sync pattern has been decoded, so long as the error detection code is valid. This is accomplished by clocking the output of free-running bit flip-flop 829 into flip-flop 855 with the "transmission error" signal from the error detector and by clocking the logic ONE, i.e. RVDD, signal into flip-flop 865 with the output of the invalid sync flip-flop 839. These signals are stored in flip-flops 855 and 865 because they occur at different times. The outputs of flip-flops 855 and 865 are combined in AND-gate 857 and are used to clock the RVDD signal into flip-flop 861 through gate 859. Hence, flip-flop 861 will be set and will reset the lock flip-flop 829 only if both an invalid sync and a transmission error are detected. If there is no error the AND-gate 857 will prevent the free-running lock flip-flop 829 from being reset. Flip-flop 861 is reset by AND-gate 863 which combines the 0° clock passed through inverters (845, 847) and the 90° clock passed through inverter 849. Flip-flops 855 and 865 are reset by a valid sync signal from flip-flop 827.

A "word rate" pulse is necessary to indicate that a new data word is present. This signal is generated in AND-gate 883 and is made available at the output of gate 895 or 885. Gate 895 sends the "word rate" signal on line 328 (FIG. 14) to the surface controller. This signal can be blocked, however, by a "disable data" signal from the controller. Gate 883 generates this signal by combining the inverted 0° and normal 90° phase shifted clock signal from the PSK demodulator. These signals are passed through inverters (845) and (849, 851), respectively. Also applied to the gate 883 is the carry output of the bit/word counter 881 and the output of a flip-flop 875. Flip-flop 875 is set through AND-gate 877 which is an indication that a valid sync code has been determined. Therefore, the "word rate" pulse is generated when 16 valid bits have been decoded. The flip-flop 875 is reset when the word/frame counter 879 reaches zero by decoding the output of the word/frame counter in gates 869 and 870 and storing the signal in flip-flop 873 which is clocked by gate 871 with the bit/word counter carry output and the 0° phase clock signal, thus creating a one bit delay. Because of this arrangement a "word rate" pulse is generated each time the bit/word counter 881 overflows, but only if a good sync code has been detected and the word/frame counter 879 has not reached zero.

The "start of message" and the "end of message" signals are also generated in synchronous with the "word rate" pulse. The "start of message" signal is created in OR-gate 893 (which acts as an AND-gate for positive signals) from the output of AND-gate 883 which is used to generate the inverse of the "word rate" and the flip-flop 891 which uses the output of gate 883 to clock in the RVDD signal. Flip-flop 891 is reset through OR-gate 889 with the sync detection signal from gate 877 or the output of monostable 843, i.e. the CLR signal. Monostable 843 is triggered by combining the clock from inverter 845 and the INIT signal in AND-gate 841. Hence, flip-flop 891 allows only the first "word rate" pulse to pass through gate 893 as the "start of message" signal. This same signal, CLR, clears or resets flip-flops 827, 829, 873, 875 and 891. The "end of message" signal is generated in gate 887 in a manner similar to the "start of message" signal by the outputs of gates 883 and 870. Gate 870 decodes the one count of the word/frame counter. Hence an "end of message" signal is produced when the word/frame counter is reduced to "1" and there is a "word rate" pulse. The first bit of the first word (i.e., the downhole status word) is decommutated and is loaded in the status register by the signal produced by flip-flop 891 which clocks in RVDD when the word rate gate has an output transition. This bit indicates a downhole error.

Downward Channel of Downhole Modem

The signals applied to the downward channel output 250 of the surface modem (FIG. 14) are sent via the transmission cable 20 to the downward channel input 242 of the downhole modem (FIG. 15) where they are received. The Bφ-M coded signals are first demodulated by a demodulator 244 which converts them into NRZL coded signals. This demodulator restores the command signals at its output 246 and the clock signals MDC at its output 248. The command signals first go through a synchronization code detection circuit 250 which allows the detection of the start of the message.

The data are then stored temporarily in a thirty-two bit memory 252. This memory 252, timed by the pulses MDC, delivers the signal MDD at its output. The error code, the last word transmitted in the message, is analyzed by means of an error detector 254. This detector indicates to a state detection circuit 256 the presence or absence of an error. Similarly, the synchronization code detection circuit 250 indicates to the state detection circuit 256 whether the synchronization code is correct. The demodulator 244 also indicates to the state detection circuit 256 whether the amplitude of the received signal is over or under a certain threshold. The state detection circuit 256 then delivers to the downhole controller the "signal level" and "transmission error" signals.

The Bφ-M demodulator 244 includes circuits which filter the signal, perform the clock synchronization, and make the bit decisions, i.e. demodulate the bits from the Bφ-M code. Clock synchronization is achieved with a phase-locked loop, including a VCO tuned at 80 KHZ and an exclusive OR-gate with the input signal on one input and the input signal delayed by half a bit time on the other. With this arrangement the VCO is synchronized with the pulses MDC delivered by the surface modem. The downhole clock 264 can also be synchronized with this signal as represented by a dotted line 266. However, this second synchronization is not necessary for proper operation of this system. The output of the VCO in the Bφ-M demodulator is also divided by flip-flops to produce the 20 KHZ clock needed in that demodulator. In order to accomplish the bit decision and code conversion to NRZL, a voltage comparator feeds two series connected flip-flops whose outputs are combined in an exclusive-OR circuit.

Figure 15A:
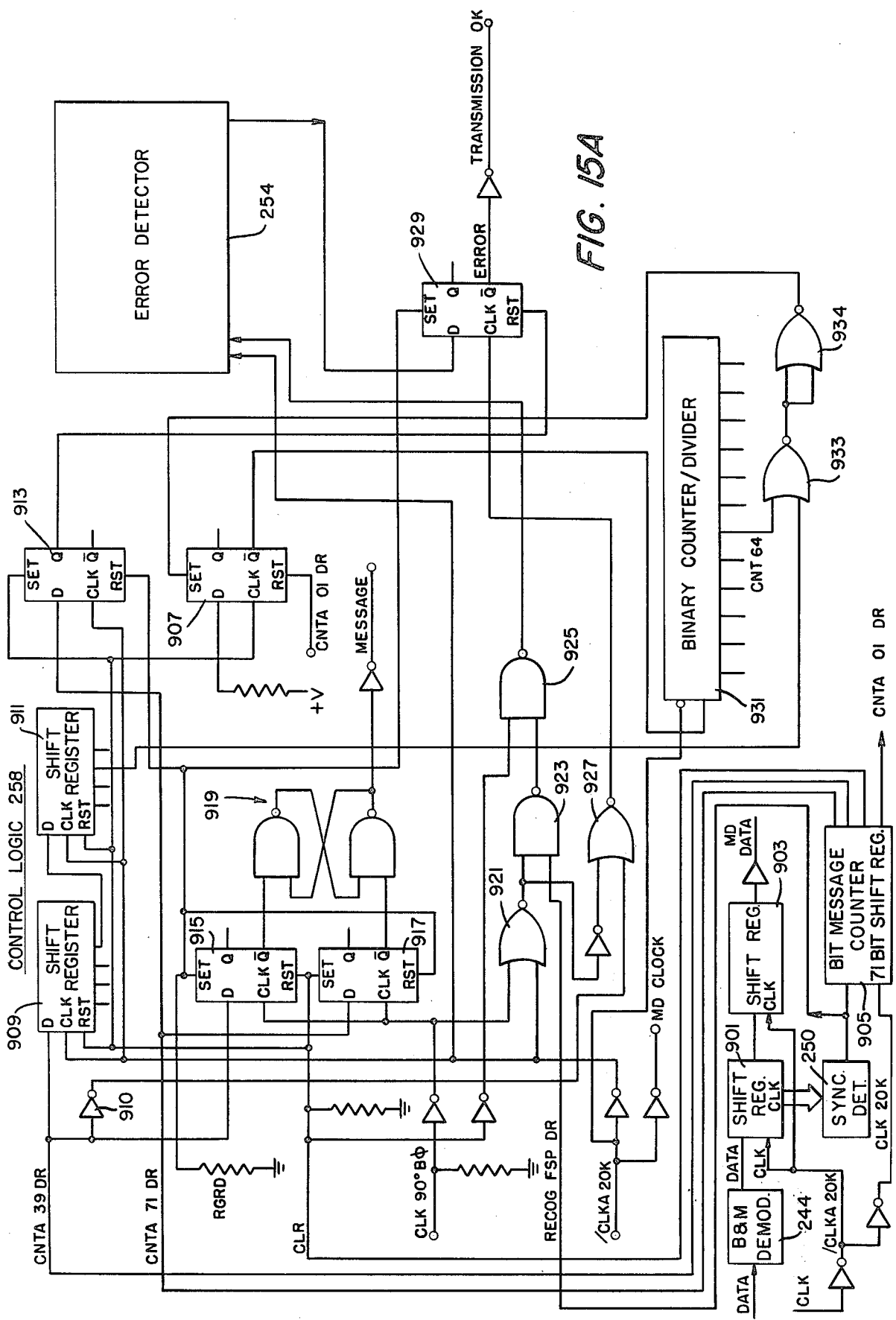
FIGS. 15A and 15B show detailed embodiments of the control and error detecting logic of the downhole modem.

A logic control circuit 258 controls the operation of the downward channel and delivers the "message" signal to the downhole controller throughout the sensing of the thirty-two data bits to the controller, so long as a synchronization code has been detected. Features of this circuit are shown in greater detail in FIG. 15A.

The data from Bφ-M demodulator 244 enters a shift register 901 (FIG. 15A) that is 7 bits long and another register 903 that is 40 bits long. The contents of register 901 are applied to sync detector 250 which checks the bits in register 901 to see if they have the proper code. Register 903 stores the serial message to delay the output to the controller until the error detection code at the end of the message has been checked.

A bit/message counter 905 in the form of a 71 bit shift register is provided and functions much like the sequence circuit 220 of the uphole modem. The length of the register is necessary so that it can count from the point the frame sync pattern has been decoded to the message end (39 bits) and then from the first bit output to the controller to the last bit of the second word (i.e. two 16 bit words). When a frame sync pattern has been detected by circuit 250, a ONE bit is introduced into shift register 905. At the following clock pulse the CNTA 01 DR output of the register 905 goes high and resets flip-flop 907. The output of flip-flop 907 enables the sync detector 250 and, hence resetting it inhibits further frame sync pattern recognition until the word has been processed and the next word is expected. This occurs 46 bits later when flip-flop 907 is set by shift registers 909 and 911. Shift register 909 receives the 39th bit output of shift register 905, and it and register 911 receive the 20 KHZ clock. These registers are wired as a 7 bit shift register to produce a signal at the 46th bit, which signal passes through OR-gates 933 and 934 to set flip-flop 907. If the 46th bit does not arrive to set flip-flop 907 the 64th bit signal from anti-lock counter 931 will perform this function by applying a signal to the other input of OR-gate 933. Counter 931 is reset when the sync detector 250 is deactivated and is driven by the 20 KHZ clock.

The code is checked by error detector circuit 254 which recomputes the cyclic redundancy parity for the entire word, including the error code. If parity is correct the answer should be zero. The result of this recomputation is sampled by flip-flop 929 to produce the "error" signal at the end of the message, i.e. when the bit/message counter reaches 39. This sampling is accomplished with gates 910 and 927. Gate 927 determines the exact timing of this sampling by combining a modified clock signal with the 39th bit signal. The modified clock is formed from the 20 KHZ clock and the 90° phase-shifted clock in NAND-gate 921. By means of either this same modified clock signal combined in AND-gate 923 with the output of sync detector 254 (RECOG FSP DR) or the complement of a clear signal, CLR, generated by the INIT signal, a reset signal for the error code detector 254 is generated in gate 925. The error sampling flip-flpp 929 which also produces a signal indicating a transmission error for the state detector 256, is reset by the 72nd count which is established by clocking the 71st count from bit/message counter 905 into a flip-flop 913, thereby creating a 1 bit delay.

A "message" signal is generated during the transmission of the two 16-bit data words, i.e. the MD DATA output. This occurs when the bit/message counter is between the 39th and 71st counts. Creation of the "message" signal occurs in flip-flops 915 and 917, and in a set of gates wired to function as a flip-flop 919. In operation the 39th bit is clocked into flip-flop 915 and sets the output of flip-flop 919, i.e. the "message" signal is high. Likewise, the 71st bit is clocked into flip-flop 917 to reset flip-flop 919, making the "message" signal low.

The INIT signal previously mentioned triggers a monostable to create the CLR signal for gate 925. However, this signal is not only used in gate 925, it resets flip-flop 915 and registers 909 and 911, sets flip-flops 913 and 917, and clocks flip-flop 907.

Upward Channel of Downhole Modem

A data message transmitted by the downhole apparatus includes a synchronization code, a status word, n data words and an error code. This message is PSK modulated (FIG. 3D) at 40 or 80 KHZ.

When the downhole controller has data to send to the surface, it sends the "run" signal to a control logic circuit 268 of the dowhole modem illustrated in FIG. 15. This circuit 268, driven by the 80 KHZ clock pulses from clock 264, ensures the formation of the message which must be sent on the cable 20 to the surface. The circuit first actuates a synchronization code generator 270, in the form of a parallel-series register with the code wired on its input, which generator transmits the synchronization code to the input 272 of a data merging or OR circuit 274. This synchronization code is then PSK modulated by a modulator 276, and is sent on the cable 20 after passing through an amplifier 278.

After this synchronization code, the status and data words must be sent. The logic control circuit 268, shown in more detail in FIG. 15B, then sends the "ready to transmit" signal to the downhole controller which sends back the signal MUD. This signal is transmitted directly to the PSK modulator 276 through the OR circuit 274 and then onto the cable through the amplifier 278. The signal MUD is also applied to the input 280 of an error code generator 282 which is connected to and controlled by the logic control circuit 268 via its input 284. The error code can be a parity code, such as a cyclic redundancy code, which depends on the value of the bits making up the signal MUD. The error code generator 282 then delivers the error code which, after PSK modulation by modulator 276 and amplification by amplifier 278, is sent on the cable to the surface apparatus. When the downhole controller has finished sending its data, it changes the state of the "run" signal, making it go from the logic state 1 to the logic state 0. The downhole modem is then available for transmitting more data.

A "carrier off" signal can be applied to the input 286 of the PSK modulator 276 so as to cut off the carrier of the signal transmitted to the surface. This signal is generated by the downhole controller when it wants to use the cable for transmitting other data, e.g. an analog sonic signal from a sonic well logging tool.

The "return status" signal (110 in FIG. 11), used for indicating that the "return" signal has been properly transmitted by the last tool, is in fact the first bit of the error code. Its introduction into the message is controlled by the logic control circuit 268 through an AND-gate 288 and the OR-gate 274.

An 80–40 KHZ switching signal can be applied to the input 290 of the PSK modulator 276. This signal makes it possible to send the message at a frequency of 40 K bits or 80 K bits. The 80 KHZ signal for the PSK modulator comes from the VCO 264 in the downward channel of the downhole modem. The PSK modulator 276 first performs a splitting of the 80 KB data stream into two 40 KB NRZS code signals. Each of these signals modulates an 80 KHZ sinewave carrier, the two carriers being is quadrature. After summing of the two modulated carriers, a 4-phase PSK signal results for transmission to amplifier 278.

The two carriers used in the PSK modulator are created by using a second VCO synchronized with the first, but with a 90° phase shift. In order to get a 40 KHZ signal the 80–40 KHZ switching signal directs the modulator to use the output of flip-flops connected to the carrier signal generators (not shown). Splitting of the data into two bit streams is achieved by sampling the data at 40 KHZ. Two "J-K" flip-flops with the same data signal on both inputs generate the NRZS modulation. A "D" flip-flop in one data path gets the split data signals into phase with each other so that they can modulate the two quadrature carriers. The actual modulation is performed by multiplier circuits. By combining the bi-phase PSK modulation on each carrier, a four-phase PSK modulated signal is created.

Figure 15B:
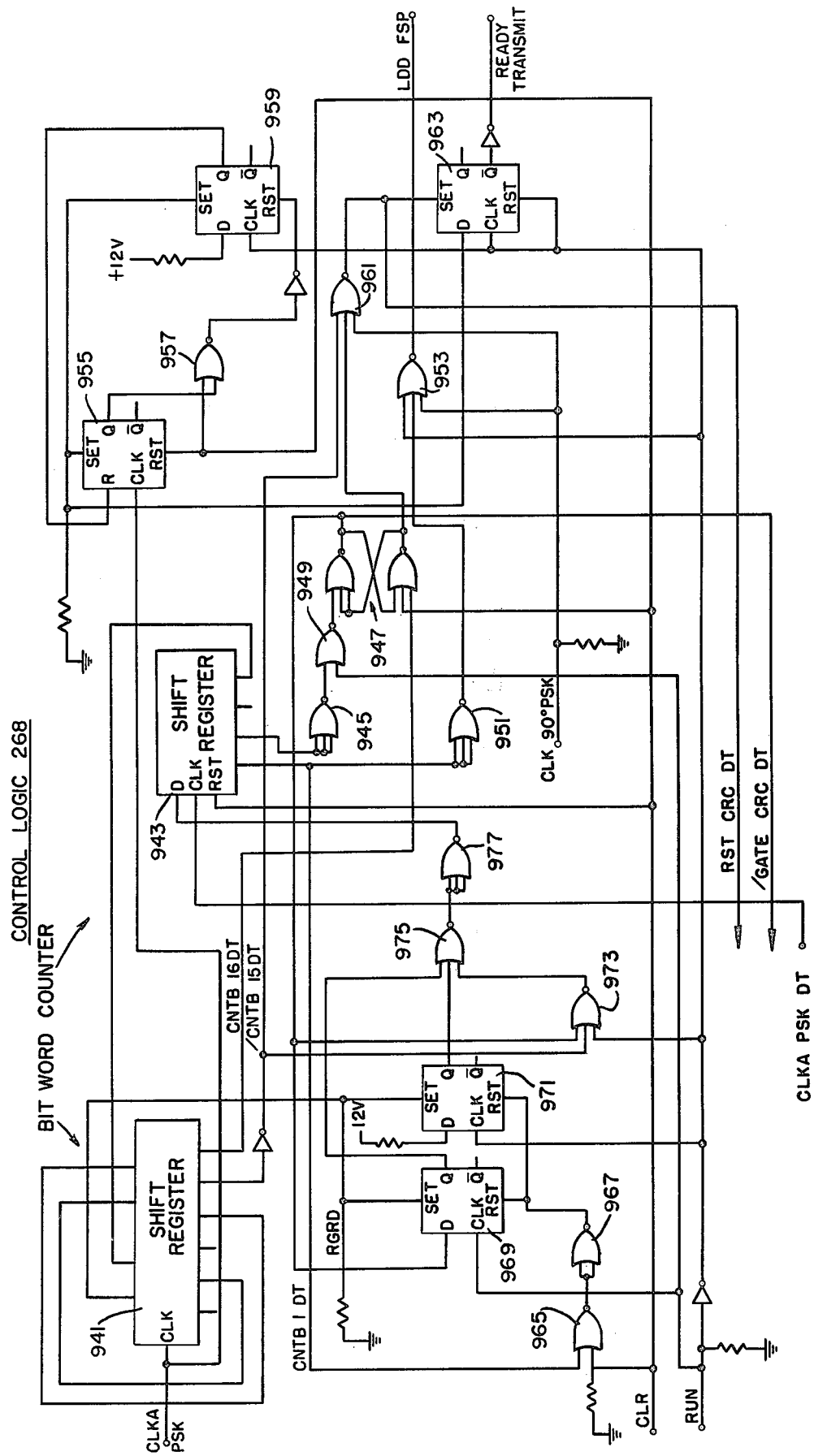

The control circuit 268 shown in more detail in FIG. 15B acts on signals from the downhole controller to compose the message for transmission to the surface modem in such a way that sync code bits preceed the data words and error code bits follow it. At the rising edge of the "run" signal from the controller, a sync flip-flop 969 is set, thereby applying a ONE bit to the input of shift register 943 by way of gates 975 and 977. The shift register 943, in combination with shift register 941 forms a 16-stage bit/word counter, which is started by the output of gate 977. After 16 clock times the bit is shifted out and dropped. However, a new bit is shifted into the counter by an error code flip-flop 971. The inverse or trailing edge of the "run" signal sets error code flip-flop 971 whose output is applied to gate 975. The final input to gate 975 comes from a gate 973 which combines the inverse of the "run" signal and two outputs of the bit/word counter. Flip-flops 969 and 971 are reset through gates 965 and 967 by the first output of the bit/word counter so that only one bit is shifted into the shift register. In this sense the bit/word counter is like sequence circuit 220 in FIG. 14. The first output of the bit/word counter when flip-flop 969 is set also acts to load the sync code pattern within sync code generator 270 through gates 951 and 953. The sync code is then delivered through the data merging circuit 274 (FIG. 15) to the PSK modulator.

When the bit/word counter reaches 15, indicating that the 16 bit sync code has been sent, the bit/word counter sets flip-flop 963, whose output is the "ready to transmit" signal supplied to the controller, via gate 961. Gate 961 combines the 15th bit output of the counter with the 90° phase clock and the output of a flip-flop 947 which controls the error code generator. In response to this the controller begins to send its data i.e. MU DATA, through data merging circuit 274 to the PSK modulator 276. While this is occurring the error code generator 282 computes the 2–16 bits of the error code, the first bit being the return status signal from the controller.

On the trailing edge of the "run" signal from the controller, flip-flop 963 is cleared, thereby disabling the MU DATA input to the data merging circuit 274. Also, the trailing edge of the "run" signal causes flip-flop 971 to be set, starting the bit/word counter again through gates 975 and 977, and causes flip-flop 959 to be set. The setting of flip-flop 959 allows the return status gate 288 (FIG. 15) to be opened by flip-flop 955 on the next clock signal from the PSK modulator. As previously stated the "return status" signal from the controller is transferred to the modulator as the first bit of the error code.

When the bit/word counter reaches 1 after being restarted at the end of the MU DATA, the error code flip-flop 947 is sent through gates 945 and 949 when the "run" signal is off. This allows the contents of error code generator 282 to be presented to modulator 276 through data merging circuit 274. The transmitter can start a new frame as soon as the error detection code is finished by applying a signal from gate 273 through gates 875 and 977 to the bit/word counter. This allows the "run" signal to be asserted during the last word transmission and is used in the free-running mode where no time is lost between frames.

The logic circuits are clocked by the 0° and 90° clock signals from the PSK modulator. These signals are at 80 KHZ or 40 KHZ, depending on the selected bit rate. Also, the CLR signal resets flip-flops 947 and 955. This signal also combines with the output of flip-flop 955 in gate 957 to create a reset signal for flip-flop 959.

Surface Controller

The surface controller 34 (FIG. 1) delivers to the surface modem 30 the command signals to be sent to the tools and receives in return the data transmitted by the tools. Two embodiments are possible. In both cases, the controller is made up of programmable means such as a digital computer.

According to a first embodiment, shown schematically in FIG. 1, the controller is connected via a bus 38 to data acquisition and processing units 36, each of these units corresponding to a given tool. The structure of each unit 36 may then be specific to the tool to which it is assigned. In particular, it can include a microcomputer for the processing of data it receives from its tool. Peripherals such as printers or magnetic or optical recorders (not shown) can be connected to the different processing units 36 via the bus 38. The connection of this bus to the processing units 36, the peripherals and the controller 34, as well as the structure of this bus can be in accordance with the teachings of the commonly-owned U.S. patent application Ser. No. 863,824 filed Dec. 23, 1977 and bearing the title "Method and Apparatus for the Transmission of Data in Digital Form".

On the basis of the preceding, it is easily understood that the controller 34 is none other than a small computer, or microcomputer, capable of storing in memory the list of commands to be sent to the tools and of sending them to the surface modem 30 in accordance with a given sequence and rate, and also capable of receiving data from tools and distributing them to the prescribed processing units 36 or directly to the peripherals.

According to a second embodiment, the controller 34 shown in FIG. 1 is a computer more powerful than in the preceding embodiment because it can carry out by itself all the data processing operations. The individual processing units for each tool are thus replaced by a single unit. In this case, the system 32 (FIG. 1) for data acquisition and for sending command messages can be similar to the one described in French Pat. No. 2,188,044 bearing the title "Automated System for the Exploration of Boreholes and Logging Data Acquisition and Processing Methods". This system includes, in particular, a computer receiving logging data through an interface and connected to peripherals such as memories, recorders, and so on.

Figure 16:
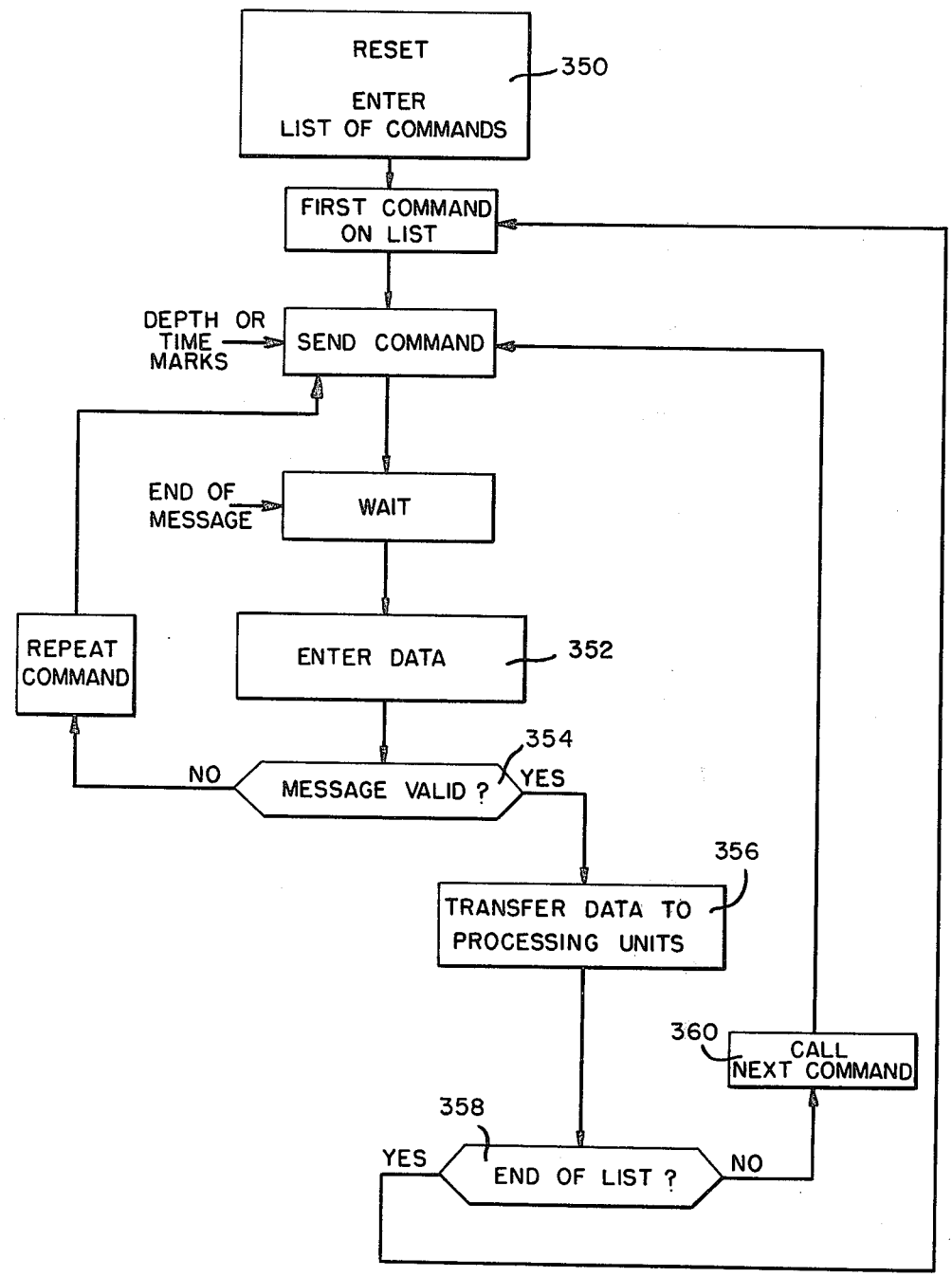
FIGS. 16 and 17 are flow diagrams illustrating, by way of example, the programming principle of the surface controller operating in the command-response mode (FIG. 16) and in the free-running mode (FIG. 17), respectively.
Figure 17:
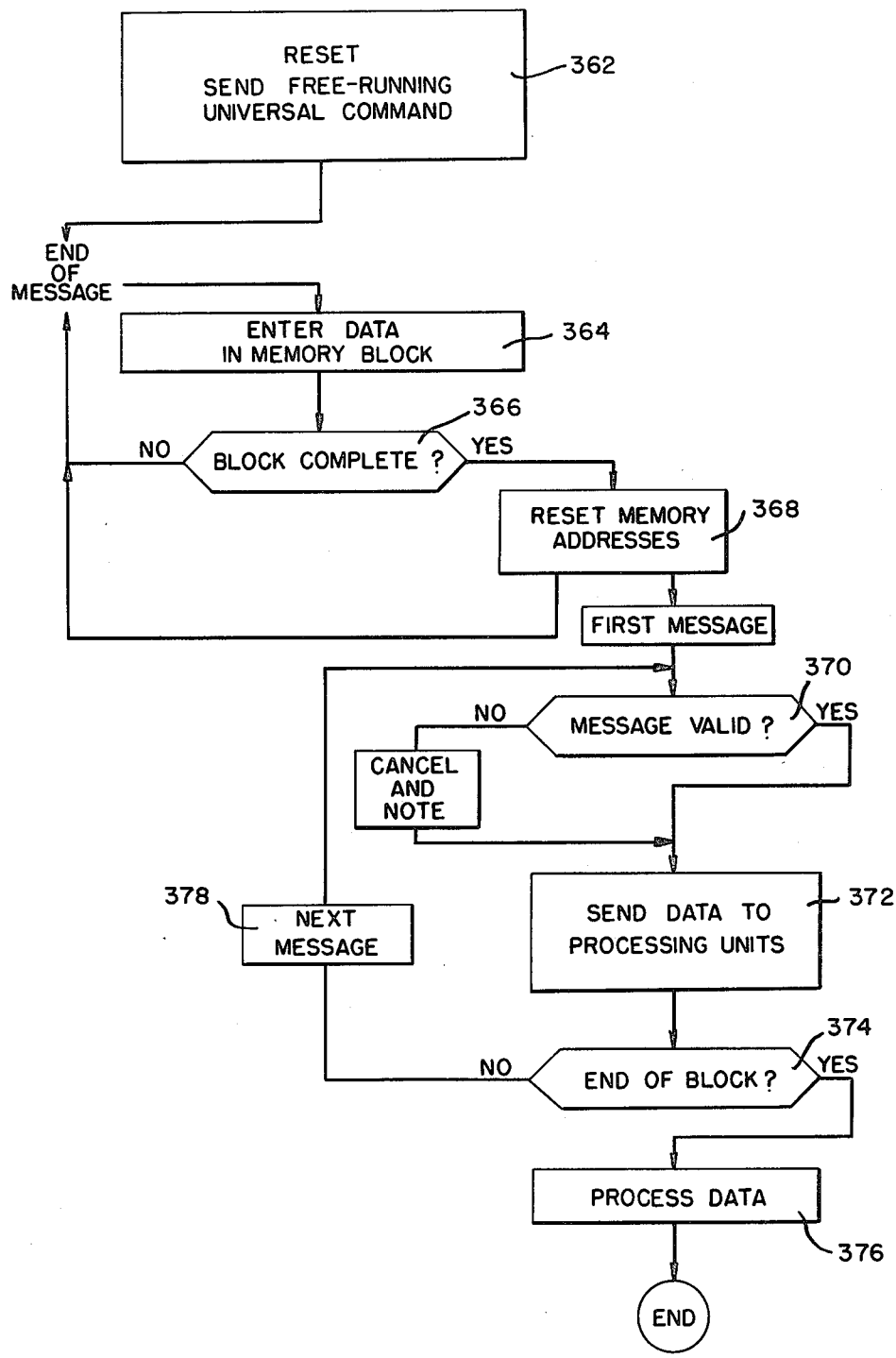

As an example, FIGS. 16 and 17 illustrate the programming principle of the surface controller 34 operating in the command-response mode (FIG. 16) and in the free-running mode (FIG. 17).

The controller begins by resetting the communication system and by entering in its memory the list of command messages to be sent to the tools (block 350 in FIG. 16). Then, the first command message on the list is applied to the output of the controller while awaiting an external signal. This signal may, for example, be furnished by a conventional logging device delivering a depth signal whenever the sonde has moved past or covered a given depth interval in the borehole. The external signal can also be characteristic of a given time interval. When a depth or time signal appears, the first command message is applied to the inputs 200 of the downward channel of the surface modem. Then, the communication system waits for the downhole apparatus to respond to the command message by sending a data message to the surface apparatus. When this data message has reached the surface modem, the latter delivers through its logic control circuit 326 (FIG. 14) the "End of Message" signal to indicate the end of the signal to the controller. Then, the data are stored in the computer (block 352). The validity of the received data (block 354) is then examined by the controller. For this purpose, the status register 314 (FIG. 14) of the surface modem is consulted. If the received data message is valid, the data are transferred (block 356) to the different processing units 36 (FIG. 1). If the received message is not valid, the command message is sent again to the downhole apparatus by command repetition. Then the list of commands stored in the block 350 is scanned to determine whether all the commands have been sent (block 358). If the controller has reached the end of the list, a new list of commands is stored in the block 350 and the first command of this new list appears at the output of the controller. On the other hand, if the list is not completed, the next command (block 360) is called to be sent to the downhole apparatus.

FIG. 17 is a flow chart showing the operations carried out by the surface controller 34 when the communication system operates in the free-running mode. The controller begins by resetting the communication system and by sending downhole a universal command message so as to place the system in the free-running mode (block 362). The downhole apparatus then sends data to the surface and delivers an "End of Message" signal at the end of each tool data sampling cycle. The data are then entered in a memory of the computer (block 364). This memory can contain a given number of data words which form a data block. The block is then analyzed by the controller to determine whether it is complete (block 366). If it is not, new data are entered in memory. When the block is complete, the addresses of the computer memory which receives the data are reset (block 368) and the data received are analyzed and sent to the different processing units 36 corresponding to the tools. The validity of the first data message contained in the memory is analyzed (block 370). If this message is not valid, it is eliminated. This elimination is noted in order to cut off the tool(s) if they continue to send erroneous messages. If the received message is valid, the data are sent (block 372) to the processing units 36 for which they are intended. At the end of the block of data (reference 374), the data are processed and recorded (block 376) and the program is over. It if is not the end of the block, the following data message is called (block 378). This message, like the first message, is analyzed as to its validity (block 370) and the data are sent to the processing units for which they are intended (block 372).

Remote Telemetry Element

Figures 18, 19:
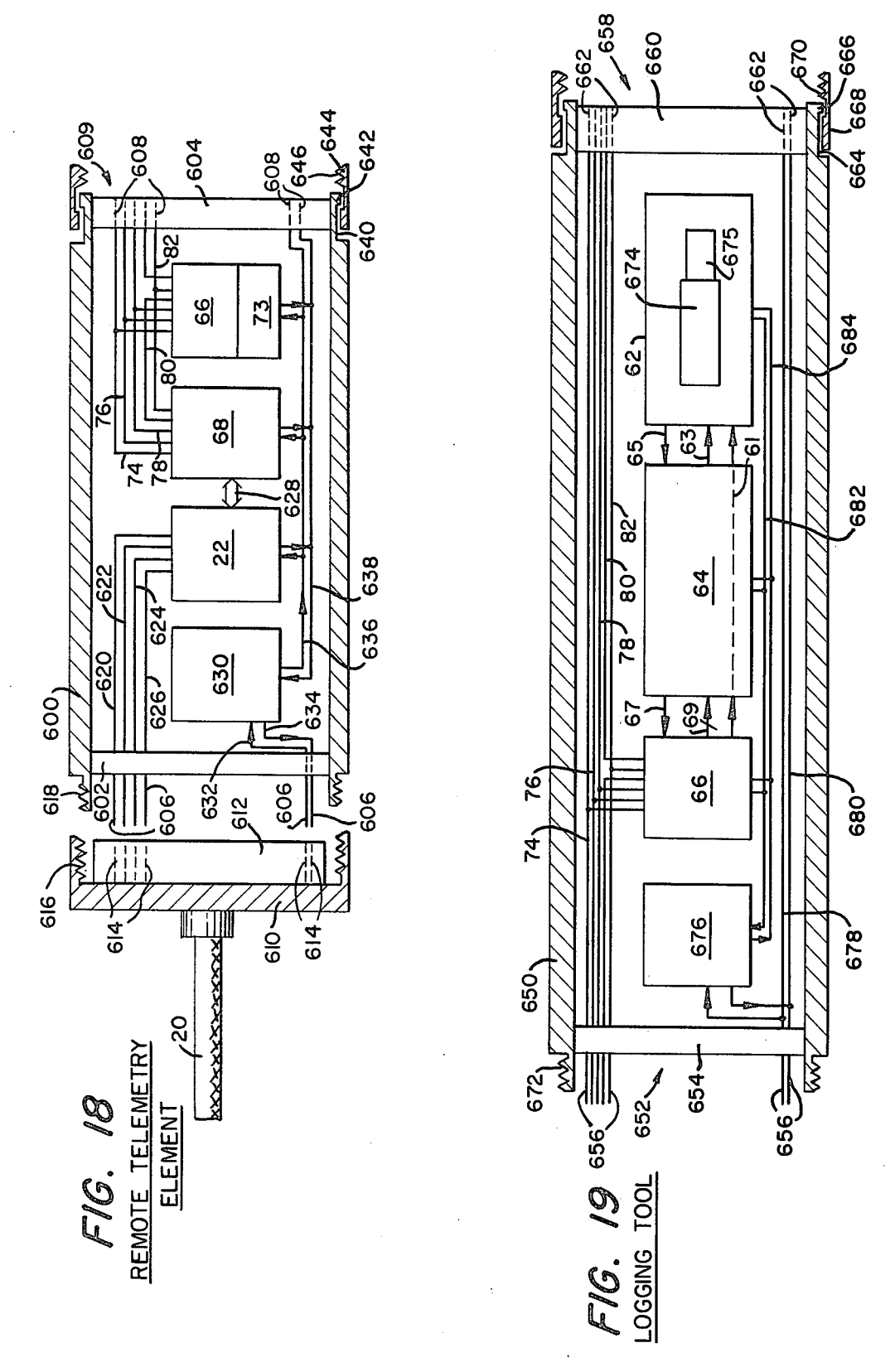

FIG. 18 represents a remote telemetry element in conformity with the present invention. This remote telemetry element is fixed at the end of the cable 20 connecting the downhole apparatus to the surface apparatus and constitutes the upper end of the downhole apparatus. This remote telemetry element includes a housing 600 of elongated form, advantageously cylindrical as shown in FIG. 18, and made of a pressure-resistant material such as steel, for example. It is well known that the pressure prevailing inside boreholes can be very high. It is thus necessary to make the housing out of a material capable of withstanding this pressure. Two discs 602 and 604 close off the two ends of the housing 600. These discs, forming sockets, are traversed by electrical connections forming connectors.

The disc 602 is equipped with male connectors 606 whereas the disc 604 has recesses 608 forming female connectors. The end of the cable 20 is connected to a cable head 610 comprising a socket 612 equipped with recesses 614 forming female connectors capable of being connected to the male connectors 606. The electric wires of the cable 20 are connected electrically to certain female connectors 614. In the embodiment, six connectors 614 are shown. In conventional practice, the cable may have seven wires so that one cable wire is unused. The head 610 is rotatable with respect to the cable 20 and socket 612 and includes an internal thread 616. The head 610 can thus be screwed onto a thread 618 provided on the outer surface of the end of the housing 600. The electrical connection and the mechanical connection of the housing 600 to the cable 20 are thereby achieved by means of the connectors 606 and 614 and by the additional threads 616 and 618.

Inside the housing are fixed a modulator-demodulator (modem) 22, a controller 68, an interface 66 and an environmental measuring device 73. These elements are identical in every respect to those described in connection with the preceding figures and are thus indicated by the same reference numerals. The modem 22 is connected to the cable 20 via electric wires 620, 622, 624 and 626. The controller 68 is connected to the modem 22 by the electrical connection 628 formed by several wires. The housing also includes a bus composed of the five wires 74 through 82. The interface 66 and the controller 68 are connected in parallel to this bus with the bus wire 80 passing through the interface as described previously. Electric signals can thus go from one to the other via the bus. The ends of the conducting wires of the bus not connected to the controller 68 are connected electrically to a set of recesses 608 forming the female connectors of an electrical connection socket.

Inside the housing there is also an electric power supply circuit 630 connected to the electric power supply wires of the cable 20 by the connections 632 and 634. Electrical wires 636 and 638 are used for the electric power supply of the modem 22, the controller 68, the interface 66 and the measurement device 73. These wires are also each connected to a female connector 608 of the disc 604 forming an electric socket.

The outer surface of the end 609 of the housing 609 is equipped with an annular recess 640 and terminated by a collar 642. In this recess 640 is provided a ring 644 which is arranged to rotate freely. This ring is equipped with a shoulder that abuts and is retained by the collar 642, and it is terminated by an internal thread 646. These elements form mechanical means making it possible to connect the remote telemetry element to a tool for the exploration of earth formations traversed by a borehole, and in particular to the tool shown in FIG. 19.

Logging Tool

FIG. 19 represents schematically a tool for the exploration of earth formations traversed by a borehole. This tool is of the modular type; that is, the tool can be connected directly to the end of the cable head 610 (FIG. 18), or preferably to the end 609 of the remote telemetry element; or several tools of different kinds (but having the configuration of the tool of the present invention shown in FIG. 19) can be connected end to end without prior adaptation. In this case, these tools and the remote telemetry element of FIG. 18 form a complete downhole apparatus.

The logging tool includes mainly a housing 650 of elongated form, preferably cylindrical as shown in FIG. 19. It is made of a pressure-resistant material such as steel or titanium. Its end 652 is closed off by a socket 654 equipped with male connectors 656. Its other end 658 is closed off by a socket 660 equipped with female connectors 662. The outer surface of the housing 650 is terminated at the end 658 by an annular recess 664 and a collar 666. A ring 668 can turn freely over the recess 664 and collar 666 so that its internal thread 670 can be screwed onto the end of another tool connected to the tool shown. The outer surface of the housing 650 is terminated at its end 652 by an external thread 672. The threads 670 and 672 are advantageously of complementary form so that they could be screwed onto each other if they did not belong to the same tool. In this manner, by making the different types of logging tools in conformity with the one of the present invention, the tools can be connected end to end.

Inside the housing 650 there is a bus made up of several conductors: five wires in the described example, referenced 74 to 82. Each of these wires is connected, on the one hand, to a connector at the end 652 of the housing and, on the other, to a connector at the end 658 of the housing. The housing also includes the tool itself 62; i.e., the sensor. In the example shown in FIG. 19, the tool is adapted to detect the natural gamma radiation emitted by the formations traversed by the borehole. In this case, the sensor is made up of a photomultiplier 674 associated in a conventional manner with a scintillator 675. The sensor proper is connected to a specific part 64 having circuits specific to the sensor of the tool, for example a circuit for shaping the signals delivered by the photomultiplier, an amplification circuit, a differentiation circuit, a counter and one or more storage registers.

The transfer of electric signals between the sensor 62 and the specific part 64 is achieved by the connections 63 and 65. The specific part 64 is connected to an interface 66 by the connections 67 and 69. This interface also has a direct link 61 with the sensor 62. The bus, the specific part 64 of the sensor and the universal interface 66 are similar in every respect to those described previously and are hence indicated by the same reference numerals. The interface 66, which is identical to the interface of the remote telemetry element, is connected in parallel to the bus in the manner shown.

The housing also includes a power supply circuit 676 connected to electric power supply wires 678 and 680 for the supply and return of electric current. These two power supply lines are each connected to a male connector 656 of the socket 654 and to a female connector 662 of the socket 660. The wires 682 and 684 provide the link between the power supply circuit 676 and the interface 66, the specific part 64 and the sensor 62. A power supply circuit is, in fact, generally necessary because the power supply voltage present on the two power supply wires 678 and 680 is not always suitable for the proper operation of the sensor, the specific part and the interface. Such an arrangement in the form of a bus for the electric power supply lines can also be adopted for the remote telemetry element described previously and shown in FIG. 18.

The electrical connections of the connectors of the two ends of the tools, in conformity with that just described, and of the remote telemetry element, are provided such that when the tools are placed end to end with the first tool connected to the end of the remote telemetry element, the bus lines of the different tools and of the remote telemetry element form a single bus. The same applies to the electric power wires which form a single power supply line. One thus obtains a downhole apparatus of modular form, each module being made up of a tool and of a remote telemetry element, in which any type of tool can be connected to any other tool in any order.

While particular embodiments of the present invention have been shown and described, it is apparent that changes and modifications may be made thereto without departing from this invention in its broader aspects; and, therefore, the aim in the appended claims is to cover all such changes and modifications as fall within the true spirit and scope of this invention.

We claim:

1. Method for the transmission of digital data via a signal transmission line between a downhole apparatus and a surface apparatus in a system for the exploration of subsurface formations traversed by a borehole, wherein said downhole apparatus comprises a plurality of logging tools, a common bus line, and a plurality of universal interfaces, each interface associated with and connecting one of the tools to said bus line in parallel and having assigned thereto a specific address unique to itself and a universal address, common to all the interfaces; and wherein said system has a plurality of operating modes for the transmission of data including a free-running mode and a command response mode; said method comprising, the steps of:
    (a) transmitting a command message with a universal address from the surface apparatus, over said bus line to all of said interfaces, said universal address command message identifying the free-running mode for data transmission, whereby all of said tools are activated in the free-running mode to transmit a predetermined quantity of data in a predetermined sequence; and
    (b) transmitting a command message with a specific address from the surface apparatus over said bus line for activation of a specific one of said tools in the command-response mode, said specific address command message identifying the length of the data message to be sent by said one tool, whereby said one tool is activated in the command response mode to transmit the prescribed quantity of data.

2. A well logging system for the exploration of subsurface formations traversed by a borehole, said system comprising downhole apparatus, surface apparatus and a signal transmission line between such downhole and surface apparatus for transmission of digital data, said system having a plurality of operating modes including a "free-running" mode and a "command-response" mode;
    wherein said downhole apparatus includes a plurality of logging tools, a common bus line and a plurality of universal interfaces, each interface associated with and connecting one of the tools to said bus line in parallel and having assigned thereto a specific address unique to itself and a universal address common to all interfaces;
    and wherein said surface apparatus includes:
    (1) means for transmitting a command message with a universal address over said transmission line and said bus line to all of said interfaces, said universal address command message identifying the free-running mode for data transmission, whereby all of said tools are activated in the free-running mode to transmit a predetermined quantity of data in a predetermined sequence; and
    (2) means for transmitting a command message with a specific address over said transmission line and said bus line to all of said interfaces for activation of a specific one of said tools in the command-response mode, said specific address command message identifying the quantity of data to be sent by said one tool.

3. A system for the transmission of data in digital form, for use in borehole exploration, between surface apparatus and downhole apparatus including one or more logging tools, each tool being adapted to recognize a specific address unique to itself, said transmission system comprising, in combination,
  (a) a signal transmission cable adapted to be arranged in an earth borehole;
  (b) surface apparatus adapted to be arranged on the earth's surface and including:
    (1) a surface controller including programmable means for generating digital command messages to be transmitted to said one or more tools, said messages being in the form of a given number of command words each having a given number of bits and at least some of said words forming the same command message containing the specific address of a given tool or a universal address recognizable by all the tools and an indication of the length of the data message to be sent by such tool, said controller processing digital data messages received from said one or more tools, and
    (2) a surface modem, coupled to said surface controller and to one end of said cable, for transmitting and receiving said digital command and data messages, respectively, onto and from said cable; and
  (c) downhole apparatus adapted to be arranged in said borehole and including:
    (1) a downhole modem, coupled to the other end of said cable, for receiving and transmitting said digital command and data messages, respectively, from and onto said cable,
    (2) a downhole controller, coupled to said downhole modem, for controlling said downhole modem and for receiving and transmitting said digital command and data messages, respectively, from and to said downhole modem, and
    (3) a bi-directional bus, coupled to said downhole controller and adapted to be connected in parallel to said one or more tools, for conducting said digital command and data messages, respectively, to and from said tools,
    (4) at least one interface associated with each of said logging tools and adapted to couple in parallel to said bus the tool with which it is associated, the interfaces of all the tools being identical; whereby said surface and downhole apparatus are capable of continuously exchanging digital information and said digital command messages may be addressed to any given tool and define the quantity of data to be sent by such tool.

4. The system defined in claim 3, wherein a command word containing a specific address includes an indication of the number of data words which the addressed tool must answer when it receives said command word; and wherein said interface further comprises counting means, connected to said specific addressed circuit and said response circuit, for storing said number of data words and for informing said response circuit when said number of words has been transferred onto the bus.

5. The system defined in claim 3, wherein a command word containing said universal address includes an indication of the signal transmission mode between the downhole apparatus and the surface apparatus, and wherein said addressed circuit of said interface stores said indication of the transmission mode.

6. A system for the transmission of data in digital form, for use in borehole exploration, between surface apparatus and downhole apparatus including one or more logging tools, each tool being adapted to recognize a specific address unique to itself, said transmission system comprising in combination:
  (a) a signal transmission cable adapted to be arranged in an earth borehole;
  (b) surface apparatus adapted to be arranged on the earth's surface and including:
    (1) a surface controller, for generating digital command messages to be transmitted to said one or more tools and for processing digital data messages received from said one or more tools, at least some of said command messages containing the specific address of a particular tool and an indication of the length of the data message to be sent by such tool, said surface controller including programmable means for generating said command messages to be transmitted to said one or more tools, said messages being in the form of a given number of command words each having a given number of bits, and
    (2) a surface modem, coupled to said surface controller and to one end of said cable, for transmitting and receiving said digital command and data messages, respectively, onto and from said cable; and
  (c) downhole apparatus adapted to be arranged in said borehole and including:
    (1) a downhole modem, coupled to the other end of said cable, for receiving and transmitting said digital command and data messages, respectively, from and onto said cable,
    (2) a downhole controller, coupled to said downhole modem, for controlling said downhole modem and for receiving and transmitting said digital command and data messages, respectively, from and to said downhole modem, said downhole controller being operative to receive said command words, at least one of which includes an indication of the length of the data signal coming from a tool that the downhole controller must send to the surface apparatus in response to said command word, and wherein said downhole controller includes means for storing said length of the data signal, means, connected to said data length storage means, for timing said data signals, and a multiplexing circuit coupled to said downhole modem and controlled by said timing means for sending said data signals coming from said tools to said downhole modem for transmission on said cable to said surface apparatus, and
    (3) a bi-directional bus, coupled to said downhole controller and adapted to be connected in parallel to said one or more tools, for conducting said digital command and data messages, respectively, to and from said tools;
  whereby said surface and downhole apparatus are capable of continuously exchanging digital information and said digital command messages may be addressed to any given tool and define the quantity of data to be sent by such tool.

7. The system defined in claim 6, wherein said downhole controller further includes a system state detection circuit connected to a status register, said status register delivering status signals in the form of words to said multiplexing circuit.

8. The system defined in claim 6, wherein at least one of said command words contains a universal address recognizable by all the tools coupled to said bus and an indication of the signal transmission mode between the downhole apparatus and the surface apparatus; and wherein said downhole controller further includes address recognition circuit means for recognizing said universal address, means for storing said mode, and a response program circuit, connected to said mode storage means, for controlling the transmission mode of said downhole apparatus.

9. A remote telemetry element for the downhole apparatus of a system for the exploration of geological formations traversed by a borehole, said system comprising surface apparatus, said downhole apparatus, and an electric cable providing an electrical connection between said surface apparatus and said downhole apparatus; said downhole apparatus including one or more logging tools, each tool being adapted to recognize a specific address unique to itself and a universal address common to all tools; said remote telemetry element comprising, in combination:

(a) a pressure-resistant housing of elongated form having first connection means at one end for providing an electrical and mechanical connection with said cable and second connection means at the opposite end for providing an electrical and mechanical connection with a logging tool;

(b) a modem, located within said housing and connected electrically to said cable via said first connection means, for receiving from said cable command messages having a specific or a universal address and for transmitting onto said cable data messages originating from said tools, said modem including means for checking the validity of the transmission of signals received from the surface apparatus, said signals being composed of synchronization codes, command words and error codes, said checking means including a circuit for detecting said error codes, wherein said command words may contain an indication of the length of the data signal coming from at least one logging tool which the controller must send to the surface apparatus in response to said command word;

(c) a controller, located within said housing and connected electrically to said modem, including means for storing said length of the data signal, means connected to said storage means for timing said data signals, and a multiplexing circuit connected to said modem and controlled by said timing means for sending said data signals coming from said at least one tool to said modem for transmission on said cable to said surface apparatus, for controlling said modem and for receiving and transmitting said command and data messages, respectively, from and to said modem, and wherein said modem transmits to said controller only said command words generated by the surface apparatus;

(d) a bus, located within said housing and connected electrically to said controller and to said second connection means for connection, in parallel, with said one or more tools, for conducting said command and data messages, respectively, to and from said tools; and (e) an electric power supply circuit located within said housing and connected electrically to said first and second connection means, to said modem and to said controller; whereby said command messages may be addressed to either one or all of said tools.

10. The remote telemetry element defined in claim 9, wherein said controller further includes a system state detection circuit connected to a status register, said status register delivering status signals in the form of words to said multiplexing circuit.

11. The remote telemetry element defined in claim 9, wherein at least some of said command messages contain a universal address recognizable by all the logging tools coupled to said second connection means and an indication of the transmission mode between the surface apparatus and the downhole apparatus; and wherein said controller further includes address recognition circuit means for recognizing said universal address, means for storing said mode, and a response program circuit, connected to said mode storage means, for controlling the transmission mode of said downhole apparatus.

12. A logging tool for exploring the geological formations traversed by a borehole adapted to be connected to other elements of downhole apparatus and lowered into the borehole by means of an electric cable connected at the surface to surface apparatus; said logging tool comprising, in combination:

(a) a pressure-resistant housing of elongated form;

(b) at least one sensor arranged in said housing and adapted to furnish measurement signals representative of an environment parameter;

(c) an electric circuit arranged in said housing and connected to said sensor for preliminary processing of said signals;

(d) mechanical connection means located at the two ends of said housing for mechanically connecting said tool into downhole apparatus;

(e) electrical connection means located at the two ends of said housing for electrically connecting said tool into downhole apparatus;

(f) a bus line arranged in said housing, having one of its ends connected to said electrical connection means at one end of the housing and having the other one of its ends connected to said electrical connection means at the other end of the housing, said bus line providing the sole transmission path for information-bearing and control signals transmitted to and from said logging tool;

(g) a universal interface arranged in said housing and connected, in parallel, to said bus line and to said electric circuit, comprising:

(1) an address recognition circuit for recognizing a specific address assigned to the tool and a universal address assigned to all the tools connected together by said mechanical and electrical connection means, (2) an addressed circuit, connected to said address recognition circuit, for storing the contents of command words transmitted to the tool by the surface apparatus via the electric cable and containing either a specific address or a universal address, and (3) a response circuit, connected to said addressed circuit, for controlling the transfer of data from said electric circuit onto the bus line; and (h) electric power supply means arranged in said housing and comprising a power circuit for supplying the sensor, the electric circuit, and the universal interface with power, and an electric power supply line connecting said power circuit to said electrical connection means at the two ends of the housing.

13. The logging tool defined in claim 12, wherein said command words containing a specific address include an indication of the number of data words which must be answered by the addressed tool when it receives such a word; and wherein said universal interface further comprises counting means, connected to said addressed circuit and said response circuit, for storing said number of data words and for informing said response circuit when said number of words has been transferred onto the bus line.

14. The logging tool defined in claim 12, wherein said command words containing a universal address include an indication of a specific one of a number of signal transmission modes between the tool and the surface apparatus, and wherein said addressed circuit stores said indication of said one specific mode.

15. A well logging system including surface apparatus having surface signal processing equipment and a surface modem, connected thereto, an electric cable connected to said surface modem, and downhole apparatus, adapted to be supported in a borehole by said cable, said downhole apparatus comprising:
  (a) a plurality of pressure-tight, modular housing sections arranged for interchangeable endwise connection,
  (b) a downhole modem located in one of said sections and connected to said electric cable,
  (c) electric circuitry located in at least some of said sections for respective subsurface investigation,
  (d) a bus line extending lengthwise through all of said sections, with sealed connectors for electrical continuity between sections, for connecting the circuitry of each section via said downhole modem to said electric cable, said bus line providing the sole transmission path for information-bearing and control signals transmitted to and from the circuitry of each section, whereby the electric circuitry in any section may be selectively enabled; and
  (e) subtantially identical (universal) interfaces, arranged in each of said sections, for connecting the circuitry of said section in parallel to said bus line, each interface including counting means for storing the length of the data message transmitted from the respective section to the surface.

16. Downhole apparatus for the exploration of geological formations traversed by a borehole, adapted to be lowered into the borehole at the end of an electric cable, having a plurality of operating modes including a pseudo free-running mode and a command-response mode, and comprising, in combination:
  (a) a remote telemetry element comprising:
    (1) a pressure-resistant housing of elongated form having first connection means at one end for providing an electrical and mechanical connection with said cable and second connection means at the opposite end for providing an electrical and mechanical connection with a logging tool;
    (2) a modem, located within said housing and connected electrically to said cable via said first connection means, for receiving from said cable command messages selecting one of said operating modes and transmitting onto said cable data messages originating from said logging tool;
    (3) a controller, located within said housing and connected electrically to said modem, for controlling said modem and for receiving and transmitting said command data messages, respectively, from and to said modem;
    (4) a bus, located within said housing and connected electrically to said controller and to said second connection means for connection, in parallel, with said logging tool, for conducting said data messages from said logging tool; and
    (5) an electric power supply circuit located within said housing and connected electrically to said first and second connection means, to said modem and to said controller; and
  (b) a plurality of logging tools connected in end-to-end relation for transmitting data in a predetermined timed sequence in said pseudo free-running mode and transmitting data upon request in said command-response mode, each tool comprising:
    (1) a pressure-resistant housing of elongated form;
    (2) at least one sensor arranged in said housing and adapted to furnish measurement signals representative of an environment parameter;
    (3) an electric circuit arranged in said housing and connected to said sensor for preliminary processing of said signals;
    (4) mechanical connection means located at the two ends of said housing for mechanically connecting said tool to another tool or to the second connection means of said telemetry element;
    (5) electrical connection means located at the two ends of said housing for electrically connecting said tool to another tool or to said second connection means of said telemetry element;
    (6) a bus line, arranged in said housing, having one of its ends connected to said electrical connection means at one end of the housing and having the other one of its ends connected to said electrical connection means at the other end of the housing, said bus line providing the sole transmission path for information-bearing and control signals transmitted to and from said logging tool;
    (7) a universal interface arranged in said housing and connected, in parallel, to said bus line and to said electric circuit; and
    (8) electric power supply means arranged in said housing and comprising:
      (i) a power circuit for supplying the sensor, the electric circuit and the universal interface with power, and
      (ii) an electric power supply line connecting said power circuit to said electrical connection means at the two ends of the housing;
wherein the electrical and mechanical connections of said tools are complementary so that said tools are connected end to end, and the bus line thus connected end to end form a single bus line connected to said remote telemetry element, so that data is transmitted from said tools over said bus line to said modem, for application to said cable, in either said pseudo free-running mode or said command-response mode.

17. A method for the transmission of digital data via a signal transmission line between a downhole apparatus and a surface apparatus in a system for the exploration of subsurface formations traversed by a borehole, wherein said downhole apparatus comprises a plurality of logging tools, a common bus line, and a common telemetry unit interfaced with said signal transmission line and said bus line, and wherein said system has a plurality of operating modes for the transmission of data including at least a pseudo free-running mode and a command-response mode; said method comprising the steps of:
- (a) transmitting a first command message to said telemetry unit to place the unit in the pseudo free-running mode, whereby all of said tools are activated in the free-running mode to transmit data in a predetermined timed sequence over said bus line to said telemetry unit; and
- (b) transmitting a second command message to said telemetry element to place said unit in the command-response mode, whereby at least one tool is activated in the command-response mode to transmit data over said bus line to said telemetry unit.

18. A well logging system including surface apparatus having surface signal processing equipment and a surface modem, connected thereto, an electric cable connected to said surface modem, and downhole apparatus, adapted to be supported in a borehole by said cable, said downhole apparatus comprising a plurality of pressure-tight, modular housing sections arranged for interchangeable endwise connection, a downhole modem located in one of said sections and connected to said electric cable, electric circuitry located in at least some of said sections for respective subsurface investigation, and a bus line extending lengthwise through all of said sections, with sealed connectors for electrical continuity between sections, for connecting the circuitry of each section via said downhole modem to said electric cable, said bus line providing the sole transmission path for information-bearing and control signals transmitted to and from the circuitry of each section, said surface equipment including means for generating first and second command signals for instructing said downhole apparatus to read out data from said subsurface investigating sections in a pseudo free-running mode and a command-response mode, respectively, and said downhole apparatus including means responsive to said first and second command signals for causing said subsurface investigating sections to read out data collected therein on said bus line in said pseudo free-running and said command-response mode, respectively.

19. A well logging system including surface apparatus having surface signal processing equipment and surface telemetry means connected thereto, a signal transmission cable connected to said surface telemetry means, and downhole apparatus, adapted to be supported in a borehole by said cable, said downhole apparatus comprising:
- (a) a plurality of pressure-tight, modular housing sections arranged for interchangeable endwise connection;
- (b) one of said housing sections comprising a downhole telemetry cartridge for data communication with said surface telemetry means;
- (c) at least one other of said housing sections comprising a logging tool for subsurface investigation and for generating data representative thereof;
- (d) a bus line extending lengthwise through all of said housing sections, with sealed connectors for electrical continuity between sections, for connecting each said logging tool via said downhole telemetry means to said cables; and
- (e) means included in said downhole telemetry cartridge for formatting data received over said bus line from said at least one logging tool into data messages and for transmitting said data messages to said surface telemetry means in data frames, said downhole telemetry means further including means addressable from the surface for controlling the length of the data message to be transmitted per frame.

20. The system of claim 19, wherein each logging tool is coupled to said bus in parallel by a substantially identical interface.

21. The system of claim 19 wherein:
said surface telemetry means includes means for generating digital command messages for transmission to said downhole apparatus for specifying the length of data message to be transmitted per data frame; and
said addressable means in said downhole telemetry cartridge is responsive to said command message to control the length of data message transmitted per data frame.

22. The system of claim 21, wherein:
the length of the data message to be transmitted per data frame is determined by specifying a particular number of data words in a command message; and
said downhole addressable means includes counting means for storing said number of data words and for generating a signal indicative of the end of the data message when said number of data words has been transmitted.

23. The system of claim 22, wherein:
each data frame transmitted by said downhole telemetry cartridge includes a synchronization code, said specified number of data words, and an error detection code; and
said downhole telemetry cartridge includes means for generating said synchronization code, means for generating said error detection code, and means for inserting said codes into said data frame.

24. The system of claim 23, wherein:
each data frame also includes a status word; and
said downhole telemetry cartridge further including means for generating said status word and for inserting it into said data frame.

25. The system of claim 23, wherein said surface telemetry means has means for detecting said synchronization code, means for detecting said error code, and means for indicating to the surface telemetry means the validity of the transmission of the signals received from said downhole apparatus.

* * * * *

UNITED STATES PATENT AND TRADEMARK OFFICE
CERTIFICATE OF CORRECTION

PATENT NO. : 4,355,310                                 Page 1 of 2

DATED     : October 19, 1982

INVENTOR(S) : Antoine Belaigues et al.

It is certified that error appears in the above-identified patent and that said Letters Patent is hereby corrected as shown below:

Col. 3, line 10, delete "a" (second occurrence);
Col. 3, line 37, "message" should read --messages--;
Col. 9, line 56, "passage" should read --message--;
Col. 11, line 52, "(UP)" should read --(UD)--;
Col. 13, line 10, "than" should read --then--;
Col. 13, line 22, "works" should read --words--;
Col. 13, line 67, before "MU clock" insert --by--;
Col. 14, line 9, "commandresponse" should read --command-response--
Col. 14, line 32, "mesage" should read --message--;
Col. 15, line 18, "PSK coded" should read --PSK modulated--;
Col. 19, line 57, "and other" should read --the other--;
Col. 20, line 60, after "that" insert --of--;
Col. 23, line 50, "instrution" should read --instruction--;
Col. 23, line 56, "'Meassage'" should read --"Message"--;
Col. 24, line 4, "'Handshanke'" should read --"Handshake"--;
Col. 24, line 40, "simultanesouly" should read --simultaneously--;
Col. 25, line 5, "detec" should read --detect--;
Col. 25, line 52, "repesents" should read --represents--;
Col. 25, lines 54-55, "flip-flips" should read --flip-flops--;
Col. 26, line 51, "does" should read --goes--;
Col. 27, line 40, "is" should read --if--;
Col. 27, line 66, "(output" should read --output--;
Col. 28, line 31, "complimentary" should read --complementary--
Col. 28, line 41, "characterstic" should read --characteristic--
Col. 30, line 1, "flip-slop" should read --flip-flop--;
Col. 30, line 55, delete "and";
Col. 32, line 6, "The circuit" should read --This circuit--;
Col. 32, line 40, "instructions" should be --instruction--;
Col. 32, line 62, "systemically" should read --systematically--
Col. 36, lines 42-43, "complimentary" should be --complementary--;
Col. 36, line 44, "complimentary" should be --complementary--;

UNITED STATES PATENT AND TRADEMARK OFFICE
CERTIFICATE OF CORRECTION

PATENT NO. : 4,355,310

DATED : October 19, 1982

INVENTOR(S) : Antoine Belaigues et al.

It is certified that error appears in the above-identified patent and that said Letters Patent is hereby corrected as shown below:

Col. 38, lines 37-38, "sensing" should read --sending--;
Col. 39, line 25, "flip-flpp" should read --flip-flop--;
Col. 40, line 38, "is" should read --in--;
Col. 40, line 59, "preceed" should be --precede--;
Col. 41, line 47, "273" should read --973--;
Col. 43, line 34, "It if" should read --If it--;
Col. 44, line 33, "609" (second occurrence) should read --600--
Col. 47, line 45, "whereby said surface..." should begin at the left-hand margin;
Col. 49, line 66 "whereby said ..." should begin at the left-hand margin;
Col. 51, line 40, "subtantially" should be --substantially--;
Col. 52, line 53, "line" should read --lines--.

Signed and Sealed this

Twelfth Day of April 1983

[SEAL]

Attest:

GERALD J. MOSSINGHOFF

Attesting Officer    Commissioner of Patents and Trademarks